(12) United States Patent
Kandlikar et al.

(10) Patent No.: US 12,502,122 B2
(45) Date of Patent: Dec. 23, 2025

(54) SPATIAL AND CHARACTERISTIC PROPERTY DATA TO DETECT A SOURCE IN A SYSTEM

(71) Applicant: BIRED IMAGING, Inc., Rochester, NY (US)

(72) Inventors: Satish G. Kandlikar, Rochester, NY (US); Isaac Bernabe Perez-Raya, Rochester, NY (US); Carlos B. Gutierrez, Rochester, NY (US)

(73) Assignee: BIRED IMAGING, INC., Rochester, NY (US)

( * ) Notice: Subject to any disclaimer, the term of this patent is extended or adjusted under 35 U.S.C. 154(b) by 511 days.

(21) Appl. No.: 17/981,235

(22) Filed: Nov. 4, 2022

(65) Prior Publication Data
US 2024/0065613 A1  Feb. 29, 2024

Related U.S. Application Data

(60) Provisional application No. 63/276,246, filed on Nov. 5, 2021.

(51) Int. Cl.
*A61B 5/00* (2006.01)
*A61B 5/01* (2006.01)
(Continued)

(52) U.S. Cl.
CPC ............ *A61B 5/4312* (2013.01); *A61B 5/015* (2013.01); *G01J 5/0025* (2013.01); *G01J 5/0859* (2013.01);
(Continued)

(58) Field of Classification Search
CPC ........... A61B 5/4312; A61B 5/00; A61B 5/01; A61B 5/015; A61B 5/0064; A61B 5/0091;
(Continued)

(56) References Cited

U.S. PATENT DOCUMENTS

| | | | | |
|---|---|---|---|---|
| 12,106,473 B2 * | 10/2024 | Wang | ...................... | A61B 5/425 |
| 2010/0135550 A1 | 6/2010 | Arnon | | |
| 2017/0030705 A1 | 2/2017 | Bridges | | |

FOREIGN PATENT DOCUMENTS

| | | | | |
|---|---|---|---|---|
| CN | 108010085 A | * | 5/2018 | ............. G06F 18/25 |
| WO | WO-2008130907 A1 | * | 10/2008 | ............. G01K 13/20 |
| WO | 2021/0163309 A1 | | 8/2021 | |

OTHER PUBLICATIONS

Mukhmetov et al., "Patient/Breast-Specific Detection of Breast Tumor Based on Patients' Thermograms, 3D Breast Scans, and Reverse Thermal Modelling," Applied Sciences 11:1-20 (2021).
(Continued)

*Primary Examiner* — Stephen R Koziol
*Assistant Examiner* — Benedict E Lee
(74) *Attorney, Agent, or Firm* — Bond Schoeneck & King, PLLC; Joseph M. Noto

(57) ABSTRACT

Processes, algorithms and techniques are disclosed for detecting the presence of a source of at least one of heat, mass, momentum, energy, electrical field, and species in a system, such as, for identifying the presence of a heat source and its 3D location within a body part, and also to identify absence of a heat source within the body part. Multi-view thermal images are obtained of the body part and thermal and spatial information in different views are obtained. Iterative algorithms are developed to determine the presence of a heat source in the body part by employing the Physics-Informed Neural Network analyzer. Methods of generating a spatial-point-cloud and thermal-spatial-point-cloud are disclosed.

9 Claims, 15 Drawing Sheets

(51) Int. Cl.
   *G01J 5/00*        (2022.01)
   *G01J 5/08*        (2022.01)
   *G06T 7/33*        (2017.01)
(52) U.S. Cl.
   CPC ....... *G06T 7/337* (2017.01); *G01J 2005/0077* (2013.01); *G06T 2207/10048* (2013.01); *G06T 2207/30068* (2013.01); *G06T 2207/30204* (2013.01)
(58) Field of Classification Search
   CPC ........ A61B 5/7267; A61B 5/7435; G01J 5/00; G01J 5/0025; G01J 5/08; G01J 5/0859; G01J 2005/0077; G06T 7/33; G06T 7/337; G06T 2207/10048; G06T 2207/30068; G06T 2207/30204; G06T 2207/10028; G06T 2207/20081; G06T 2207/20084; G06T 2207/30096; G06T 7/0012; G16H 30/40; G16H 50/20
   See application file for complete search history.

(56) References Cited

OTHER PUBLICATIONS

Cai et al., "Physics-Informed Neural Networks (PINNs) for Heat Transfer Problems," Journal of Heat Transfer 1-20 (2021).

* cited by examiner

FIG. 7A
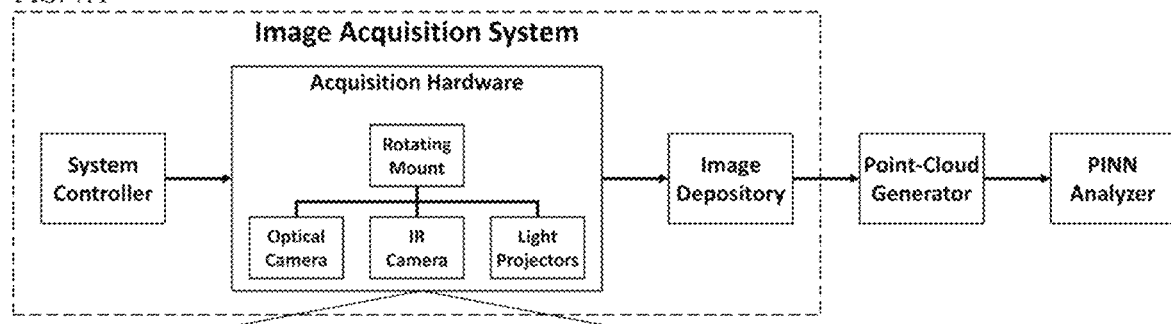
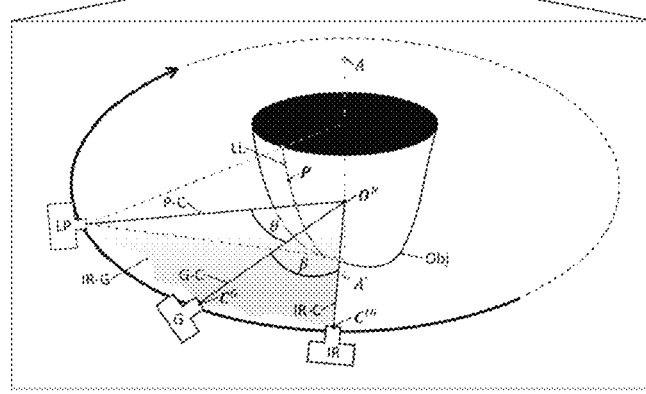
FIG. 7B
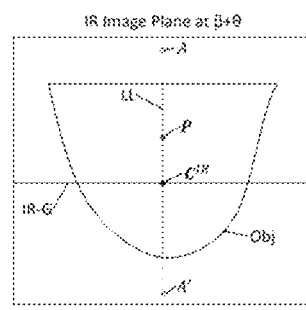
FIG. 7C

Case A

Case B

Case C

Case D

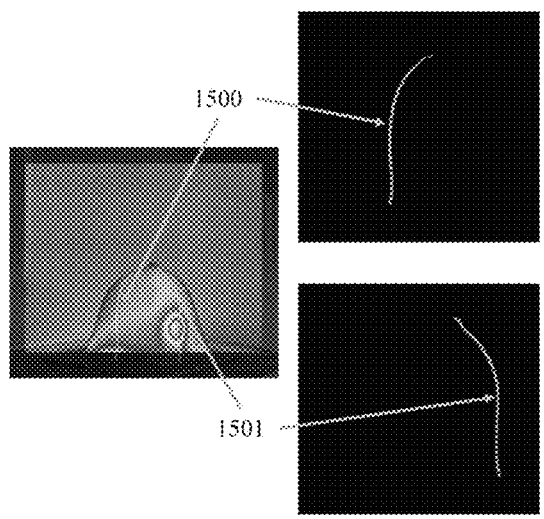 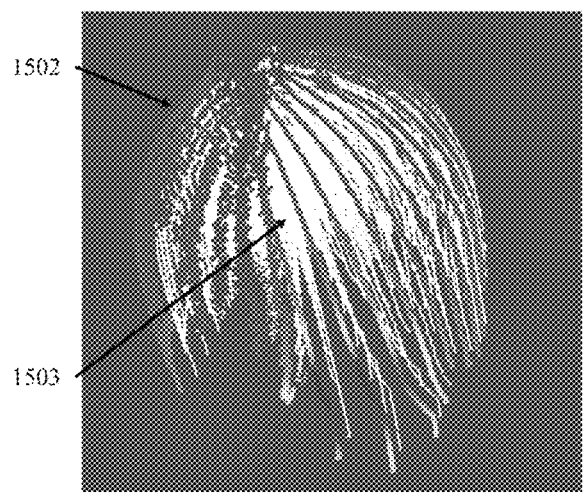
FIG. 15A                               FIG. 15B

SPATIAL AND CHARACTERISTIC PROPERTY DATA TO DETECT A SOURCE IN A SYSTEM

CROSS REFERENCE

This application claims the benefit of the filing date of U.S. Provisional Patent Application No. 63/276,246, filed Nov. 5, 2021, which is hereby incorporated by reference in its entirety.

FIELD

A method of detecting at least one of a presence of the source, a property of the source and a property of the system, wherein the source is at least one of heat, mass, momentum, energy, electrical field, and species in the system and methods of generating a spatial-point-cloud and thermal-spatial-point-cloud of the surfaces and the interior region of an object using specifically positioned and oriented light markers are disclosed.

BACKGROUND

Breast cancer is a very prevalent form of cancer among women. Early detection has been recognized as an effective defense against this disease. The US Preventive Services Task Force recommends routine annual screening in all women over age 50 (or 40 with certain risk factors) representing a total market potential of about 48 million screenings annually. Up to 10 percent, or 4.8 million women, are recalled after mammography and may undergo further evaluation with additional mammography, ultrasound, or MRI, and biopsy. Over 90% of the recalled women do not have cancer and unnecessarily suffer from the agony of suspected breast cancer while waiting for further evaluation. The problems with underdiagnosis and misdiagnosis are particularly pronounced in the 40% of women who have "dense breast tissue" which interferes with interpretation of mammography. The dense breast tissue has a masking effect that masks the tumor in mammographic images or mammograms. This results in low sensitivity as well as low specificity of mammography. It also results in a low positive predictive value for mammography. In one study it has been shown to be as low as 4%. Mammography is also associated with low positive predictive value of the presence of a cancerous tumor. The BIRADS system of assigning level of suspicion regarding presence of cancer requires a large fraction of women being recalled for additional testing. A detection system with a higher positive predictive value for cancer detection is highly desirable.

Breast cancer is associated with increased heat generation due to higher metabolism in the tumor and increased blood vessels resulting from angiogenesis. These thermal effects are represented in this disclosure as the equivalent tumor heat generation. The heat source may also result from scar or tissue inflammation within the breast and further evaluation may be needed.

The presence of heat source results in thermal alterations on the breast surface and surface temperatures are accordingly affected. The thermal alterations may also result from vasculature near the surface of the breast and scar or inflamed tissue that requires further evaluation. Empirical methods have been used in the past based on various gradient, pattern and profile recognition techniques. In some applications, artificial intelligence tools have been employed to aid in this empirical image classification approach. These are empirical and are not accurate as the local pattern is affected by other causes. Some of them rely on comparison of the profiles with healthy breast profiles and library of profiles from healthy and cancerous breast. These methods lack rigorous scientific and mathematical basis and are not validated with proven cancer cases.

To overcome the issues related to suboptimal performance of mammography in dense breasts, efforts are underway to develop an effective screening technique that will improve the cancer detection rates and at the same time, reduce overdiagnosis caused by increased recall rates following mammography for further evaluation. The present disclosure overcomes the masking issue in mammography as the temperature alternations resulting from the heat source are not masked in this present approach.

The present disclosure is applicable to any object for which the thermal and spatial information can be generated on the surface of the object and governing equations are solved in conjunction with physics-informed neural network and iterative techniques. This technique can be used to determine the location of the heat source and thermal conductivity of the breast tissue that is representative of the heat transfer in the breast. The equivalent thermal conductivity in the entire breast or in different region of the breast can be estimated using the present disclosure. The thermal information can be replaced with appropriate property equations in other applications. This method is applicable for detecting a source term in a system that comprises of system components and system boundaries and uses appropriate sense parameters such as mass concentration in lake while detecting pollutants. A system includes one or more objects. In certain applications, the system includes the objects plus surroundings. Some examples of the system include lake, environment, ocean, atmosphere, space, 3D objects, 3D objects surrounded by air, 3D objects surrounded by a fluid, and other configurations whose behavior can be described through specific properties that are connected through governing equations. Specific case of breast cancer is described in which the breast surface thermal and spatial information is used to predict the presence of a cancerous tumor and identify its size, location, and some of the properties of the tissue. In this case, the specified parameters include temperature, healthy and cancerous tissue properties, size and location of the tumor, and the metabolic heat generation rate.

Infrared imaging is contact-free, has no harmful radiation exposure and involves no breast compression. Placing a patient in prone position and suspending the breast through a hole in the table prevents gravitational distortion of the breast at the inframammary fold and allows unobstructed view of the breast from all directions. Contact of the breast with other body parts near the inframammary folds also distorts the thermal field in the breast. Prone position is thus preferred to provide unaltered thermal image of the breast arising from gravitational distortion and give a complete view of the breast. The proposed optical imaging method provides spatial data of the object at different locations in the system. Infrared images provide the system property data, such as spatial temperature data, on the breast surface in the system. The present disclosure is able to utilize the surface temperature data from an infrared image on the breast surface without being affected by the inframammary fold. This data is used in analyzing the system of the breast using physics-informed neural network algorithm. An infrared camera is used to generate thermal data on the surface of the breast.

Heat is transferred from the chest wall through the breast to the breast surface where it is dissipated to the surrounding air. Depending on the tissue type, breasts are identified as fatty, scattered fibroglandular, heterogeneously dense, and extremely dense. Breasts which are heterogeneously dense and extremely dense are considered "dense breasts". Dense breasts occur in >40% of women and are at higher risk of developing breast cancer. Greater breast density also makes it more difficult to detect cancer with a mammogram; ~38% of tumors are missed or misdiagnosed among women with dense breasts. The decision for additional screening is often made on an individual basis after discussion with the healthcare provider, with breast density and other risks factors taken into account. Women at high risk of developing breast cancer such as women with greater than 20% lifetime risk or known BRCA gene mutations are screened using mammography plus MRI annually. For this group, screening MRI has a higher sensitivity than mammography alone, the highest sensitivity occurs when both are combined. MRI is an expensive process and significantly increases the cost of screening. In a prior study, 1,909 women at high risk were screened using mammography and MRI, the sensitivities were 33% and 79.5%, respectively. However, MRI led to twice as many unneeded additional examinations as did mammography (420 vs. 207) and three times as many unneeded biopsies (24 vs. 7). It is also pointed out in literature that annual MRI screening would incur in significantly higher costs and is unlikely to improve overall survival. Tomosynthesis, which was first approved by FDA in 2011, is currently being considered as an adjunct, but it is also very high cost, and high radiation dose is another concern. It's effectiveness in improving specificity also remains unanswered. In some studies, it is shown that mammography misses' cancer in breast with fatty and fibroglandular tissues as well. All the breast tissue types are expected to benefit with this disclosure.

SUMMARY

The present disclosure describes on capturing multi-view thermal images of a body part such as a female breast, extracting a point-cloud of the spatial and thermal information on the breast surface, employing a mac. The present disclosure describes on capturing multi-view thermal images of a body part such as a female breast, extracting a point-cloud of the spatial and thermal information on the breast surface, employing a machine learning algorithm in the form of a physics informed neural network (PINN) analyzer to detect the region within an object containing a heat source. The current disclosure describes a method of analysis of a system, including: a) obtaining a characteristic-point-cloud of a region of the system, wherein the characteristic property is related to a source in the system; b) applying a physics-informed neural network algorithm to a selected portion of the characteristic-point-cloud to perform inverse modeling of data from the selected portion of the characteristic-point-cloud, wherein the algorithm incorporates physics-based governing equations that relate the characteristic to the heat source; and c) detecting at least one of a presence of the heat source, a property of the heat source and a property of the system. The disclosure analyzes the thermal information on the breast surface and detects the presence of a heat source within the breast. Further it estimates the equivalent size of the heat source by using available relationships between the metabolic heat generation and the size of the tissue. The size may also be indicative of the presence of a region of tissue within the breast with increased perfusion rate. The individual effects alone or the combined effect of increased metabolic activity and increased perfusion rate together provide information on the equivalent size of the heat source. This heat source may result from increase metabolic activity in a tumor and increase vasculature such as resulting from angiogenesis. The cancerous tumors have a higher metabolic activity than normal tissue. Benign tumors may have metabolic activity, which may be as high as a cancerous tumor. Further evaluation is needed to establish the reasons for increased heat generation in the heat source. This evaluation may be made by medical doctors, including radiologists, and evaluation of the region of heat source with techniques such as mammograms, MRI, biopsy and other detection modalities.hine learning algorithm in the form of a physics informed neural network (PINN) analyzer to detect the region within an object containing a heat source. The current disclosure describes a method of analysis of a system, including: a) obtaining a characteristic-point-cloud of a region of the system, wherein the characteristic property is related to a source in the system; b) applying a physics-informed neural network algorithm to a selected portion of the characteristic-point-cloud to perform inverse modeling of data from the selected portion of the characteristic-point-cloud, wherein the algorithm incorporates physics-based governing equations that relate the characteristic to the heat source; and c) detecting at least one of a presence of the heat source, a property of the heat source and a property of the system. The disclosure analyzes the thermal information on the breast surface and detects the presence of a heat source within the breast. Further it estimates the equivalent size of the heat source by using available relationships between the metabolic heat generation and the size of the tissue. The size may also be indicative of the presence of a region of tissue within the breast with increased perfusion rate. The individual effects alone or the combined effect of increased metabolic activity and increased perfusion rate together provide information on the equivalent size of the heat source. This heat source may result from increase metabolic activity in a tumor and increase vasculature such as resulting from angiogenesis. The cancerous tumors have a higher metabolic activity than normal tissue. Benign tumors may have metabolic activity, which may be as high as a cancerous tumor. Further evaluation is needed to establish the reasons for increased heat generation in the heat source. This evaluation may be made by medical doctors, including radiologists, and evaluation of the region of heat source with techniques such as mammograms, MRI, biopsy and other detection modalities.

BRIEF DESCRIPTION OF DRAWINGS

FIG. 7A shows an image acquisition system made up of system controller, an acquisition hardware which consist of a rotating mount, an optical camera, a sensor which is an IR camera for sensing temperature and at least one light projector, and an image depository, the Point-Cloud Generator, and the physics-informed neural network analyzer, or PINN analyzer, FIG. 7B is an example of a system with an IR camera, optical camera, and one light project that goes around an object in the same trajectory and path, and FIG. 7C shows an example of an IR image captured, without displaying the IR detailed map, when the IR camera has moved to the prior position of the light projector;

FIG. 15A shows the extracted left light points and right light points and FIG. 15B shows the thermal-spatial-point-cloud and interior points of the 3D printed digital breast model for Example 5.

DETAILED DESCRIPTION

Figure 1:
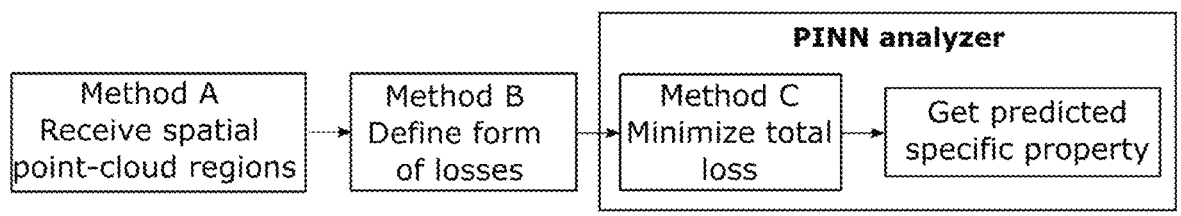
FIG. 1 shows the process to perform modeling of a specific property in a system with the PINN analyzer in solving a forward problem.

In accordance with an aspect of the present disclosure, there is provided a method of analysis of a system, including:
obtaining a characteristic-point-cloud of a region of the system, wherein a characteristic property is related to a source in the system;
applying a physics-informed neural network algorithm to a selected portion of the characteristic-point-cloud to perform inverse modeling of data from the selected portion of the characteristic-point-cloud, wherein the algorithm incorporates physics-based governing equations that relate the characteristic property to the source; and
detecting at least one of a presence of the source, a property of the source and a property of the system, wherein the source is at least one of heat, mass, momentum, energy, electrical field, and species in the system.

In accordance with an aspect of the present disclosure, a method of analysis of a system is disclosed including: a) obtaining a characteristic-point-cloud of a region of the system, wherein the characteristic property is related to a source in the system, b) applying a physics-informed neural network algorithm to a selected portion of the characteristic-point-cloud to perform inverse modeling of data from the selected portion of the characteristic-point-cloud, wherein the algorithm incorporates physics-based governing equations that relate the characteristic property to the source and c) detecting at least one of a presence of the source, a property of the source and a property of the system, wherein the source is at least one of heat, mass, momentum, energy, electrical field, and species in the system.

In accordance with an aspect of the present disclosure, the point-cloud is obtained on at least one of the surfaces of the object, within the object, within the object plus surroundings, and combinations of these.

In accordance with an aspect of the present disclosure, the system includes an object and the region is the surface of the object.

In accordance with an aspect of the present disclosure, a region includes at least a portion of a system.

In accordance with an aspect of the present disclosure, the system includes a female breast, the characteristic property is temperature, and the region is a thermal-spatial-point-cloud of a surface of the female breast.

In accordance with an aspect of the present disclosure, there is provided a method of obtaining multi-view infrared images of a body part and generating a thermal-spatial-point-clouds of the body part. The disclosure provides detailed description related to detection of heat sources in a female breast, which may be indicative of breast cancer. It is equally applicable to other body parts in humans and animals. These body parts and surrounding regions may be considered as a system. This disclosure is also applicable in detecting a source, the characteristics of the source, and system property information at points at different locations in the system. The source affects at least one of the system properties, such as temperature in a system with a heat source. The system can be described through physics-based governing equations. In general, the source may be heat, energy, mass, species or any term whose effect can be described through appropriate properties in physics-based governing equations. A negative value may be assigned to a source to represent a sink.

In accordance with an aspect of the present disclosure, there is provided a method of obtaining multi-view infrared images, obtaining corresponding multi-view images with image capture sensitive markers which may be specifically positioned for identifying spatial locations of the markers on the surface of an object, and generating a thermal spatial-point-cloud of the body part. The markers include physical markers, light markers in visible, infrared or other wavelengths, and natural or artificial features on the surface of the object. The image capture camera obtaining the multi-view images is sensitive to the marker to capture its image in a given view. The corresponding multi-view images include images obtained with infrared or visible light camera in the same position as the multi-view infrared images or at triangulated locations. Other geometric relationships may be employed in obtaining the geometrical shape of the object and the spatial positions of various points, including markers, on the surface of the object and associating these positions with respective system properties such as temperature. These properties are characteristic properties that are used for the governing equations. In analyzing a system with a heat source, temperature is used as a characteristic property and the characteristic-point-cloud becomes the thermal-spatial-point-cloud. The infrared camera is used as an array of sensors that captures temperatures. Other suitable sensors may be used for obtaining different system properties. An optical system is defined as consisting of the optical camera and the light marker. A beam of light is emitted by a light marker. The optical camera includes visible, infrared, near infrared, far-infrared, and any other light spectrum sensitive camera. An optical camera includes a photographic camera.

In accordance with an aspect of the present disclosure, there is provided a method of obtaining multi-view infrared images of a body part, generating spatial indicators in the form of spatial-point-clouds from these images using image processing techniques including edge detection, image enhancement, or image segmentation, analyzing images with projected light markers with known attributes such as angular and spatial position in relation to the multiple views, which may be obtained through rotation of the camera and the marker about an axis of rotation. The term "multi-view" is used to represent the term "multiple views" and the two terms are used interchangeably in this disclosure. A beam of light is projected by the light projector and it appears as a light marker on the surface of the object. The light marker is placed at known position with respect to the optical camera. The beam of light preferably passes through the axis of rotation. The light beam emitted by the light projector makes a light mark on the surface of the object. This light mark, also referred to as light marker is captured in an image of the object obtained by the optical camera. In another embodiment, the object rotates about an axis of rotation while the camera and marker do not rotate about the axis of rotation.

In accordance with an aspect of the present disclosure, there is provided a method of obtaining multi-view infrared images, obtaining corresponding multi-view images with markers, and generating spatial and thermal indicators including of point correspondence between spatial map and temperature map obtained from spatial and thermal-spatial point clouds respectively, from these images and identifying presence of a heat source. The markers include physical markers, light markers in visible, infrared or other wavelengths. The corresponding multi-view images include images obtained with infrared or visible lights camera in the same position as the multi-view infrared images or at triangulated locations.

In accordance with an aspect of the present disclosure, there is provided a method of obtaining multi-view infrared images of a body part, generating thermal-spatial-point-cloud of the body part and surroundings from these images and identifying presence of a heat source using a machine learning algorithm such as a Physics-Informed Neural Network, PINN in the form of a PINN analyzer.

In accordance with an aspect of the present disclosure, there is provided a method of obtaining multi-view infrared images of a body part, generating thermal-spatial-point-cloud of the body part and surroundings from these images and identifying presence of a heat source using artificial intelligence techniques and algorithms.

In accordance with an aspect of the present disclosure, a method is provided to generate phantom spatial and thermal information on the surface of the body part using the spatial information of the body part and the prescribed indicators, including location of the tumor, characteristics of the tumor region and surrounding tissue regions within the body part, boundary locations between the body part and the neighboring regions, and the regions surrounding the body part, using a PINN analyzer. The characteristics include tumor size, shape, thermal and physical properties, metabolic activity, blood perfusion rate and other physical and thermal descriptors.

In accordance with an aspect of the present disclosure the system includes a female breast, the characteristic property is temperature, and the thermal-spatial-point-cloud of a surface of the female breast is obtained as a part of the characteristic-point-cloud.

In accordance with an aspect of the present disclosure the characteristic-point-cloud is obtained on at least one of the regions: a) the surface of the object, b) the interior of the object, and c) surrounding of the object in the system.

In accordance with an aspect of the present disclosure the physics-informed neural network algorithm detects at least one location of a heat source in the breast, a magnitude of the heat source, and thermal properties of the breast.

In accordance with an aspect of the present disclosure, a method is provided to improve the match of the spatial and thermal information obtained from the multi-view infrared images with the phantom spatial and thermal information generated by the algorithm by varying at least one of the prescribed indicators, including location of the tumor, characteristics of the tumor region and surrounding tissue regions within the body part, boundary locations between the body part and the neighboring regions, and the regions surrounding the body part.

In accordance with an aspect of the present disclosure, a method is provided to generate thermal-spatial-point-clouds from these images and identify presence of heat source, which might indicate presence of a heat source using the thermal and spatial information obtained from multi-view infrared images and a PINN analyzer incorporating an optimization strategy to minimize loss functions resulting from the difference between the actual and generated thermal-spatial-point-clouds.

In accordance with an aspect of the present disclosure, a method is provided to present the information regarding the presence of a heat source and the heat source characteristics for evaluation of the condition of the body part.

In accordance with an aspect of the present disclosure, a method is provided to present the information regarding the presence of a heat source and the heat source characteristics, which may be interpreted from the results of this analysis in terms of the strength, size, and location of the heat source.

In accordance with an aspect of the present disclosure, the body part described in this disclosure is a female breast.

The results can be presented to a medical professional to serve as an adjunct to another breast cancer detection modality such as mammography or as another breast cancer detection system. The adjunctive technique can be used with mammography during annual screening for cancer detection. Since this disclosure does not use harmful radiations and is contactless, it can be used for developing a safe and effective breast cancer screening tool. The methods described in this disclosure can be used for cancer detection and localization using the thermal and spatial information from the multi-view infrared images for conducting heat transfer analysis necessary in the iterative PINN analyzer. The process can be further modified to generate the spatial information from multi-view images obtained from a camera in the visible light spectrum in the same multi-view orientation as the infrared images. The present disclosure provides information regarding whether a heat source is present in the breast. In accordance with an aspect of the present disclosure, the physics-informed neural network algorithm comprises of applying a spatial distribution function to at least one of the heat source terms in the physics-based governing equation, wherein the mean value of the spatial distribution function corresponds to the center location of the heat source and the standard deviation of the distribution function corresponds to at least one of the size of the heat source and the magnitude of the heat source.

In accordance with an aspect of the present disclosure there is provided a method of generating a thermal-spatial-point-cloud of an object, including:

placing the object within an image acquisition system including an optical camera, an infrared camera, and a light projector projecting a beam of light creating a light marker in the form of a spot or a line on a surface of the object;

rotating around an axis of rotation the image acquisition system or the object;

obtaining multi-view infrared images of the surface of the object;

obtaining multi-view optical images of the surface of the object, wherein each multi-view optical image contains the light marker;

obtaining spatial information of each light marker from the multi-view optical images of the object using the angular and spatial relationship among the optical camera, infrared camera and the axis of rotation and the angular relationship of the light projector to the axis of rotation to generate a spatial-point-cloud of the surface of the object;

registering the multi-view optical images and multi-view infrared images to generate registered multi-view infrared images containing the light markers;

obtaining a temperature at each location of the light markers from the registered multi-view infrared images of the surface of the object corresponding to the spatial-point-cloud of the surface of the object; and generating a thermal-spatial-point-cloud of the surface of the object from the temperature at the locations of the light markers corresponding to the spatial-point-cloud.

In accordance with an aspect of the present disclosure there is provided a method of generating a spatial-point-cloud, including:

obtaining multi-view optical images of an object and multi-view infrared images of a surface of the object using an image acquisition system including an optical camera, an infrared camera, and a light projector projecting a beam of light creating a light marker in the form of a spot or a line on the surface of the object, by:

i) rotating one of the a) object and b) the image acquisition system around an axis of rotation, ii) placing the object in the vicinity of the axis of rotation, iii) orienting the optical camera such that an angular center line of the optical camera passes through the axis of rotation and is normal to the axis of rotation, iv) orienting the light projector such that the light projector, the light marker, and the axis of rotation are in a same plane, v) placing the light projector at known angular positions with respect to an angular center line of the optical camera and the axis of rotation, vi) orienting the infrared camera such that an angular center line of the infrared camera passes through the axis of rotation and is normal to the axis of rotation, vii) placing the optical camera and the infrared camera in a plane that is normal to the axis of rotation; and obtaining spatial information at locations of the light markers from the multi-view optical images of the object to generate a spatial-point-cloud of the surface of the object.

In accordance with an aspect of the present disclosure there is provided a method of generating a thermal-spatial-point-cloud from the spatial-point-cloud generated in accordance with the previous aspect by performing those steps and further obtaining temperatures from the infrared images at the locations of the light markers; and generating a thermal-spatial-point-cloud of the surface of the object which contains both spatial information and temperatures at the locations of the light markers.

In accordance with an aspect of the present disclosure there is provided a method of generating a thermal-spatial-point-cloud of the surface of the object not containing both the spatial information and temperatures at the locations of the light markers.

In accordance with an aspect of the present disclosure there is provided a method of generating a thermal-spatial-point-cloud of the interior of the object which contains both the spatial information and temperatures at points of the thermal-spatial-point-cloud in an interior region of the object.

General Concepts in Artificial Intelligence

Artificial intelligence (AI) is defined a field that studies and develops computer systems to do tasks that are regularly done by humans such as decision making, speech recognition, and other such tasks. Machine learning is a branch of AI that optimizes a performance measure of a task through learned examples or past experiences of that task. The task may include classification, regression, denoising, transcription or any other related task. The performance measure depends on the task and may include the accuracy, error rate, expected losses or any measure. The experience is based on the learning process, such as supervised and unsupervised learning, and depends on the performance measure and task.

Machine learning algorithms are made up of three main components: (i) the data, (ii) the predictions, and (iii) the model. The data D={x, (X, Y)} is the input and includes, but is not limited to, sensor data, experimental data, image data, and medical data. The data may be the testing set (X, Y) or the training set x. The predication $\tilde{y}$ is the output of the algorithm, and it may be of the same type as the input data or different depending on the task. The model may be probabilistic, stochastic, physics, chemical, or any other mathematical model which generates a governing equation or a collection of governing equations. The model may be of the form:

$$\tilde{y}=f(x;w) \quad (1)$$

where w is a parameter, or weight, which helps obtain the predicted value $\tilde{y}$ given the input x, and $f(\ )$ is the model approximated from the training set (X, Y). The model is dependent on the task and determines the performance measure that obtains the prediction through a cost or loss function. Sometimes a bias factor b is added in the absence of an input and may be obtained from expected values associated with the training set. The loss function may be the maximum likelihood estimation, mean square error, absolute error, cross-entropy, or any objective function. The machine learning algorithm takes the data to conduct the corresponding task through the model and minimizes the loss function to get the desired predictions. Equation 2 shows an example of a loss function in terms of the mean square error.

$$L(w) = \|Y - \tilde{y}_w\|_2^2 \quad (2)$$

The loss function is minimized with respect to the weight w through an optimizer. The optimizer may include, but is not limited to, a stochastic gradient decent optimizer, batch gradient decent optimizer, Adam optimizer, and AdaGrad optimizer. An example of an optimizer is shown through the following:

$$w = w - \eta \cdot \nabla_w L(w) \quad (3)$$

where $\eta$ is the learning rate and $\nabla_w L(w)$ is the gradient of the loss function with respect to w.

Deep learning is a subfield of machine learning that conducts the machine learning algorithm using a neural network. The neural network takes the tasks and divides it into smaller simpler tasks that are used to solve the overall problem. A neural network is a collection of mathematical functional mappings from the input to the output.

For example, given an input $x = \{x_1, x_2, \ldots, x_k\}$ and a model $f(\ )$ approximated from a training set (X, Y), we can map the input to a function $z = \phi(x)$ and then map it to $f(\ )$ to get the predicted output $\tilde{y} = f(z)$. This is done using the following:

$$z_i = \phi\left(\sum_{j=1}^{k} w_i^{in} x_j + b_i\right) \quad (4)$$

$$\tilde{y} = f\left(\sum_{i=1}^{n} w_i^{out} z_i\right) \quad (5)$$

where $w_i^{in}$ is the input weight at neuron i, $w_i^{out}$ is the output weight at neuron i, $b_i$ is the bias at neuron i, $\phi(\ )$ is the activation function at the neuron, $z_i$ is the output of the activation function, n is the number of neurons, and $f(\ )$ is the model used to obtain prediction $\tilde{y}$.

The concept of deep learning comes from using these neural networks with more layers of neurons giving the network more depth, which makes it a deep neural network. A general deep neural network will have the mapping $$a^{(0)} = x \quad (6)$$

$$a^{(1)} = h_1(W^{(1)} a^{(0)} + b^{(1)})$$

$$a^{(2)} = h_2(W^{(2)} a^{(1)} + b^{(2)})$$

$$\vdots$$

$$a^{(i)} = h_i(W^{(i)} a^{(i-1)} + b^{(i)})$$

$$\vdots$$

$$a^{(\ell)} = h_\ell(W^{(\ell)} a^{(\ell-1)} + b^{(\ell)})$$

where i is the layer number that goes from $i = 1, 2, \ldots, \ell$, $W^{(i)} = \{w_1^{(i)}, w_2^{(i)}, \ldots, w_N^{(i)}\}$ are the weights with different N number of neurons per layer i, $b^{(i)} = \{b_1^{(i)}, b_2^{(i)}, \ldots, b_N^{(i)}\}$ are the biases with different N number of neurons per layer i, $h_i$ is the activation function at each layer i, and $a^{(i)}$ is the output of the activation functions. These mappings, except for $a^{(0)}$ are called the hidden layers of the neural network and make up what is known as the fully connected layer. The mapping $a^{(0)}$ is known as the input layer of the network. The final mapping, also known as the output layer, is $$\tilde{y} = f(W^{(\ell+1)} a^{(\ell)}) \quad (7)$$

where $W^{(\ell+1)}$ is the final weight passed through the final activation/model function $f(\ )$ to get prediction output values $\tilde{y}$. The models may be the same as those used in machine learning such as classification and regression. The process for obtaining the predictions is the same as that in machine learning where a training and testing sets are used through the minimization of a loss function.

A specific type of neural network called physics-informed neural network (PINN) utilizes physical constraints, boundary conditions, and governing equations of a naturally occurring phenomenon to define the loss functions. The model learns these conditions and equations by minimizing the losses. The inputs to the neural network can be any physically measurable data and the output gives quantitative predicted values. The input and output values may include, but are not limited to, the coordinates of a characteristic-point-cloud and information about these points such as pressure, concentration, electric charge, and temperature values.

Table 1 shows a comparison between conventional neural networks and PINNs. Conventional neural networks learn from multiple images and ignore the boundary conditions or governing equations related to the transport modeling. This approach may be considered as empirical and information generated for biological systems may not be able to capture individual characteristics such as the spatial locations and shape of tumors. Many established neural network architectures are available and are widely used for classification purposes. PINNs take into account the boundary conditions and governing equations that govern the transports, for example in the biological systems. However, PINN is still under development and few stablished algorithms are found in the technical literature. Also, PINN has not yet been applied for detection of sources including cancerous tumors.

TABLE 1

Main differences between conventional Neural Networks and PINN

| Method | Advantages | Disadvantages | Features |
|---|---|---|---|
| Neural Networks | Well established and has many available generic algorithms | Requires significant training data Uses empirical approach Does not capture biological features of individual cases | Well established techniques Uses large amount of data to train the model |
| Physics-Informed Neural Network (PINN) | Non-empirical approach Relies on underlying physical phenomena and governing equations Not solely dependent on large training set Utilizes datasets generated from physics-based governing equations to train the model | Not established in many practical applications Currently in research phase requiring significant novel developments Still in nascent phase | Novel technique Uses physical constraints, boundary conditions, and governing equations to learn |

The present disclosure describes methods for detection of sources and their characteristics within a 3D object and the specific properties representative of the entire object, part of the object, or at different locations within the system. The source could be at least one of the heat, mass, energy, momentum, species, light, and other sources in a system that can be described by suitable governing equations. For example, a heat source adds heat in a specific region at specific locations in the system. In the case of a female breast, the cancerous tumor is a heat source that adds heat at the tumor location in the breast. An example of a mass source adds mass at the specific locations in the system. In a multicomponent system, different species may be present and a specific species may be added at a specific location. Similarly, there may be a drain for the mixture or selective removal of a species at a given location acting as a source or sink. Although the disclosure explains the method in relation to a source, it is equally applicable to a system with drain or removal of heat, mass, energy, momentum, and species in the system. Species include physical, biological, and chemical materials. Other forms of species are also included in different applications, for example, electrons in an electric field, etc. The source characteristics include parameters that relate to the spatiotemporal location of the source, the size or shape of the source, and the strength or magnitude of the sources. The specific properties in different regions of a system include but are not limited to density, viscosity, electrical conductivity, thermal conductivity, and diffusion coefficient. Other specific properties include temperature, chemical concentration, electric-potential, and velocity. A system has a governing equation for the transported phenomena. A system with a source has a governing equation with source terms accounting for the source. In the exemplary case of a thermal system with a region generating heat or energy, the governing equation is the energy equation including a source term accounting for the heat generated by a region. In another example considering a system generating mass due to a chemical reaction in a specific region, the governing equation is the mass conservation equation with a source term accounting for the mass generated in the specific region. Also, in modeling a breast with a region generating heat, or heat source, the governing equation may be the Pennes bioheat equation with source terms accounting for the perfusion rate heat generation and the metabolic heat generation.

In the present disclosure, the detection of the source and its characteristics is done with a physics-informed neural network (PINN) algorithm in the form of a PINN analyzer. The PINN analyzer uses a characteristic-point-cloud and the system properties for analyzing a system. The algorithm detects at least one of a presence of a source, a property of the source and a property of the system, wherein the source is at least one of heat, mass, momentum, energy, electrical field, and species in the system. The presence of a source indicates that a source is present in the system. The property of a source includes attributes of the source such as location of the source, size of the source, magnitude of the source, and any other attributes that define the source. The properties of a system include attributes that define system or different regions of a system. For example, the property of a system includes any of the properties that define the material in the system including physical, thermal, chemical, optical, electrical, magnetic, and other appropriate application-specific properties. The physics-informed neural network algorithm is applied to a selected portion of the characteristic-point-cloud in a system to perform inverse modeling of data from the selected portion of the characteristic-point-cloud. The algorithm incorporates physics-based governing equations that relate the characteristic property to the source. It can find the solution of the governing equations of the system that satisfy the data in the characteristic-point-cloud. In exemplary case of a breast object with a thermal-spatial-point-cloud, the PINN analyzer finds the heat source location and size that satisfy the Pennes bioheat equation and the thermal-spatial-point-cloud. The characteristic property is related to a source in the system. In case of a breast object, the characteristic property is temperature and is related to the heat source in the breast. The heat source may be at least one of the increased metabolic heat generation in a specific region such as a tumor in the breast and increased perfusion rate in breast tissue in a specific region of the breast. Finding the heat source that satisfies the thermal-spatial-point-cloud data is also called inverse modeling which is also called inverse PINN analyzer. The PINN analyzer also solves the governing equations with a given thermal-spatial-point-cloud and a given heat source characteristic to find temperature at different points in the system; this approach is called forwarding modeling or forward PINN analyzer. The PINN analyzer includes forward PINN analyzer and inverse PINN analyzer. The PINN analyzer detects the presence of the source and estimates the location and the size of the source. The size of the source is described by its characteristic lengths. The characteristics lengths represent the physical size of the object and might be one, two, or three dimensional. The PINN analyzer uses information related to values of specific properties in characteristic-point-clouds, boundary-conditions, and governing physics equations to train neural networks. A characteristic-point-cloud represents the specific property information at specific locations on the surface or regions of the object being investigated. The computational analyzer detects the presence or absence of a heat generating source inside the breast. In general, a heat source in a certain region of a breast is indicative of a metabolically active tumor. In general, depending on the level of metabolic activity, the heat source may be indicative of a malignant or a benign tumor. In general, malignant tumors have a higher metabolic activity as compared to non-cancerous tumors.

To perform the source detection, the PINN analyzer considers a neural network. The inputs are the spatial coordinates of the points in the characteristic-point-clouds and the values of the characteristic properties at these specific points. This is termed as a characteristic spatial-point-cloud. In the breast cancer detection algorithm, this is the thermal-spatial-point-cloud. The outputs are the values of specific properties at the spatial coordinates of the points. Noise filters are used through convolutional algorithms in the PINN analyzer to remove noise in the input data to improve the accuracy of prediction. Also, other relevant aspects related to data management or transformation are used through convolutional algorithms to improve the accuracy of prediction.

A residual value is defined at each point in the spatial-point-cloud as the difference between the predicted value and the target value of the specific property. A residual is also referred to as the loss. Residual values are assigned to each of the points in the characteristic-point-clouds based on the boundary conditions and governing equations that should be satisfied.

In the estimation of the residuals, the boundary conditions and the source terms in the governing equations are expressed in terms of the source characteristics such as its strength, location, and its characteristics lengths. Distribution functions including, but not limited to Gaussian functions, are used to express the distribution of the characteristic property in and around the source in spatial coordinates. Different types of spatial distribution functions may be applied. These also include distribution function that depend on attributes other that space such as time, or any other way or parameter applied to represent a characteristic or system property. The physics-informed neural network algorithm comprises of applying a spatial distribution function to at least one of the source terms in the physics-based governing equations to include at least one of the properties of the source in the physics-based governing equations as search variables. A search variable is defined as variable or a property or a parameter that is being estimated by the algorithm in the present disclosure.

In the present disclosure, driven-residuals are defined as the difference between the predicted value and the reference value of the specific property or search variable. The driven-residuals drive the search variables towards a specific solution or reference values. The driven-residuals drive the values of the source characteristics towards reference values, which is done by minimizing residuals that consider the difference between a reference value and the respective tumor characteristics. The reference value is a value that is used as a reference; for example, a reference location may be considered as the center of the breast or a corner region of a breast near the base. Similarly, other reference values may be specified for other source characteristics. The physics-informed neural network algorithm comprises of: implementing a driving condition to at least one of the search variables to drive it towards a reference value during the training of the physics-informed neural network to obtain a relation between the characteristic and the source within the system; and removing the driving condition after obtaining the relation during the training of the physics-informed neural network to obtain the trend representing the change of at least one of the search variables during the training process.

A total loss is defined in terms of the residuals of the spatial-point-clouds, such as the sum of the residuals. Other suitable functions are also be used to define the total loss based on individual residuals.

The PINN analyzer utilizes a training process which minimizes the total loss by using an iterative process. During the training process, the PINN analyzer finds the values of the source characteristics and specific properties that satisfy the boundary conditions and governing equations that are associated with the system being analyzed. The PINN analyzer is considered to be fully trained when the total loss value is below a prescribed convergence value or convergence limit and the variation of the training variables has reached an approximate asymptotic condition. In an exemplary embodiment, the prescribed converge value of $10^{-5}$ is used. Other values may be selected to improve the accuracy. The converge value in an embodiment is in a range between $10^{-4}$ to $10^{-8}$. Different convergence values may be used for specific systems.

A source is detected to be present in the 3D object when the values given by the PINN analyzer for the source location are inside the 3D object and the smallest characteristics length or equivalent diameter of the source is greater than a specific value. In case of detection of a heat source in a breast, this threshold criterion or any other criteria for the heat source size, which is considered as an equivalent size of the heat source in an embodiment, can be prescribed based on medical practices for identifying a heat source in the breast. In one embodiment, the prescribed criterion for equivalent heat source diameter as one of the heat source properties is set as a diameter greater than 0.5 mm, or preferably 1 mm or more preferably 2 mm. The prescribed criterion for the magnitude of the heat source can be obtained from Gautherie's data given by Eq. (58). For the location of the heat source, the prescribed criterion is the heat source being inside the object in one exemplary case. Prescribed criterion for other properties, such as thermal conductivity, are defined as the limiting values in a specific application. For example, for thermal conductivity in a breast, the limiting values are the values of thermal conductivity for fatty breast and extremely dense breast. The limiting size of the heat source may be changed by studying multiple cases from a physiological or medical standpoint. This limit for heat source equivalent diameter may be set between 1 mm and 5 mm. In general, presence of a heat source of a given magnitude or size is considered to represent a tumor or cluster of vasculatures resulting from angiogenesis or injury. Absence of a heat source of a certain magnitude or size is detected by the algorithm and is representative of absence of heat generating tissues, or a heat source, above a certain threshold criterion in the breast. In general, heat generating tissue and vasculature, individually or together, represent a heat source. The threshold of a heat source magnitude in healthy tissues is considered as baseline while identifying tissues with heat source magnitude above this threshold. Absence of a heat source may also be link to the behavior of the search variables such as not reaching an asymptotic condition or other conditions during iterations in the algorithm. In general, this may be considered to represent a breast without cancer, or healthy breast. In general, this information is useful in detecting presence or absence of a heat source that may be indicative of suspected malignancy in conjunction with other information and findings as established in specific breast cancer screening practices. In general, this information may be used as standalone or adjunctive technology to other modalities of breast screening such as mammography, ultrasound and MRI.

The current approach conducts modeling of a specific property within a 3D object, detects sources and its characteristics, and identifies specific properties with a high level of accuracy. As it is shown in the present disclosure, errors of 6 mm or less have been observed in identifying the tumor location and size in breast cancer detection. Error in size and location detection is reflective of the errors associated in accurately representing a biological system through mathematical equations. Advantages of the present disclosure include a standalone package that eliminates the need for numerical simulation software such as Ansys-Fluent, and complexities associated with mesh generation in these software packages. These advantages significantly reduce the cost, time, required effort and human errors in detecting and characterizing the tumor.

Breast Cancer Generalities

Breast cancer is associated with factors such as increased heat generation due to higher metabolism in the tumor and increased blood vessels resulting from angiogenesis. These factors lead to thermal effects in the breast. These factors taken individually or together, are ascribed as tumor heat generation in the present disclosure.

Heat transfer governing equations describe the heat flow temperature distribution behavior in a system. These equations can be applied to the thermal system of a breast and its surroundings to obtain a surface temperature map. In the case of healthy breasts, the heat generating tumor is absent and these maps correspond closely to infrared images obtained on the healthy breast surface. There are some alterations that are present due to factors such as blood vessels close to the breast surface, and other non-cancerous features including scars, deformities, and injury. There may be some additional factors which cannot be fully accounted for and result in reducing the positive predictive value of a breast cancer detection modality.

The relation between the heat generation and the breast surface temperature map can be obtained by thermal modeling of the breast using heat transfer governing equations and appropriate boundary conditions. The thermal modeling of breast cancer considers heat transfer governing equations that capture the interaction between the tumor generating heat, the breast tissue, chest wall, and the surrounding environment. The boundary conditions are supplied from the temperature data on the surface and at the base of the breast connecting to the chest. An iterative procedure is used to first generate the surface temperature map and compare it with the infrared images. The tumor characteristics are varied until agreement between the surface temperature map and infrared images is obtained within a set converge limit. In some previous applications, qualitative measures are used, such as observing patterns, and quantitative measures such as observing the difference and the gradient. The breast tissue may have different levels of fatty tissue that have different thermal properties from the healthy tissues. These factors are considered by the heat transfer governing equations. Other important factors to be considered are the boundaries of the breast such as constant temperature at the chest and the breast surface in contact with the ambient air. The breast surface temperature is obtained by considering infrared images as representative of the local temperatures on the breast surface at any given point. In the absence of detailed information on a breast, the properties such as thermal conductivity and blood perfusion rate in the breast, that are not affect by the heat source, may be considered homogenous. Separate values may be assigned in the region with the heat source.

The Pennes bioheat equation is most commonly used to model biological systems and is used to perform breast cancer thermal modeling. It is a modified transient heat conduction equation which accounts for the metabolic heat generated within the tissue and the heat transfer between the tissue and the blood flow. The model assumes that heat transfer between tissue and the blood only takes place in the capillaries and not in the larger arteries/veins. The capillaries act as a heat source or heat sink depending on the ambient temperature of the tissue. In case of muscles doing work, the excess heat generated is removed by the blood whereas the capillaries act as a heat source in dormant regions like the breast. The Pennes bioheat equation is given by:

$$\rho_t c_t \left( \frac{\partial T_t}{\partial t} \right) = \nabla \cdot (k_t \nabla T_t) + \omega_b \rho_b c_b (T_a - T_t) + \dot{q}_m \quad (8)$$

where ρ, c and k stand for density, heat capacity and thermal conductivity respectively. The subscripts t, b and a stand for tissue, blood and artery. The blood perfusion rate, ω is the volumetric flow rate of blood for a unit volume of tissue and $q_m$ is the metabolic heat generation rate. In an embodiment, in modeling of a breast with a heat source, Eq. (8) is the governing equation and the blood perfusion rate term and the metabolic heat generation term are heat source terms of the governing equation. In this embodiment, there are two heat sources in the breast. A heat source may appear in the breast because of a metabolically active tumor or increased vasculature due to angiogenesis, or both in a tissue region. These two effects are combined in a region referred to as the tumor region or tumor. Equivalent diameter of the heat source represents the diameter of this tumor. Modified forms of the Pennes equation or other equations representing the temperature distribution, perfusion rate, and metabolic activity may be used in place of the Pennes equation. In general, a scale analysis reveals that the perfusion rate term, in one example, is about four times greater than the heat generation term. In an embodiment, a large tumor may be considered with high perfusion rate and zero or low metabolic activity to represent a smaller tumor with higher metabolic activity with a smaller perfusion rate. Such analysis may be able to detect high angiogenesis with higher perfusion rate, which is expected to precede actual tumor formation.

The properties in the tumor and in the surrounding region are set same, or preferably different, as these properties are modified in the presence of cancer. At the metabolically active tumor location, the perfusion rate and the metabolic heat generation have significantly higher values relative to regions with healthy tissue. For instance, the perfusion rate is up to 1000 times higher and the heat generation in up to 40 times higher in the tumor region relative to the healthy region in one embodiment. Applying the heat transfer analysis to analyze a breast in earlier approaches required a digital model of the breast. The digital model was obtained by using MRI scans or other techniques such as using a stereo-vision camera or mold. Also, the heat transfer analysis required a numerical solver and computer simulation. Numerical software packages, such as Ansys-Fluent, or similar numerical solvers using grid-based finite element or finite difference solution techniques were employed. Conventionally, in the existing literature, the digital breast model is used to create a mesh with computational cells. The computational cells are the regions where the governing equations are solved in a discretized way. The mesh is generated by simulation software such as ICEM, Gambit, Meshlab, or other available or developing meshing platform. The governing equations are discretized using the computational cells. The governing equations are discretized using numerical methods such as finite-volume, finite element, finite differences, and boundary element methods.

The discretization of the governing equations with the numerical method leads to the modeling of the thermal breast cancer behavior. This is usually done with commercial simulation packages, open-access simulation packages, by developing in-house scripts/programs/algorithms, or any combination of these. For example, Ansys-Fluent is a commercial software package that can be used to analyze the breast and generate simulated breast surface thermal profile. For a specific tumor characteristics and tissue properties, the computer simulation software generates a particular simulated surface temperature profile.

In the available models in the literature, by placing an initial guess of the tumor characteristics (tumor size and location) and the tissue thermal properties (at the tumor location and in the healthy tissue regions), an initial breast surface temperature can be obtained using numerical packages. A method accepts or rejects the guess of the tumor location by comparison of the thermal images from the simulation and the infrared images. If the difference between the two temperature sets is too large, for example greater than 0.1° C., a revised guess is used to generate a new breast surface temperature from the numerical model. The cycle repeats (iteration) until the temperature difference between the simulation and form the infrared images is below a certain threshold. The method optimizes the tumor characteristics and tissue thermal properties in a way that the temperature difference decreases with the number of iterations. Optimization methods used in the past to update the values of the parameters include Levenberg-Marquardt algorithm, the gradient descendent method, the conjugate gradient method, and other conventional optimization techniques. These methods use the geometrical description of the digital breast model and a numerical software package along with the infrared images.

Using PINN Analyzer for Forward Modeling in the Present Disclosure

The PINN analyzer is used in this disclosure to conduct modeling of a specific property in an object within a system. This is called as solving a forward problem in the current disclosure. In some embodiments of the current disclosure, specific properties in a system include, but are not limited to, temperature, chemical concentration, velocity, intensity. For instance, a specific property could be light intensity in a system containing light. The specific properties that could be considered may form part of equations. In the case of a problem involving specific properties, these equations become the governing equations. FIG. 1 shows a diagram of the process to perform the modeling of a specific property. FIG. 1 shows the process to conduct forward modeling with the PINN analyzer. Method A receives spatial-point-cloud regions, Method B defines the form of the losses, and Method C minimizes total loss with the help of the PINN analyzer algorithm to predict the value of the specific property at the points in the received point-clouds. As is shown in FIG. 1, the following Methods, A, B, and C, are applied to estimate the values of a specific property at the points in the corresponding spatial-point-cloud:

Method A: receives multiple characteristic-points-clouds that define the interior region, the base region, the surface region, and any other regions that form part of the object of interest. A characteristic-point-cloud is a group of points located at random locations that lie in a specific region of the system.

Method B: defines the form of the losses to be minimized.

Method C: utilizes a neural network to minimize the losses.

Method A receives characteristic-point-clouds of a system to model the various regions in a system, wherein the characteristic-point-clouds of the system includes characteristic-point-clouds of the objects in the system including characteristic-point-clouds in different regions of the object. A system is defined by system boundaries and may include space, region, objects, and surfaces that are being analyzed. Example of a system include a female breast, surface of a female breast, interior region of a female breast, surroundings of a female breast, base of a female breast, and any object of interest. The female breast in the above example may be replaced by any biological part of a human or an animal body. The characteristic-point-clouds may contain spatial information, temporal information, specific property information or a combination of the prior at individual points in the system. A characteristic-point-cloud could be part of a thermal system, a fluid transport system, chemical pollution system, biological system, a body part, any other object, or any system. An example of a characteristic-point-cloud is a spatiotemporal-point-cloud that contains spatial and temporal information which reduces to spatial-point-cloud under steady-state and at a specific time condition, within a system. Another example is a thermal-spatial-point-cloud, which contains information of the temperature at the points in the spatial-point-cloud at steady-state conditions. Examples of characteristic-point-cloud include spatial-point-cloud, thermal-spatial-point-cloud, concentration-spatial-point-cloud, velocity-spatial-point-cloud, density-spatial-point-cloud, phase-volume-fraction-spatial-point-cloud, and other point-clouds that describe specific properties of a system in a given application. Other characteristic-point-clouds with different information may be used, the information could relate to pressure, potential, and chemical concentration. Regions that could form part of an object include (i) the surface, (ii) the interfaces with surroundings or other objects, (iii) the interior region, (iv) the exterior region. In the exemplary case of a breast, the breast surface, the breast-chest interface, or the ambient-air represent different regions. Other regions can be also considered. Other regions can be also considered. Point-clouds representative of the system being analyzed are used in the solution procedure of the PINN analyzer. In an embodiment, the received characteristic-point-clouds can be created by object reconstruction techniques. Object reconstruction techniques include extraction of point from a digital model such as a .stl file to generate a spatial-point-cloud. The characteristic-point-cloud, such as a thermal-spatial-point cloud, can be created by registration of the digital model and the infrared images using data registration techniques when the characteristic property is temperature. After registration, information of the spatial location of the points and its corresponding temperature can be extracted to generate a thermal-spatial-point-cloud.

In other specific embodiments, the object is a human body part such as a female breast, torso, head, and other parts. The object may also include a body of fluid, a physical object, machinery, device, and other objects which are analyzed by using appropriate boundary conditions, variables and governing equations. The breast is connected at the base to the chest of the female person. This method described for the breast can be applied to different body parts of humans or animals and to other physical objects.

Figure 2:
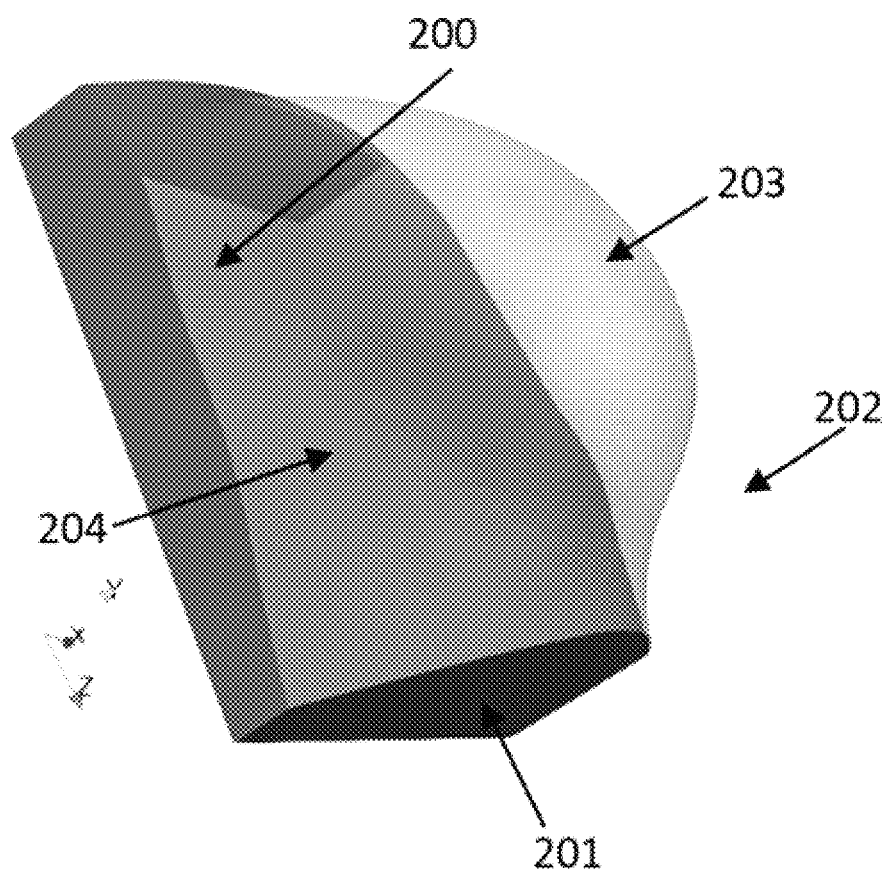
FIG. 2 shows regions that form part of the object within a system such as a female breast.

FIG. 2 shows the main regions that form part of a breast object. The main regions that form the object are: (i) the base-1 region 200, (ii) the base-2 region 201, (iii) the surrounding region 202, (iv) the surface region 203, and (v) the interior region 204 inside the breast. Each region in the object might experience different thermal boundary conditions. For instance, the base-1 region might have a constant temperature given by the body chest, the base-2 region may be insulated (zero heat flux normal to the interface), the surrounding region could have a constant temperature given by the ambient, the surface region could be in contact with the ambient with convection heat transfer, the interior region is modeled with the governing equations that model the transport of heat in the tissue such as the Pennes bioheat equation. Other boundary conditions or governing equations can be included in the modeling of the specific properties in an object. For instance, a variable or constant mass flux, a velocity condition, a source generating heat or mass, etc.

Figure 3A:
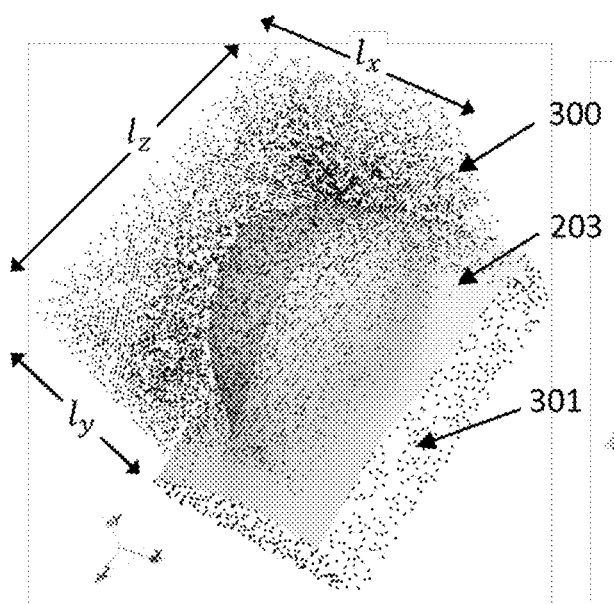
FIG. 3A shows the spatial-point-cloud of exterior region and the spatial-point-cloud of base-2 region and FIG. 3B shows the Spatial-point-cloud of interior region in the breast.
Figure 3B:
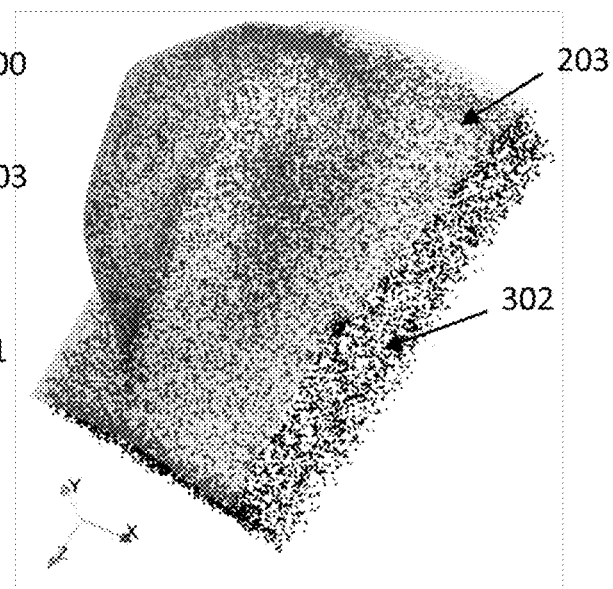

FIG. 3 shows the spatial-point-cloud of the exterior region 300 of the breast, or the breast object, and the spatial-point-cloud that corresponds to the base-2 region 301 of the breast object. In addition, FIG. 3 shows the spatial-point-cloud of the interior region 302 of the breast object. The dimension of the spatial-point-cloud of the exterior region are $l_x$, $l_y$, and $l_z$ as shown in FIG. 3. Points might be defined in spatial and temporal space. A spatial point is fully defined by the coordinates x, y, z, in a Cartesian system. A spatiotemporal point is fully defined by the coordinates x, y, z, in a Cartesian space and by the time t in a temporal space.

The number of points in a characteristic-point-cloud depends mainly on the size of surface area, the size of the volume of the region, the length of the temporal domain, or on the condition or equation that relates to the modeling of the property in the system.

Optimal number of points in the characteristics-point-clouds is identified by considering the way the predicted specific property changes with the number of points. The following process is recommended: (i) propose a number of points in the characteristic-point-cloud, (ii) train the PINN analyzer to predict the specific property of interest with the defined number of points, (iii) retrieve the predicted specific property of interest (predicted transport-property-A), (iv) increase the number of points in the characteristic-point-cloud, (v) retrieve the predicted specific property of interest (predicted transport-property-B), (vi) evaluate the difference between the predicted transport-property-A and the predicted transport-property-B, (v) assign the values of the transport-property-B to the transport-property-A, (vi) go to step (iv). This cycle repeats until the evaluated difference becomes lower that a specified threshold value. A threshold value of 10-3 is recommended. A value below 10-3 might give a good estimation of the optimal number of points in the characteristic-point-cloud. A value above 10-3 can be used to get a correct optimal number of points as well.

Method B identifies the form of loss values in each of the characteristic-point-clouds. The PINN analyzer minimizes the loss values. This minimization process is also referred as "training of the PINN analyzer" in the present disclosure. A Physics-Informed Neural Network (PINN) machine learning algorithm in the form of a PINN analyzer is utilized to minimize the loss values. In the present disclosure, the neural network is part of a machine learning system. Various machine learning platforms could be adopted to train the PINN analyzer. Some of these machine learning platforms include TensorFlow, PyTorch, Python, NeuralLab and MATLAB. Other machine learning platforms may be utilized.

In the forward problem, the minimization of the loss values during the training of the PINN analyzer leads to the modeling of the specific properties in a 3D object. Each point in the characteristic-point-cloud should satisfy boundary conditions or system-equations that relate to the modeling of the specific property in the system. To satisfy the boundary conditions or governing equations, a loss value is assigned to each point in the characteristic-point-clouds. The total loss in each region is estimated from individual loss values. The loss values and total loss in each characteristic-point-cloud region are estimated based on boundary conditions or governing equations that should be satisfied. After the training of the PINN analyzer is completed, the output of the trained PINN analyzer indicates the values of the specific properties at the points in the characteristic-point-cloud that satisfy the boundary conditions and governing equations. Boundary conditions that could be satisfied include but are not limited to: (i) a constant value such as a constant temperature, (ii) convection, (iii) insulation, (iv) symmetric, (v) periodic, (vi) radiation, (vii) electrochemical reactions, (viii) mass transfer. Governing equations that could be satisfied include but are not limited to: (i) momentum equations such as the Navier-Stokes equations, (ii) energy transport, (iii) mass conservation or continuity, (iv) chemical species transport, (v) electrochemical reactions, or (vi) general transport governing equations. The general governing equations include, but are not limited to, advection equations, diffusion equations, advection-diffusion equations, and equations with sources, such as the Pennes bioheat equation or a modified Pennes bioheat equation. Other suitable governing equations that are representative of the specific processes can be applied in other systems. The governing equations include a single equation, a system of equations, linear or non-linear differential equations, ordinary or partial differential equations, or any other form of equations describing relationships between variables and system properties. These governing equations could define transient or steady state conditions. Other special governing equations that could be satisfied include but are not limited to: (i) functions that consider the difference between reference values of source characteristics and the variables of the tumor characteristics to be identified, (ii) convolutions to remove noise, (iii) convolutions to read parameters related to the transport of a property in an object. The boundary conditions and governing equations used to estimate the residuals might consider scaling factors that modify the dimensions of the system both in space and time. Also, scaling factors can be used to modify the magnitude of the specific properties. Usually, the scaling factors are estimated in a way that adjust the range of the maximum and minimum values of one or all of the spatial, temporal, and specific properties. A range of −10 to 10 is acceptable, a range of −1 to 1 is preferred, and a range of 0 to 1 is another preferred range. Other ranges are also possible, depending on the desired prediction accuracy of the PINN analyzer and other considerations such as computational time or the configuration of the PINN analyzer.

In other embodiments, the PINN analyzer is used to detect sources in non-Cartesian coordinates including and not limited to spherical, cylindrical, orthonormal. Other spaces include spaces represented by imaginary numbers. Decomposition techniques are applied to train the PINN analyzer in other spaces. Applicable data decomposition techniques include and are not limited to proper-orthogonal decomposition and dynamic mode decomposition.

For the object shown in FIG. 2, residual values should be estimated at each point in the various characteristic-point-clouds of different regions in the system. In the exemplary case of breast cancer detection, the residual values for the points in the characteristic-point-clouds that define the base-region connecting the breast to the chest could be estimated from the condition of a constant base temperature as:

$$res_{base-1,i} = T_{pred,i} - T_{base,i} \quad (9)$$

where $T_{pred,i}$ is the temperature of point i predicted by the neural network in the PINN analyzer at the base-1 and $T_{base,i}$ is the experimentally measured or prescribed base temperature of point i. The predicted temperature is estimated by minimizing the total loss. The values of the temperature T at the base-1 could be the measured value or the prescribed value. Also, a scaled value of the measured value or prescribed value is assigned to T. Scaled values improve the minimization process. Similarly, the residual values for the points in the characteristic-point-clouds that define the base-2 region that connects the breast to the side tissues are estimated from the insulated condition as:

$$res_{base-2,i} = k_b \left.\frac{\partial T}{\partial n}\right|_{pred,i} - k_b \left.\frac{\partial T}{\partial n}\right|_{base-2,i} \quad (10)$$

where $k_b$ is the tissue thermal conductivity in the base-2 region, n is the direction normal to the surface defined by the base-2 region at the point i. The first term on the right-hand side of Eq. (10) represents the heat flux at point i predicted by the neural network in the PINN analyzer and the second term represents the actual heat flux. In the case of an insulated boundary condition at the base connected on sides of the breast, the temperature gradient along the normal direction is equal to zero. The PINN analyzer may be applied to the breast object consisting of the breast surfaces in the multi-view images of the object and a base-1 surface connecting breast to the chest. In an embodiment, the base-2 region is not used in the PINN analyzer. The temperature gradient can be estimated with numerical approximations such as first order or second order approximations. The residual values for the points in the characteristic-point-clouds that define the exterior-region are estimated from the ambient temperature as:

$$res_{out,i} = T_{pred,i} - T_{out,i} \qquad (11)$$

where $T_{out,i}$ is the ambient temperature at the point i in the outside characteristic-point-cloud. The residual values for the points in the characteristic-point-clouds that define the surface-region are estimated from the convective flux condition as:

$$res_{surf,i} = k_s \frac{\partial T}{\partial n}\bigg|_{pred,i} - h_s(T_{pred,i} - T_{amb}) \qquad (12)$$

where $k_s$ is the tissue thermal conductivity in the surface-region, $h_s$ is the convective coefficient at the surface-region, $T_{amb}$ is the ambient temperature of the exterior-region. The residual values for the points in the characteristic-point-clouds that define the interior-region are estimated from the heat transport equation that governs the heat transfer in the interior-region. In the case of the Pennes bioheat transport equation, the residual values in the interior region are given by:

$$res_{inte,i} = \frac{\partial^2 T}{\partial x^2}\bigg|_{pred,i} + \frac{\partial^2 T}{\partial y^2}\bigg|_{pred,i} + \frac{\partial^2 T}{\partial z^2}\bigg|_{pred,i} + \qquad (13)$$

$$\frac{\rho_i C_i}{k_i}\omega_{b,i}D^2(T_b - T_{pred,i}) + \frac{2D^2}{k_i(T_{ma} - T_{mi})}\dot{q}_{m,i}$$

where T is an scaled temperature, x, y, and z represent the Cartesian scaled coordinates of the point i in the interior characteristic-point-cloud, $\rho_i$ is the density of blood at the point i, $C_i$ is the specific heat of blood at the point i, $k_i$ is the tissue thermal conductivity, $\omega_{b,i}$ is the blood perfusion rate, D is a scaling parameter, or the reference diameter, $T_{ma}$ is an expected maximum temperature, $T_{mi}$ is an expected minimum temperature, $\dot{q}_{m,i}$ is the metabolic heat generation at the point i. The properties in the tumor and in the surrounding region may be set differently as these are modified in the presence of tumor. At the cancerous tumor location, the perfusion rate and the metabolic heat generation have significantly higher values relative to the regions within the healthy tissue. For instance, the perfusion rate is up to 1000 times higher and the heat generation in up to 40 times higher in the tumor region relative to the healthy region. The scaling parameter, or reference diameter, D, is estimated based on the maximum lengths of the object along the Cartesian directions.

It is possible to include other forms of the governing transport equation in Eq. (13). For instance, a modified bioheat equation where the heat generation and the perfusion rate have a spatial or transient distribution function such as a Gaussian distribution. The heat conduction equation with an effective conductivity is another possible option. In general, the governing equations have the form of a differential equation or a discretized form of a differential equation. The governing equations could be defined as a group of equations or as a single equation. Also, the governing equations could consider Cartesian coordinates, spherical coordinates, cylindrical coordinates, or any other type of coordinate system. Other distribution functions to express the thermal properties include Gaussian, gamma, beta, uniform, a step value or sharp distribution, or combinations thereof.

Additional residuals can be defined to include other boundary conditions that are not related to spatial regions of an object. It is possible to create other non-spatial and non-thermal boundary conditions. For instance, a residual could define the difference between the value of a training variable and the value at the reference point.

The residual value at an interior point is equal to the residual of the equation that satisfies the heat transfer condition at the location of the interior point. The information in base includes information in at least one of base-1 and base-2. The residual value at a base point is equal to the residual of the heat transfer condition at the location of the base point. The residual value at a surface point is equal to the residual of the heat transfer condition at the location of the surface point. The magnitude of the loss values is proportional to the accuracy of achieving that condition in the point-cloud. The magnitude of the loss value of a point-cloud region is computed with governing equations that represent the thermal boundary conditions in the region defined by the point-cloud.

The magnitude of the losses in each of the point-cloud regions is estimated based on the residual values of the individual points in the characteristic-point-clouds. The loss in one region of the system or of the characteristic-point-cloud is the sum of the losses at individual points in that region. For instance, it is possible to estimate the magnitude of the losses of each region as the average of the square value of the residuals. In this case, the magnitude is computed as:

$$loss_{base-1} = \frac{1}{N_{base-1}} \sum_{i=1}^{N_{base-1}} (res_{base-1,i})^2 \qquad (14)$$

$$loss_{base-2} = \frac{1}{N_{base-2}} \sum_{i=1}^{N_{base-2}} (res_{base-2,i})^2 \qquad (15)$$

$$loss_{out} = \frac{1}{N_{out}} \sum_{i=1}^{N_{out}} (res_{out,i})^2 \qquad (16)$$

$$loss_{surf} = \frac{1}{N_{surf}} \sum_{i=1}^{N_{surf}} (res_{surf,i})^2 \qquad (17)$$

$$loss_{inte} = \frac{1}{N_{inte}} \sum_{i=1}^{N_{inte}} (res_{inte,i})^2 \qquad (18)$$

where $N_{base-1}$, $N_{base-2}$, $N_{out}$, $N_{surf}$, $N_{inte}$ correspond to the total number of points in each of the considered characteristic-point-clouds. There are other possible alternatives to compute the magnitude of the losses based on the residual values of each point. For instance, instead of computing a mean of the residuals, the loss can be defined as the sum of the residuals, or as the maximum value of the residual in the characteristic-point-cloud.

The total loss is given by the sum of the losses:

$$loss_{total} = loss_{base-1} + loss_{base-2} + loss_{out} + loss_{surf} + loss_{inte} \qquad (19)$$

Another alternative to compute the total loss is to consider weights that multiply the individual values of the losses to give more strength to certain parts of the point-cloud regions during the training of the PINN analyzer. Other possible ways to compute the total loss include sum of the squares, maximum of the squares, mean of the absolutes, and combination with weight functions of these and other individual techniques. Also, any possible combination of the individual losses can be used to compute the total loss. Additional loss terms representing losses at different surfaces or regions may be added. Similarly, some of the loss terms in Eq. (19) may be removed if the corresponding surfaces or regions are not being analyzed.

Method C uses the PINN analyzer to minimize the total loss and the individual losses. The PINN analyzer minimizes the total loss given by Eq. (19) with the help of a machine learning algorithm. The machine learning algorithm in the PINN analyzer consists of a connected neural network with inputs, an input layer of artificial neurons, multiple hidden layers of artificial neurons, an output layer of artificial neurons, and outputs. Each layer is interconnected with weights and biases. Convolutional layers may also be included before the input layer, in between the hidden layers, or after the output layer of the neural network. Also, the neural network minimizes the total loss with an optimizer.

The inputs are the spatial location of the points in a coordinate system. The coordinate system may include, but is not limited to, Cartesian, spherical, and cylindrical coordinate systems. Also, it is possible to have inputs that provide information regarding the object of interest. For instance, these inputs might define the interior or the exterior regions. The outputs are the predicted specific property at the location of the input points. Also, the PINN analyzer might consider more than one output. For instance, it is possible to consider an output that defines the presence of a heat source such as 1 if the heat source is present and 0 if the heat source is not present, or a distribution that ranges between 1 and 0. Other outputs related to the modeling of the transport variable in the object might be considered.

In the PINN analyzer, an optimizer minimizes the total loss. In the PINN analyzer, an optimizer minimizes the total loss. By minimizing the total loss, the individual losses get minimized as well. The minimization of the total loss relies on reducing the magnitude of (i) the residuals that consider the difference between the value given by the PINN analyzer at the interior of the breast to the temperatures given by the modified Pennes bioheat equation at the interior spatial-point clouds, and (ii) the residuals that consider the difference between the PINN analyzer generated temperatures at the base of the breast and at the space surrounding the breast, and the temperatures at the respective points in the thermal-spatial-point-cloud. Minimization of the loss relies on reducing the residuals that consider the difference between the predicted values of the PINN analyzer and the characteristic values of the characteristic-point-clouds, which is done by an iterative process. By minimizing the residuals, the magnitude of the residual values decreases. The decrease in the magnitude allows (i) matching the temperatures given by the PINN analyzer at the interior of the breast to the temperatures given by the modified Pennes bioheat equation at the interior spatial-point clouds, and (ii) matching the temperatures given by the PINN at the chest of the breast to the temperatures at the corresponding points in the thermal-spatial-point-cloud.

During the minimization process, also known as training process, the PINN analyzer adjusts the weights and biases that interconnect the different layers in the neural network. The Adam optimizer is commonly adopted, but other optimization algorithms are available. Other possible optimizers include Adadelta, Adagrad, Adam, Adamax, FTRL, NAdam, RMSprop, and Gradient decedent. Other possible optimizers are in the form of modules in machine learning platforms. The optimizer adjusts the weights and biases of the neurons by performing an iterative process. Initially, the PINN analyzer assigns values to the weights and biases of the neurons, and to the temperatures at the given input coordinates. The iterative process starts when the PINN analyzer estimates the losses based on the values of the weights and biases and the temperatures. The PINN analyzer adjusts the values of the weights and biases of the neurons by following a specific direction and a new set loss value is estimated. The optimizer compares the loss values after and before the adjustment of the weights and biases. If the loss gets lower, then the optimizer adjusts the weights and biases by following the same direction. If the total loss gets higher, then the optimizer adjusts the of the weights and biases by following a different direction. A new set of specific properties is estimated with the updated PINN configuration. The PINN analyzer repeats this cycle until the total loss and the individual losses are below a threshold value. Preferably, the minimum threshold value is 10-3. A higher level of accuracy in predicting the transport variable can be achieved with a threshold value is 10-7. Higher or lower threshold values can be implemented. Also, it is possible to define multiple optimizers instead of a single optimizer. For instance, an optimizer-A might reduce a set of losses and an optimizer-B might reduce a second set of losses. An optimizer-A might be in charge of reducing the losses that come from a region of the object and an optimizer-B might reduce the losses that come from a different region of the object. Preferably, a single optimizer should be used. Two optimizers might lead to a faster training of the PINN analyzer. Three or more optimizers might help with the speed of the training of the PINN analyzer, but it might reduce its accuracy.

Machine learning platforms are commonly used to train neural networks. The PINN analyzer may be trained in any machine learning platforms. Some of the examples of the training platforms include TensorFlow, PyTorch, Python, NeuralLab, and MATLAB. Any suitable platform may be used.

The PINN analyzer minimizes the total loss with an iterative method. After each iteration the, the PINN analyzer predicts a value of the specific property at the points in the characteristic-point-clouds. In the case of breast cancer modeling, the specific property is given by the tissue temperature. The PINN analyzer ends the iterative process when the total loss and each of the individual losses are below prescribed threshold values.

Combining the PINN Analyzer for Forward Modeling with an External Inverse Model

The PINN analyzer is also used to conduct the modeling of a specific property in an object and to use an external inverse model available in literature using techniques such as the Levenberg-Marquardt algorithm to detect a source and its characteristics in an object and specific properties of a system. The object has a specific property of interest. The source characteristics relate to the spatiotemporal location of the source, the size or shape of the source, and the strength or magnitude of the source. The specific properties of a system include but are not limited to density, viscosity, electrical conductivity, thermal conductivity, and diffusion coefficient. Other specific properties relate to temperature, chemical concentration, electric-potential, and velocity.

The PINN analyzer might detect sources and its characteristics within a system that generate or consume heat, mass, pollutant, electrical forces. Other examples of sources include momentum, chemical reactions. The PINN analyzer might detect sources and its characteristics that remain in a fixed location during a period of time that due to its generation or consumption affect the surrounding environment. In these cases, the method identifies the spatial location of the source. The PINN analyzer might detect sources and its characteristics that change its location during a time frame such as dynamic ships that lead to pollution of surrounding that is unbounded. In these cases, the method identifies the spatial and temporal location of the source, the velocity of the source, or the acceleration of the source. The PINN analyzer might detect sources and its characteristics that change its shape or that remain with a constant shape. The parameters should be defined to characterize the size of the source. These parameters include an equivalent diameter, characteristic lengths such as an axial or transversal length. The PINN analyzer might detect sources and its characteristics with a constant or variable generation or sink rate. The magnitude of the sources is estimated as a constant value or as a value that depends on time. Also, the PINN analyzer might detect sources with a generation or sink rate that depends on the spatial location. The magnitude of the source is estimated as a function of the spatial coordinates.

The source characteristics might include parameters that relate to the spatial and temporal location of the source and to its shape and size. Other parameters that relate to the source magnitude and duration. Parameters that relate to the source interaction with the surrounding areas. Parameters that relate to the source behavior in the object.

Figure 4:
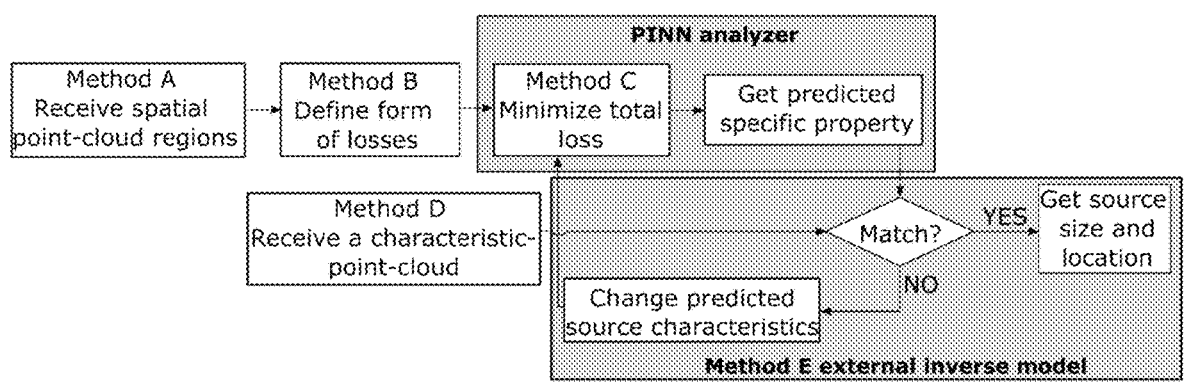
FIG. 4 shows the coupling of the PINN analyzer with an external inverse model.

FIG. 4 shows a diagram of the process followed to perform the transport modeling and the detection of a source with an external inverse model. To perform this task, in addition to the described Method A, Method B, and Method C, the following Methods, D and E, are implemented:

Method D: receive a characteristic-point-cloud with information with information of the specific property on the surface of the object. The specific property in this characteristic-point-cloud is affected by the source, if present inside the object. The received characteristic-point-cloud may contain information of the specific property at other regions of the object.

Method E: define the inverse algorithm that identifies the source and its characteristics by comparing the values in the received characteristic-point-cloud with the estimated values by the PINN analyzer at the respective points.

Method D receives a characteristic-point-cloud. In the exemplary case of breast cancer under steady-state conditions, the received characteristic-point-cloud consists of a thermal-spatial-point-cloud. A thermal-spatial-point-cloud consists of a group of points where each point has an assigned temperature. A pressure-spatial-point-cloud consists of a group of points where each point has an assigned pressure. The assigned value usually is experimental measured. In the exemplary case of a breast, the temperature in the thermal-spatial-point-clouds could be estimated from an infrared camera. It is possible to create a synthetic temperature with the help of a forward model such as a computer simulation or an artificial intelligence model such as the PINN analyzer. Gaussian noise is usually added to the temperature given by the forward model. Other types of noise are also possible. Also, the thermal-spatial-point-cloud might consider a small subregion of received characteristic-point-cloud. Multiple subregions of the received characteristic-point-cloud can also be considered as thermal-spatial-point-clouds.

In this approach, the external inverse algorithm utilizes the predicted values of the specific property in the characteristic-point-cloud to identify the source characteristics. The process to couple the PINN analyzer with an external inverse model is illustrated in FIG. 4. The steps are as follows: (i) guess initial values for the source characteristics, (ii) the PINN analyzer takes the source characteristics as inputs and performs forward modeling to predict the specific properties at the points in the characteristic-point-cloud of the object, (iii) the inverse model compares the predicted and the experimental or available values in the characteristic-point-cloud to guess a new set of values for the source characteristics, (iv) check for convergence and take the new set of guessed source characteristics and go to sept (ii) if not converged. In the exemplary case of heat source detection in a breast, this cycle repeats until the difference between the estimated values from the PINN analyzer and temperatures from the infrared camera in the thermal-spatial-point-cloud is below a minimum threshold value. Preferably, the minimum threshold value is $10^{-3}$. A higher level of accuracy in predicting the specific property can be achieved with a threshold value of $10^{-7}$. Higher or lower threshold values can be implemented.

To perform the comparison between predicted and experimentally measured values in the thermal-spatial-point-clouds, it is also possible to use parameters that relate to the value of the specific property instead of using the specific property directly. For instance, the intensity of the image generated by a figure generated from the value of the specific property. Alternatively, the specific property could be decomposed into main or secondary modes that relate to the values of specific property.

In the exemplary case of breast cancer, the external inverse model initially places an initial guess of the tumor characteristics (tumor size and location) and the tissue thermal properties (at the tumor location and in the healthy tissue regions), an initial breast surface temperature can be obtained. A method is generated to accept or reject the guess of the tumor location by comparison of the thermal images from the simulation and form the infrared images. If the difference between the two temperature sets is too large, a new guess is proposed to generate a new breast surface temperature. The cycle repeats (iteration) until the temperature difference between the simulation and form the infrared images is small. The method optimizes the tumor characteristics and tissue thermal properties in a way that the temperature difference decreases with the number of iterations.

Optimization methods to update the values of the parameters in the external inverse model include Levenberg-Marquardt algorithm, The Gradient Descendent Method, The Conjugate Gradient Method, The Simulated Annealing Method, Particle Swarm Optimization, Ant Colony Optimization, Sequential Quadratic Programing, Artificial Neural Networks, Support Vector Machines, Genetic Algorithms, other numerical methods, or a combination of these methods.

Figure 5:
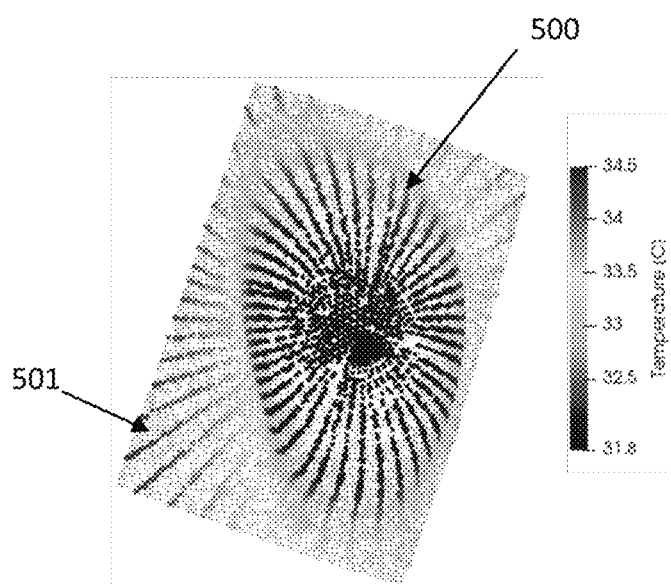
FIG. 5 shows a thermal-spatial-point-cloud in a subregion that comes from a spatial-point-cloud of a breast surface region.

FIG. 5 shows a thermal-spatial-point-cloud 500 that corresponds to the spatial-point cloud of the surface region 501 of the breast object. 500 shows the temperature and the group of points in the thermal-spatial-point-cloud. The thermal-spatial-point-cloud 500 is a subregion of the spatial-point cloud 501.

Using PINN Analyzer for Inverse Modeling

The PINN analyzer can be used to conduct the modeling of a specific property in a 3D object within a system and to directly detect a source and its characteristics in an object or a system. The input to the PINN analyzer is a characteristic-point-cloud. In addition, in this approach, the PINN analyzer can estimate or predict specific properties of the system including but not limited to viscosity, the thermal conductivity, the electrical conductivity, or the diffusion coefficient. In this approach, the boundary conditions and governing equations that govern the transport of a property in an object are expressed in terms of the source characteristics. In the exemplary case of breast cancer, the source heat generation in the Pennes bioheat equation could be expressed as a Gaussian function in terms of the tumor location and size in one embodiment. Then, the residuals are function of the source characteristics and the losses are computed with these residuals. By minimizing these losses with an optimizer, the PINN analyzer finds the values of the source location and size. In the present disclosure, the source characteristics to be identified are referred to as "training variables". The values of the training variables are determined during the training of the PINN analyzer. It is also possible to use the PINN analyzer to estimate the thermophysical properties of the tissue by defining these properties as training variables.

The PINN analyzer detects sources that generate or consume one or more of the heat, mass, energy, pollutant, momentum, light, species, electrical sources, and similar sources. The PINN analyzer detects sources that remain in a fixed location during a period of time that due to its generation or consumption affect the surrounding environment. In these cases, the method identifies the spatial location of the source. The PINN analyzer detects sources that change its location during a time frame such as dynamic ships that lead to pollution of surrounding that is unbounded. In these cases, the PINN analyzer identifies the spatial location of the source that changes as a function of time, the velocity of the source, or the acceleration of the source. The PINN analyzer detects sources that change its shape or that remain with a constant shape. Specific parameters are used to define the size of the source. These parameters include a volume based equivalent diameter, a mass based equivalent diameter, characteristic lengths such as an axial or transversal length in different directions. The PINN analyzer detects sources with a constant or variable generation or sink rate. The magnitude of the sources is estimated as a constant value or as a value that depends on time. Also, the PINN analyzer detects sources with a generation or sink rate that depends on the spatial location. The magnitude of the source is estimated as a function of the spatial coordinates. A source is detected inside the object if the values estimated by the PINN analyzer for the source location are inside the object and the source equivalent diameter is greater than a predetermined size.

The source characteristics include parameters that relate to the spatial and temporal location of the source and to its shape and size. Other parameters relate to the source magnitude and duration. Other parameters relate to the source interaction with the surrounding areas. Other parameters relate to the source behavior in the object.

Figure 6:
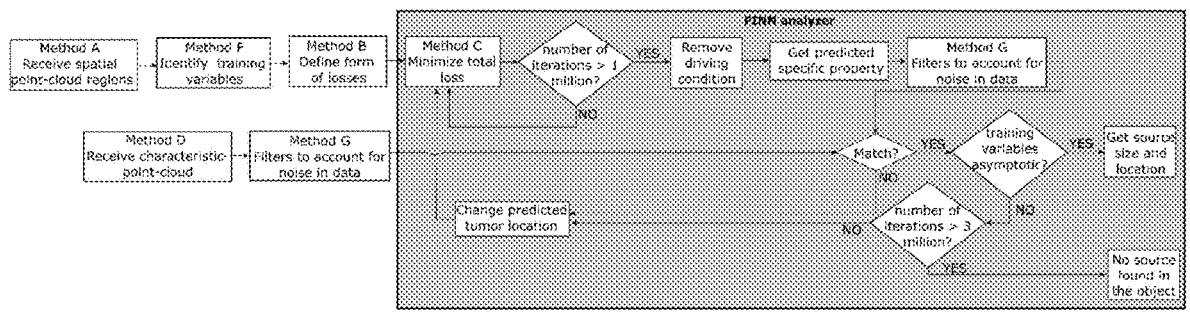
FIG. 6 shows the process to perform modeling of a specific property and identification of source characteristics and system properties in an object within a system with the PINN analyzer.

FIG. 6 shows the process followed to directly estimate the source characteristics with the PINN analyzer. To perform this task, in addition to the described Method A, Method B, Method C, the following methods Method F and Method G, are considered:

Method F: identify training variables related to the source characterization and express the boundary conditions, sub-region-conditions and transport governing equations in terms of the source characteristics. In addition, method F performs the task of (i) implementing a driving condition to at least one search variable to drive the search variable towards a reference value during a training process of the physics-informed neural network algorithm to obtain a relation between the characteristic property and the source within the system, and (ii) removing the driving condition after obtaining the relation during the training of the physics-informed neural network algorithm to obtain a trend representing a change of the at least one search variable during the training process.

Method G: identify filters to clean the data of the transport variable.

Method F identifies training variables in terms of the source characteristics. The source characteristics might include variables that represent the source 3D location in the form of the Cartesian coordinates $x_0$, $y_0$, $z_0$, the size of the source in the form of a radius $R_0$, or the magnitude of the source $Q_0$. Theses variables will be referred as "training variables" or "search variables" in this disclosure. The training variables can consider other type of information related to the source characteristics. These might include parameters that relate to the size and shape of the source, the speed of the source, the movement of the source, the distance to a point of the source, a parameter related to the source magnitude, or other parameters related to the spatial and temporal location of the source. Training variable might also consider other parameters that are unrelated to the source, for instance a thermophysical property of a region (such as the thermal conductivity), the velocity of the flow in the object, or the perfusion rate of the blood in a region.

Also, method F should define the form of the losses to be minimized and include the source characteristics in the estimation of the residuals and losses. The source characteristics are defined as training variables in the training of the PINN analyzer. For instance, it is possible to modify the Pennes bioheat equation to include the source characteristics in the healthy and cancerous tissue properties such as the perfusion rate $\omega_{b,i}$ and the tumor heat generation $\dot{q}_{m,i}$. To include the training variables $x_0$, $y_0$, $z_0$, $R_0$ in the residuals, the perfusion rate and the heat generation in Eq. (13) can be defined as function of $x_0$, $y_0$, $z_0$, and $R_0$ as:

$$\omega_{b,i}=f(x_0,y_0,z_0,R_0) \tag{20}$$

$$\dot{q}_{m,i}=f(x_0,y_0,z_0,R_0) \tag{21}$$

The substitution of Eqs. (20) and (21) in Eq. (13) ensures that the training variables are included in the estimation of the residuals and losses. By minimizing these losses, the PINN analyzer finds the values of the source characteristics that satisfy the boundary conditions and governing equations. The modifications of Pennes bioheat equation includes the tumor characteristics in the minimization of the residuals, which converts the training process into an optimization process.

The distribution functions could consider a Gaussian distribution, a beta distribution, a gamma distribution, a uniform distribution, or any other type of distributions functions. A combination of these distribution functions could also be considered as a function to express $\omega_{b,i}$ and $\dot{q}_{m,i}$ in terms of the source characteristics.

It is possible to detect multiple sources by defining individual training variables for each of the sources.

Also, method F defines additional residuals and losses to help the model to learn that the source location is inside the object. In other words, the PINN analyzer should constraint the values of the training variables to be located inside the breast geometry. Functions can be used to constraint the variables to be inside a region. These functions could be of the form of trigonometric function such as the sigmoid, tanh, sine, cosine, etc. Other functions might not be trigonometric such as the step, the linear, or the saw-tooth function. Also, it is possible to constrain the variables without functions. This can be done by defining residuals in a way that drives the possible values of the training variables towards a reference point or value by defining residuals based on the difference between the reference values and the respective tumor characteristics being predicted by the PINN analyzer during its training in a training process to obtain a relation between the characteristic and the source within the system. In one embodiment, the PINN analyzer implements a driving condition to at least one search variable to drive the search variable towards a reference value during a training process of the physics-informed neural network algorithm to obtain a relation between the characteristic property and the source within the system. The training of the PINN analyzer with the driving condition can be done for 1 million of training iterations. More than 1 million iterations may be required to improve the accuracy or may not adversely affect the accuracy of the PINN analyzer in detecting the source characteristics and properties of the system. Similarly, less than 1 million iterations may not adversely affect the accuracy of the PINN analyzer in detecting the source characteristics and properties of the system.

The PINN analyzer performs object localization within an object or system. Therefore, the PINN-analyzer can distinguish between objects that have a source and objects that have no source. Such a distinction is made through the trend followed by the search variable in the recovery process during the training of the PINN analyzer after removing the driving condition. In general, the trends followed by the search variables indicate that the source is inside the object. Cases with a source show at least one of the search variables related to the source location or size (the source characteristics) reaching out an asymptotic behavior during the recovery process. During the recovery process, the driving condition is removed after obtaining the relation during the training of the physics-informed neural network to obtain the trend representing the change of at least one of the search variables during the training process. The number of iterations during the recovery process in the training of the PINN analyzer can be 2 million. More than 2 million iterations may be required to improve the accuracy or may not adversely affect the accuracy of the PINN analyzer in detecting the source characteristics. Similarly, less than 2 million iterations may not adversely affect the accuracy of the PINN analyzer in detecting the source characteristics.

Analyzing the trends representing the change of at least one of the search variables after removing the driving condition during the training process is used to infer the presence of the source, to determine the values of the properties of the source and the properties of the system. The same analysis can be applied to detect the presence of another source. Further, the analysis includes detecting at least one of the presence of the source and the property of the source and a property of the system when the values of the search variables given by the physics-informed neural network algorithm at the end of a training of the algorithm are inside a predetermined region in the system, have a trend that is asymptotic, and at least one of the properties of the source meets a prescribed criterion. In mathematical analysis, an asymptotic trend represents convergence to a specific value of a variable with the number of iterations during the training process. The prescribed criterion for the variables is defined depending on the particular system and application.

Similarly, screening of cases without a source show that the search variables related to the source location or size ($x_0$, $y_0$, $z_0$, $R_0$) not reaching out an asymptotic behavior during the recovery process. Alternatively, the criteria to indicate source presence regarding the number of search variables reaching an asymptotic behavior can be at least one. Preferably, two or more variable with an asymptotic trend are a better indicator of the source presence.

Three or four variables reaching out an asymptotic behavior further improves the confidence in the output result indicating source presence inside the domain. Identification of source presence with trends that are non-asymptotic are also possible including, but not limited to, parabolic, sinusoidal, or symmetrical. For instance, an indicator of a source presence could be defined based on a trend that contains an optimal condition such as a maximum or minimum value of the search variables during the training of the PINN-analyzer. Variables unrelated to the tumor location and size are also possible candidates in devising an efficient search strategy. Another strategy is based on interpretation of the output from PINN-analyzer during or at the end of training, such as presence of the source term within the domain. Other strategies based on interpretation of the behavior of training variables during the training or at the end of the training are also possible. It is also possible to find optimal source characteristics by tracking the residual related to the boundary conditions including the residual accounting for the infrared temperature data.

The physics-informed neural network algorithm comprises of: implementing a driving condition to at least one of the search variables to drive it towards a reference value during the training of the physics-informed neural network to obtain a relation between the characteristic and the source within the system; and removing the driving condition after obtaining the relation during the training of the physics-informed neural network to obtain the trend representing the change of at least one of the search variables during the training process.

Method G defines any filters used to clean the data of the specific property. Noise filters remove the noise in the experimentally measured values in the thermal-spatial-point-clouds. Also, the PINN analyzer uses a convolution that accounts for the noise filter. The PINN analyzer gets trained with noise-free averaged temperatures obtained from the thermal-spatial-point-clouds.

The residual values for the points in the thermal-spatial-point-cloud are estimated from the condition experimental temperature as:

$$\text{res}_{TSPC,i} = T_{pred,i} - T_{TSPC,i} \quad (22)$$

where the subscript TSPC stands for thermal-spatial-point-cloud. It is possible to include other forms of the condition assigned to the residual value. For instance, the residual could be estimated as the absolute value of the temperature difference, or the square value for the temperature difference. A polynomial function of the temperatures could be also included. The residual value could be multiplied by a factor or a weight.

If the experimental values are contaminated with noise or other type of factors affecting the data, it is convenient to include filters in the estimation of the residual value. If this is the case, the residual associated with the thermal-spatial-point-cloud is estimated based on the filtered temperatures as:

$$\text{res}_{TSPC,o} = T_{pred,o}^F - T_{TSPC,o}^F \quad (23)$$

where $T_{pred,o}^F$ is the predicted noise-filtered temperature and $T_{TSPC,o}^F$ is the experimentally estimated noise-filtered temperature at the location of the voxel o. Various methods can be applied to estimate the noise-filtered temperatures including the Gauss-kernel noise filter. This filter estimates the noise-filtered temperature with the following Gaussian quadrature formula given by:

$$T_O^F = \int_{-1}^{1}\int_{-1}^{1} T(\xi, \eta) d\xi d\eta = \sum_{i=1}^{n}\sum_{j=1}^{m} w_i w_j T(\xi_i, \eta_j) \quad (24)$$

where $\xi_i$ and $\eta_j$ are the roots of the polynomial chosen to perform the estimation and $w_i$ and $w_j$ are the weights, n and m are the number of nodes chosen to perform the approximation. Other techniques remove noise from data, such as temperature in case of thermal systems. These include, but are not limited to, simple averaging, weighting average, Gaussian filtering, Kalman filtering, or other suitable techniques. Artificial intelligence denoising techniques include, but are not limited to, mapping, classification, and PINNs. In mapping, a training dataset contains noisy and clean data of a function. In the PINN analyzer, a convolution becomes a noise filter.

The PINN analyzer conducts an iterative process that minimizes the loss values. The minimization of the loss ensures the identification of optimal source characteristics. The minimization of the loss ensures: (i) matching the temperatures given by the PINN analyzer at the interior of the breast to the temperatures given by the modified Pennes bioheat equation at the interior spatial-point clouds, (ii) matching the temperatures given by the PINN analyzer at the breast surface to the temperatures at the respective points in the thermal-spatial-point-cloud, and (iii) matching the temperatures given by the PINN at the chest of the breast to the temperatures at the corresponding points in the thermal-spatial-point-cloud. Also, the minimization of the loss allows the driving of the values of the heat source characteristics and tissue properties in the interior spatial-point-cloud towards respective reference values during the training of the PINN analyzer. Minimization of the loss consists of reducing the magnitude of the residuals that consider the difference between the predicted values of the PINN analyzer and the characteristic values of the characteristic-point-clouds, which is done by an iterative process.

In the iterative process, an optimizer minimizes the losses and adjusts the training variables with an optimization method. For instance, these steps describe a generalized optimization method that could be followed: i) the PINN analyzer assigns random values to the training variables, ii) the PINN analyzer estimates the losses based on the values of the trained variables, iii) the PINN analyzer adjusts the values of the training variables by following a specific direction and a new set of loss values is estimated, iv) If the loss gets lower, then the optimizer adjusts the values training variables by following the same direction. If the total loss gets higher, then the optimizer adjusts the values of the training variables by following a different direction, v) go to step ii) to estimate a set of predicted temperatures with the updated training variables, vi) the PINN analyzer repeats this cycle until the loss values and the value of the total loss are small and the change in the values in training variables has become asymptotic. The PINN analyzer identifies the presence of a source when the value of the total loss is less than a prescribed convergence value and the variation of the training variables has reached asymptotic condition, which includes preferably when the slope given by the change in the training variable is below $10^{-3}$ and the convergence value is in the range of $10^{-9}$ to $10^{-1}$. Other conditions reached by the training variables different to asymptotic can be implemented to identify the presence of the source. For instance, a peak value can be defined or a change in the slope in the trend of the search variables can be utilized to identify the presence of the source. Similarly, the PINN analyzer identifies that there is no source present in the object when the value of the total loss is higher than a prescribed convergence value and the variation of the training variables has not reached asymptotic condition or other condition related to the trends of the search variables during the training of the PINN analyzer.

Also, it is possible to define multiple optimizers instead of a single optimizer. For instance, and an optimizer-A might reduce a set of losses and an optimizer-B might reduce a second set of losses. An optimizer-A might be in charge of reducing training variables and an optimizer-B might reduce the residuals that relate to the boundary conditions and governing equations. Preferably, a single optimizer should be used. Two optimizers might lead to a faster training of the PINN analyzer. Three or more optimizers might help with the speed of the training of the PINN, but it might reduce the accuracy of the PINN analyzer.

Another possible alternative is to define single or multiple neural networks. For instance, a single neural network might find the optimal values of the training variables or source characteristics simultaneously. Alternatively, multiple neural networks might find the optimal values of the training variables or source characteristics independently. In this case, a neural network A might find the x location of the source, a neural network B might find they location of the source, and a neural network C might find the z location of the source. Preferably, a single optimizer should be used. Two optimizers might lead to a slower training of the PINN analyzer. Three or more optimizers might help with the accuracy in predicting the source characteristics, but it might increase the training time of the PINN analyzer.

An output of the PINN analyzer consists of a distribution map or display. The distribution map is generated from parameters related to the source magnitude including, but not limited to, the heat generation, temperature, and perfusion rate. Other parameters to represent the distribution map relate to the properties including thermal conductivity, and diffusion coefficient in thermal systems. Properties such as density can be included in the analysis for transient or dynamic systems. In other systems, appropriate properties are used such as electrical conductivity in electrical applications. Additionally, other parameters related to the source growth or evolution conditions may be considered. The distribution map or display may be displayed in multiple dimensions including, but not limited to, 1D, 2D, and 3D spaces. Several distributions may be applied to represent the angiogenesis level or tumor presence in detecting a heat source in a breast including, but not limited to, Gaussian, gamma, beta, uniform, or other mathematical functions. The display can show information on other spaces such as imaginary or scaled or decomposed spaces. A color-bar or color-scale may be used to identify values related to the source magnitude and location. The range of color can be of different forms or scales.

In the case of breast as the object and temperature as the characteristic property in determining the presence of a heat source in the breast the algorithm comprise of the driving condition is removed after obtaining the relation during the training of the physics-informed neural network to obtain the trend representing the change of at least one of the search variables during the recovery process in the training of the algorithm. The algorithm comprises of detecting at least one of the presence of a heat source and at least one of the properties of the heat source such as location, size, and magnitude, of the heat source, and at least a property of the system such as the thermal conductivity of the breast tissue when the value of the search variables given by the physics-informed neural network algorithm at the end of a training of the algorithm are inside a predetermined region in the system, have reached an asymptotic trend, and at least one of the properties of the source meets a prescribed criterion such as the minimum heat source size or magnitude.

Point-Cloud Generalities

A characteristic-point-cloud is defined as a collection of points containing information about a system including, but not limited to, spatial information, specific property information, temporal information, and a combination of these information. A spatiotemporal-point-cloud is defined as a collection of points that have 3-dimensional (3D) spatial information, such as the x-, y-, and z-coordinates in Cartesian coordinate system, and, optionally, temporal, also referred to as transient or time dependent, information. Under steady-state conditions or at specific times, a spatiotemporal-point-cloud may be reduced to a spatial-point-cloud. The specific system property information may include, but is not limited to, electrochemical, thermal, and mass concentration information. A thermal-spatial-point-cloud is defined as a collection of points that have the spatial and steady-state or transient thermal information of an object. The thermal information may be obtained from thermal measurement tools including, but not limiting to, thermocouples, thermometers, and IR cameras. The surface of an object can be described in terms of the spatial-point-cloud, and the additional temperature information provides the thermal-spatial-point-cloud. Characteristic-point-clouds with specific properties can be defined depending on the analysis, such as heat transfer analysis, mass concentration analysis and other processes to be analyzed.

In the current state of art, the spatial-point-cloud is generated using depth sensors in conjunction with associated 3D reconstruction techniques or physical molds of an object. 3D scanners are devices that obtains the spatial information of the object that utilize various techniques including but not limited to time-of-flight, photogrammetry or 3D reconstruction, and contact-based techniques. 3D scanners generate digital models of the surface of the object that can be converted to a spatial-point-cloud through the use of commercial software. Multi-view 3D reconstruction is a technique utilized in Computer Vision to generate a spatial-point-cloud from the spatial information obtained through images of the object that is captured at various viewpoints by a camera using features present on the object. The images can be obtained through imaging devices including photographic cameras, IR cameras, MRIs, mammograms, PET scans, or a combination of any imaging devices. There are many multi-view 3D reconstruction techniques for generating spatial-point-clouds including, but not limited to, Shape from Silhouette, Stereo Vision, and Structure from Motion which can be conducted through open-source algorithms and software or through commercial software. The 3D reconstruction model is represented by corresponding software files such as .stl, .obj, .ply, or other software-specific files. Creating a physical mold of the object is an established procedure that covers the object in material that solidifies in the shape of the object. Using a physical mold, spatial-point-clouds may be obtained using measurements or imaging of the mold or the model generated from the mold. IR imaging is used to generate surface temperature maps in a given view.

Using current 3D reconstruction techniques, characteristic-point-cloud is generated through registration between spatial-point-cloud and a property map on the surface of the object. For example, a 3D scan can be used with the property map to generate a characteristic-point-cloud with that property through a registration process. In the absence of surface features or physical markers, the registration becomes approximate. Also, the availability and density of the surface features or physical markers affects the accuracy of the registration process and the 3D reconstructed model. The 3D reconstructed model is also referred to as 3D digital model or digital model.

Alternatively, in other embodiments, an AI model is used for geometry reconstruction and registration. For instance, images with light markers are used to generate the inputs to an AI model; where the outputs of the AI model are parameters related to the spatial reconstruction and registration. Reconstruction with AI is done using data in the image-space or other transformed spaces. Transformed spaces include representation with imaginary or complex numbers. Different AI techniques, such as classification, mapping, linear regression, or other neural network-based techniques are also able to generate geometry reconstruction and registration. A ground truth database (or dataset) is created from stored digital models. The stored digital models will contain several features that the AI will learn. Several techniques can generate digital models in the training database; these techniques include and are not limited to segmentation using medical scans, applying cad software to create or modify objects, and processing of images. The input data includes features such as edge detection, aspect ratio, geometrical relationships among features in the multi-view images, and other such enabling features.

Point-Cloud Generation Method

In the present disclosure, a method is disclosed that uses specifically oriented light projector and an optical camera that is sensitive to the light, and a sensor emitted by the projector, wherein the light projector, the optical camera, and the sensor are positioned at known positions to each other at a central axis, also referred to as axis of rotation, or axis, around which the camera and the light projector rotate. In case of visible light projected, the optical camera is a photographic camera that is sensitive to the visible light. An optical camera includes photographic, infrared, and other cameras that are sensitive to different spectrum of light. A sensor captures a characteristic property on the surface of the object. The sensor is similar to a camera that captures images and information on the surface of the object in a given view. As an example, IR camera is a sensor that captures information of the characteristic property temperature on the surface of the object. Similarly, in other applications, appropriate sensor and characteristic property combination may be applied. In this method, the object is placed in the vicinity of the axis of rotation, such that the image of the object appears in at least one of the multi-view images, and the optical camera captures images at different views at known positions around the object. These images are referred to as multi-view images or multiple view images. A Point-Cloud Generator is defined as an algorithm or a technique that generates characteristic-point-clouds from the spatial and characteristic property information on the surface of an object. In case of detection of a heat source in an object, the Point-Cloud Generator generates thermal-spatial-point cloud in different regions of the object, including the surface region, interior region, base region, etc. This technique is used to generate a spatial-point-cloud of the surface of the object that contains spatial information at locations of the light markers from the multi-view optical images of the object and this method of generating spatial-point-cloud is included in the broader Point-Cloud Generation Method that contains additional characteristic property information at these locations and is known as characteristic-point-cloud of the surface of the object. Further, the broader Point-cloud Generation Method includes techniques to generate characteristic-point-clouds at other regions and surfaces of the object. The known position of the camera with respect to the projector may be in the form of angular position or spatial position or both. The light projector and the sensor are placed at one of the known angular position and spatial position with respect to the optical camera. The angular position gives the position of the camera or projector relative to the axis of rotation at a known angle away from a reference location, such as the camera location in one of the views and known distance away from the axis of rotation. The spatial position gives the position of the camera or projector relative to a coordinate system and known coordinates of at least one point in the axis of rotation. The coordinate system and angular positions are obtained to respective reference locations.

The light projector projects a beam of light which appears as a light marker on the object. The light marker has some known attributes such as the light marker beam projected by the projector and the axis of rotation are in the same plane. Other attributes include the light marker beam is parallel to the line normal to the axis of rotation and passing through the point that defines the camera position. In another embodiment, the light marker beam is parallel to the normal line and is located a known distance apart from the line. Other attributes include known spatial and angular displacements from the line. These attributes are used in generating spatial information of the projected light marker on the surface of the object. The surface of the object is opaque to the light such that the light marker projection on the surface is recognized by the photographic camera.

The relationships among the axis of rotation, the light marker on the surface of the object, and the angle of projection of the light marker with respect to the camera center and the axis of rotation provide information regarding the spatial coordinates of the light marker on the surface of the object. This information is used in generating a spatial-point-cloud on the surface of the object. This is accomplished by obtaining spatial coordinate of multiple points on the surface of the object that are generated by rotating the camera and the light projector around the object. In another embodiment, the spatial coordinate may be obtained by rotating the object around an axis of rotation and using the camera and the light projector being at fixed positions away from each other and the axis of rotation. The object is at or near the axis of rotation. In one embodiment, the axis of rotation appears at the center line of the image obtained by the optical camera. In one embodiment, the axis of rotation appears at the center line of the image obtained by the infrared camera.

IR cameras, also referred to as infrared cameras, are used to generate surface temperate data on the surface of the object in a given view. In the present disclosure, an IR camera captures IR images of the object in multiple views of the object around the axis of rotation. These are referred to as multi-view IR images. The positioning of the IR camera is designed such that the IR camera position in a given view coincides with the optical camera position at the same location in a previous view while the cameras are rotating around the axis of rotation and images are captured. The axis of rotation appears at the center line of the images obtained by both optical and infrared cameras. This provides equivalency between the two camera images at the center line of the images that is parallel to the axis of rotation. This equivalency is critical in establishing proper registration of the surface points of the object in optical camera and IR camera images obtained from the same location. These camera angular positions along the path traveled by the cameras around the central axis of rotation, respective angles between the cameras, and the angle between the projector angular center line along which the projected light travels and becomes incident on the surface of the object as a light marker, and the distances between the camera centers and the axis of rotation are used in generating spatial-point-cloud and thermal-spatial-point-cloud.

Another important attribute of the projected light marker is that it is directed from the projector center to the axis of rotation. The light marker can be a point marker on the surface of the object. The light marker can also be of different shapes. In exemplary embodiment, the light marker takes the shape of a line projected on the surface of the object. The projected line and the axis of rotation are in the same plane, which also contains the projector center. In case of other marker shapes, additional constraints may arise due to differences in geometrical arrangements. This disclosure also covers light markers which are off center from the axis of rotation, one or both of the optical and IR cameras which are individually off center both in angular and spatial directions. In these cases, different angular and spatial relationships are used to generate the respective point clouds or to create appropriate 3D reconstruction model.

The images obtained from optical and IR cameras in the same view are scaled to provide correct mapping between individual points in the images that represent the same point on the object. This provides a direct means of combining optical and IR image information to generate a thermal-spatial-point-cloud representing the surface of the object. The two cameras generating spatial and thermal images are designed such that their images are easy to register. In one embodiment, same lens characteristics are employed such that the two images are well registered. This also provides a direct means of 3D reconstruction of the surface of the object with additional optional temperature information at specific locations on the surface of the object. A thermal-spatial-point-cloud includes the spatial information and temperatures at respective spatial locations at different locations on the surface of the object.

In another embodiment, the optical camera may be replaced with IR camera and a projector of light that is in the wavelength that is identifiable or visible in the IR spectrum. In such cases, only one IR camera may be used. This IR camera generates simultaneous spatial and thermal information that is already registered since the same camera image provides both information in conjunction with the analysis of the IR light marker positioning calculations. The light may be turned off while capturing IR images for thermal information or temperature data.

The optical camera and the projected light operate in the visible spectrum in one embodiment. Any other light spectrum or wavelength can be used, including but not limited to infrared, near-infrared, and far-infrared light frequencies. IR cameras are used to generate temperature data. Other techniques and sensors can be used to generate the temperature data. In case other characteristic on the surface are measured for generating respective characteristic-point-cloud, suitable sensors to measure the characteristic property are employed. Some of the characteristic properties include color spectrum on the surface of the object, concentration of a certain species on the surface of the object, magnetic field intensity on the surface of the object, or other properties associated with the surface being mapped. This provides a technique to generate respective characteristic-point-cloud of the object with the respective characteristic property.

Point-Cloud Generation Workflow

In the present disclosure, an image acquisition system to capture multi-view images of an object with at least one camera, at least one sensor and at least one light marker projector, as well as a characteristic-point-cloud generation method in the form of a Point-Cloud Generator are disclosed. The respective thermal-spatial-point-cloud is used in a PINN analyzer to detect heat sources, their characteristics, and their location if present within an object. The combination of the image acquisition system and the Point-Cloud Generator will herein be known as the Point-Cloud Generation Method, where the generation of point-clouds with spatial and characteristic property data at different points on the surface of the object and interior are established to develop characteristic-point-clouds, such as thermal-spatial-point-clouds. FIG. 7A shows the workflow for detection consisting of an image acquisition system, the Point-Cloud Generator, and the PINN analyzer. The image acquisition system is made up of a system controller, an acquisition hardware, and an image depository. The system controller is utilized to set the inputs for the acquisition hardware which play a major role in the positioning and alignment of the system. The system may use calibration and validation techniques to ascertain accuracy of the data. The acquisition hardware consists of at least one optical camera, at least one IR camera or thermal sensor, and at least one light projector connected to a rotating mount. In an embodiment, the optical camera is same as the IR camera with the light projector projecting light that is sensed in the IR spectrum by the IR camera. The terms IR camera and sensor are used interchangeably in this document. This system will capture multi-view optical and IR images of an object that will have light markers projected onto the object by the projectors. The image depository is used to store the output image data obtained by the acquisition hardware as well as label the images with the inputs from the system controller. The Point-Cloud Generator uses a novel light marker technique that accomplishes one or all of simultaneous spatial mapping, temperature registration, point extraction and 3D reconstruction from the data obtained by the acquisition system.

One of the advantages of the novel technique disclosed here is the capability to generate accurate 3D reconstruction or 3D models for objects that include surfaces that are concave, convex, or sharp but without any hidden surfaces in the views obtained by the camera. The technique can be applied to obtain spatial-point-clouds and thermal-spatial-point-cloud of an object, part of an object or a collection of objects. For example, in imaging a breast that is protrusive from the chest, the breast cannot be imaged from its base connected to the chest. In one embodiment, the base is identified from the multi-view images of the breast. In this embodiment, the base is identified as base-1. In another embodiment, additional tissue regions from the chest are included with adiabatic side wall conditions connecting the additional tissue regions to the sides of the chest and the constant temperature boundary condition is applied on the other side of the base defined as base-1. This additional tissue region is referred to as base-2. The spatial-point-clouds for base-1 and base-2, if needed, are generated from the available information from the multi-view images and dimension of additional tissue regions used in defining base-2. The characteristic-point-cloud for base-1 is obtained from the respective spatial-point-cloud and interpolated from the characteristic-point-cloud of the surfaces of the object. The characteristic-point-cloud for base-2, if needed, is obtained from the base-1 property information and the assigned values at the interface of base-2 with chest from the known boundary conditions regarding the chest temperature. The interior points in the tissue region of base-2 are obtained similar to the interior region of the breast. Only the surface of the breast is imaged and it forms a part of the object. The thermal information of the breast at the base connects it to the chest is obtained from other input such as chest temperature which is correlated with the body temperature. The spatial and thermal information of the base of the breast is added in generating the thermal-spatial-point-cloud of the breast. This point-cloud can be used for further analysis described in this disclosure. The information below gives the details of each component and how they come together in the Point-Cloud Generator to generate spatial-point-clouds and thermal-spatial-point-clouds. In analyzing the breast as an object, the characteristic-point-cloud of various surfaces and regions in the system are the respective thermal-spatial-point-clouds.

A method of generating a thermal-spatial-point-cloud is disclosed, the method including: a) obtaining multi-view optical images of an object and multi-view infrared images of a surface of the object using an image acquisition system including an optical camera, an infrared camera, and a light projector projecting a beam of light creating a light marker in the form of a spot or a line on the surface of the object, by i) rotating one of the object and the image acquisition system around an axis of rotation, ii) placing the object in the vicinity of the axis of rotation, iii) orienting the optical camera such that the angular center line of the optical camera passes through the axis of rotation and is normal to the axis of rotation, iv) orienting the light projector such that the light projector, the light marker, and the axis of rotation are in the same plane, v) placing the light projector at known angular positions with respect to the angular center line of the optical camera and the axis of rotation, vi) orienting the infrared camera such that the angular center line of the infrared camera passes through the axis of rotation and is normal to the axis of rotation, and vii) placing the optical camera and the infrared camera in a plane that is normal to the axis of rotation; and b) obtaining spatial information at locations of the light markers from the multi-view optical images of the object to generate a spatial-point-cloud of the surface of the object.

A thermal-spatial-point-cloud of the surface of the object is generated from the spatial-point-cloud by obtaining temperatures from the infrared images at the locations of the light markers and generating a thermal-spatial-point-cloud of the surface of the object which contains both the spatial information and temperatures at the locations of the light markers.

A thermal-spatial-point-cloud of the interior of the object which contains both the spatial information and temperatures at points of the thermal-spatial-point-cloud in the interior region of the object is generated.

A thermal-spatial-point-cloud of the surface of the object not containing both the spatial information and temperatures at the locations of the light markers is generated.

The optical camera is sensitive to the light projected by the light projector.

A registration process is used between an optical images and infrared image in the same view to generate the thermal-spatial-point-cloud on the surface of the object.

The light projector is oriented such that the angular and spatial relationship among the light projector, the light marker, and the axis of rotation are known.

The infrared camera is placed at the same angular position around the axis of rotation as the optical camera in at least one of the views generated by the optical camera. The axis of rotation is at the center line of the images obtained by the infrared camera and the optical camera. The registration of the optical images and infrared images is obtained by matching the center lines between the images at the same view to generate registered infrared images with light markers. The thermal-spatial-point-cloud is generated using the temperatures at the location of the light markers on the registered infrared images.

This Point-Cloud Generation Method is suitable for objects with or without surface features. Obtaining a spatial-point-cloud for objects that are featureless is difficult because the current imaging systems used in conjunction with 3D reconstruction relay on surface features that are not available. The geometric relations in terms of triangles in the Point-Cloud Generation Method disclosed in this invention, differs from the triangulation from that of structured light Stereo Vision as the optical camera does not use stereo vision and other state-of-art 3D reconstruction methods that depend on feature matching. The Point-Cloud Generation Method extracts the captured light marker points directly from an image and the Point-Cloud Generator generates spatial information in terms of spatial coordinates for the points on the light marker. The light marker points come from a light projector that is nonionic and can operate in any light spectrum or wavelength including, but not limited to, visible, infrared, near-infrared, and far-infrared light frequencies depending on the corresponding optical camera. The light markers are visible and can be clearly identified in each image of the optical camera. In the case of operating in the visible spectrum, the light projector may use different light source including, but not limited to, incandescent, halogen, compact fluorescent lamps, and light-emitting diode (LED). The geometric relation for this method comes from movement of the components of the acquisition hardware and the relative positions of the light projector, and axis of rotation with respect to the optical camera. The geometric relations and relative positions for the infrared camera are needed in generating thermal-spatial-point-clouds using the spatial-point-cloud information and the corresponding optical and infrared images in the same view. The different components of the acquisition hardware can be positioned in a cylindrical, spherical, ellipsoid, or other known geometrical configurations depending on the particular component where the axis of rotation of this geometry is the axis around which the imaging system rotates. Both the optical and infrared cameras are preferably at the same distance from the axis of rotation and in a plane made up of the respective camera centers and a point on the axis of rotation. The light projector can be positioned such that the line that is projected makes a known angle with the axis of rotation, preferably this angle is such that the line overlaps the axis of rotation. The cameras and projector point towards the axis of rotation, or have a center line that is normal to the axis of rotation and that passes through the axis of rotation. In the case that any of the center lines do no pass through the axis of rotation, the Point-Cloud Generation Method can still be applied using the known angles and location of one or each component with respect to the axis of rotation. This would allow for the cameras to be in stereo as the geometric relationship between the cameras and light projector can be calculated using these known angles and locations. Furthermore, this allows for obtaining thermal-spatial-point-clouds of a surface of an object from stereo infrared cameras with a light projector operating in the infrared spectrum. Similarly, the projector may be placed in other geometric configuration and appropriate calculations performed, however, the geometry described with the projector such that the line marker overlaps the axis of rotation gives simple geometric relations needed in generating spatial-point-clouds. The surface of the object is translucent and opaque with nonzero absorptivity and emissivity, which allows the infrared camera to capture the temperatures at the surface of the object.

Infrared camera acts like an array of temperature sensors measuring temperatures on the surface of an object. The emissivity of the surface needs to be considered in using the information from the infrared camera to corresponding temperatures. Surface of breast has a very high emissivity in the infrared region and these values in the range 0.8 to 0.99 are applied. Since the temperature differences are of significance in applying the PINN algorithm, any errors in exact temperature measurements are not as critical and the algorithm is able to yield accurate results with these differences. Speculation variations in emissivity represent the dependence of emissivity on angle of incidence on an object. The current invention uses the center line of the infrared images and provides consistent and accurate results. The speculate variation of emissivity is high at low angles of incidence. In a wide range of angles closer to the normal, this variation is negligible. Obtaining temperatures of an object at centerline of the image provides accurate measurement of temperatures along this line. This feature is utilized in the current invention to generate consistent and accurate values of temperature measurements on the surface a breast from an infrared camera.

The thermal-spatial-point-cloud of the breast includes thermal-spatial-point-clouds of the surfaces of the breast, including the base of the breast connecting to the chest, and the interior region of the breast.

The breast is imaged with the image acquisition system while the breast is in a position similar to that obtained while the female lies in a prone position with her breast hanging down.

System Controller

The system controller takes in the angular values ($\alpha$, $\beta$, $\theta$) related to the camera and light projector as inputs, where $\alpha$ is the incremental rotational step angle, $\beta$ is the angle between the cameras, and $\theta$ is the angle between a light projector and a camera. FIG. 7B shows an example on how an IR camera IR and optical camera G are $\beta$ away from each other, and how a light project LP is separated from G by an angel $\theta$. The angles $\beta$ and $\theta$ are also known as the camera separation angle and the light projector separation angle, respectively. The value of $\alpha$ will determine the number of views that will be captured such that the number of views will be $$k = \frac{360°}{\alpha}.$$

The camera separation angle $\beta$ will depend on incremental view angle, $\alpha$, such that $\beta$ is a multiple of $\alpha$.

$$\beta = n\alpha \quad (25)$$

where n is a positive integer and n<k. This will allow the optical images to be captured at the same view as the IR image when moving along the trajectory. The placement of the light projector will depend on the optical camera, such that the light projector will be at an angle $\theta$ which is between 0 and $\beta$ to the left or right of the optical camera. More preferable $\theta = \beta$ in which the movement of the system will be such that the optical camera moves to the position that the projector was previously at when the system moves by $\beta$. As an exemplary embodiment, $\beta = \theta = 45°$ and $\alpha = 15°$ which means the cameras and projectors will be 45° from each other and images will be taken at every 15° giving 24 views. The same effect may be obtained using twenty-four cameras that are 15° apart. The angles $\alpha$, $\beta$ and $\theta$ could be changed between 0° and 90° for improving system performance. More preferable angle ranges for $\beta$ and $\theta$ are between 5° and 85°, more preferable ranges are between 15° and 60°, and 30° and 45°. The angle $\alpha$ could be appropriately adjusted to give integral number of images within the $\beta$ rotation domain. The number of views and angle between the cameras may increase or decrease to obtain an optimal thermal-spatial-point-cloud and to reduce the errors between the image point correspondences and improve computational efficiency or accuracy of the 3D reconstruction process. The angle $\beta$ may be different than the angle $\alpha$ since both of them serve two different purposes. The system controller will then take the incremental value and apply it to the system through the view angle $\phi_i$ such that:

$$\phi_i = (i-1)\alpha \quad (26)$$

where i=1, 2, ..., k and $\phi_i$ is the view angle corresponding to view i.

Acquisition Hardware

Positioning: After the system controller receives the input angles, optical and IR images are obtained using at least one optical camera and at least one IR camera, respectively, at different orientations and viewpoints from each other. Multiple optical and IR images are taken of a physical object at different views in a circular trajectory with the optical and IR cameras, respectively, moving simultaneously generating multi-view optical and IR images, respectively. Other image acquisition arrangements can also be implemented such that the thermal-spatial-point-clouds can be generated from these multi-view, multi-source images. This will allow the two or more cameras to take images at the same view from the same locations and orientations. The same effect may be obtained using multiple cameras at the different viewpoints. The images will capture light markers emitted by one or more light projectors on to the object. FIG. 7B shows an example of an acquisition hardware with IR, G, and LP going around the object Obj in the same trajectory and path. The light projector may be mounted in the same path as the cameras or right under the cameras but following a similar trajectory. A light marker is a type of feature marker that is utilized as a known landmark on the surface of the object that is captured by an image. The beam of light or sheet of light containing the line LL emitted by the projector appears on the surface of Obj as a light marker containing the point P. Other feature markers may include any physical markers or structured light markers. In the case of physical markers, physical contact of the marker with the object is needed. This may be undesirable in situations such as breast imaging. The preferred light markers are point, line, grid, circles, and other geometrical shapes. In case of point markers and line markers used as light markers, in a preferred embodiment, the light projected from the projector is directed towards the center of rotation A-A' of the cameras. In the case of structured light, multiple views of the same projected light are used. One of the multiple views is an orthogonal view in which the orthogonal coordinate of the point provides the addition information needed in locating the 3D coordinates of points resulting from the structured light marker on the object. Images of the point or line on the object provide an accurate estimate of the angular position of the markers. Other strategies such as displacing the projected light by a certain distance parallel to the light marker passing through the center of rotation may be implemented. The known displacement distance is utilized in accurately generating 3D reconstruction model of the object and respective point-clouds.

The acquisition hardware may be configured such that IR, G, and LP are at different viewpoints, same viewpoints, or side-by-side, also known as stereo. The cameras and light projector will rotate along the trajectory using a rotating mount or a similar device at increments of angle $\alpha$, not shown in FIG. 7B. The light projector LP is placed at an angle $\theta$ to one or both sides of G along the rotation pathway. The cameras IR and G are separated by an angle $\beta$ along the rotational pathway. The light projector emits a light beam, a light sheet to project a line with the light sheet containing the axis of rotation or displaced by a known amount, grid or points that are visible in the optical image. In the case of FIG. 7B, the light marker is an LED light marker with a light beam containing a line pattern oriented vertically parallel to the axis of rotation A-A' of Obj. The camera G captures a optical image of the line emitted by LP as a 2D projection of the 3D points along the line LL such as the point P. The LED light marker is preferred as it generates negligible thermal signature while providing clear optical mark. Other types of markers with matching sensors or cameras can be substituted for the light marker-camera combination.

Alignment: The alignment of the cameras and projectors will be such that the angular center lines IR-C, G-C, and P-C are perpendicular to A-A' and passes through the point $O^R$, which lies on A-A'. The distance between the cameras and A-A' is known and may be same or different for the individual cameras or sensors. This allows for the cameras and projectors to be on a plane that is perpendicular to A-A' called the working plane IR-G, which contains the center points $C^G$ and $C^{IR}$ of G and IR, respectively. With this configuration, it makes it easier to find and correspond or register the 3D points on the surface with the points captured by any camera or sensor. FIG. 7C shows an example of an IR image captured when the system has moved by $\beta + \theta$ and IR has moved to where LP was in the previous image capture. This shows that A-A' and LL pass through the vertical central axis of the image, also known as the center line of the image, IR-G is the horizontal central axis of the image, and $C^{IR}$ is the principal point of the image. Note that the camera center $C^{IR}$ and the point marked as $C^{IR}$ on the surface of the obj overlap with each other in FIG. 7C. This allows for the x- and y-coordinates of the point P along LL in the image to be the same as the 3D x- and y-coordinate of the object at that corresponding view. In case of a line marker, this arrangement assures that the camera center point, projected line, and the axis of rotation are all in the same plane at a known angle to the plane containing the axis of rotation and the center point of the optical camera. Additional geometric relationships are described for generating a full 3D reconstruction of the object using this concept as the kernel.

Image Depository

The optical images and IR images are saved separately, preferably in two separate folders, in the image depository so that they may be called efficiently. In a preferred embodiment, their folder names will include the camera separation angle $\beta$ and the light projector separation angle $\theta$ by having the name RGB_$\beta$_$\theta$ for photographic images and IR_$\beta$_$\theta$ for the IR images. In another preferred embodiment, the file names for any image in a given folder will include the view number i through the name 00i for correctly identifying the specific views represented by those images. The temperatures at different points on the surface of the object are extracted from the IR camera image and will be saved in another separate folder in the image depository with the same format as the images. Spatial averaging of thermal data at different locations represented by individual pixels may be combined to provide a nine-point average. Other suitable spatial averaging schemes may be implemented. This reduces the noise associated with the data. The LED light marker may be replaced by an IR light marker so that it may be seen and captured by the IR image. This would eliminate the need for the optical camera and allow for obtaining thermal-spatial-point-cloud from IR images alone. The two cameras described herein may be operating in different spectral regions, but the concept and approach is still applicable. The cameras may also be replaced by sensors capturing the appropriate parameters used for describing the system or in the governing equations.

Point-Cloud Generator: Temperature Mapping

Image Distortion Mapping: After acquisition, the images are undistorted and suitably mapped for accurate registration that is described in this method. In an exemplary embodiment, the optical images are undistorted using the function cv.undistort($I_i$, K, dist), where $I_i$ is the image at image frame i, K is the camera intrinsic matrix, and dist is the distortion coefficient vector. The same can be implemented for the IR images given the IR camera's intrinsic matrix and distortion coefficients. Since undistorting the images moves the pixels around, the transformation mapping to undistort the IR images using the IR camera properties will need to be used to match the pixels with the corresponding temperatures. To obtain this mapping, also known as the temperature mapping, the function cv.initUndistortRectifyMap( ), or other rectification functions, will be implemented using the camera intrinsic and distortion coefficients of the IR camera. These functions are all done through the open-source platform for computer vision, OpenCV. Any other suitable platform can be used to achieve this goal. The camera intrinsic matrices and the distortion coefficients are obtained through camera calibration, which is done prior to image acquisition.

View Alignment: Once the temperature mapping is obtained, image registration can be applied between the optical and the corresponding IR images. Prior to performing image registration, the optical image and IR image must be of the same view or further analysis may be needed to ascertain correct registration. This means that the optical image captured at some view j must be the same as the IR image captured at some view i. This occurs when $C_j^G = C_i^{IR}$ or when the system has moved by an angle of $\beta$, which means the view angle will be $\phi_{n+1} = n\alpha$ according to Eq. 25 and Eq. 26. This gives a relationship to the views to be j=i+n or that the view angle of $\phi_j$ in terms of i will be:

$$\phi_{i+n} = (i+n-1)\alpha \qquad (27)$$

Therefore, the position of the optical camera in terms of i is $C_{i+n}^G$.

Image Registration: A number of registration methods are available for achieving image registration between two images such as pixel-based image registration, contour-based image registration, multimodal image registration, point mapping methods, and image registration in frequency domain. These methods are not suitable for the images generated in the multi-view imaging system of current invention. In the current disclosure of the invention, the details of image registration between optical images and infrared images in the same view are given here. Once the IR and optical images are corresponded to the same view, image registration will be conducted using the undistorted images, the transformation mapping, and the principal points. The principal point of an image is the projection of the camera centers $C^G$ and $C^{IR}$ of G and IR, respectively, onto the image plane and is the intersection of the center line of the image and the working plane IR-G. Image registration is conducted by aligning the principal points, also known as matching the center lines, of the undistorted images at the same view. This is done by transforming the pixel points from the image coordinate system to the camera coordinate system using the following:

$$\begin{bmatrix} X \\ Y \\ Z \end{bmatrix} = K^{-1} \begin{bmatrix} wu \\ wv \\ w \end{bmatrix} \qquad (28)$$

$$K^{-1} = \begin{bmatrix} \frac{1}{f_x} & 0 & -\frac{c_x}{f_x} \\ 0 & \frac{1}{f_y} & -\frac{c_y}{f_y} \\ 0 & 0 & 1 \end{bmatrix} \qquad (29)$$

where (X, Y, Z) are the 3D camera coordinates, (u, v) are the pixel point coordinates, w is a scaling parameter, and $K^{-1}$ is the inverse of the intrinsic matrix. As the X and Y coordinates are of most importance, the scaling parameter is set to 1 and the points are translated in the Z-direction by −1 to obtain arbitrary points in a plane in space at Z=0. The inverse intrinsic matrix contains the values of the intrinsic matrix such as the horizontal and vertical scale factors $f_x$ and $f_y$, and the coordinates of the principal point ($c_x$, $c_y$). Applying Eq. 28 and Eq. 29 to the IR and optical images will transform all pixel points into 2D points on a plane, with the principal points being transformed to the origin. Since the two cameras have distinct camera properties, the image planes for each may be of different size and the object may be larger or smaller in one or the other image plane. If this is the case, scaling factors $s_x$ and $s_y$ for the X and Y direction, respectively, can be implemented. A single scaling factor s can be implemented if the same scaling factor is needed for both directions. Also, translation may be implemented in the X or Y direction, or in both directions to align the principal points. After this transformation, the mapping, or registration, between pixel points of the IR images and optical images at the corresponding views is one-to-one. If the camera angular center line does not pass through the axis of rotation or if the camera plane is not normal to the axis of rotation, additional correction factors may be needed. Using the temperature map from the image distortion method the registration mapping is applied to assign the temperature values to the new pixel points in the transformed coordinate.

Point-Cloud Generator: Point Extraction

Image Segmentation: After obtaining the mapping that registers the points in the IR image space to the optical image space, the extraction of the points on the light markers is conducted. In case of line markers, multiple points may be selected on the line to generate the point-clouds. To account for the line thickness, correct localization of points may be obtained by using the line edges, center line, or other techniques that rely on the intensity distribution across the line. Individual pixels on the projected line may be utilized for this purpose. The extraction is conducted using image segmentation methods such as image thresholding, edge detection, contour object detection, or other image processing techniques, on the optical images. With image segmentation, the foreground and background can be separated so that the pixel points of the object are extracted. A second layer of segmentation is applied again to separate the part of the object that is illuminated by the light markers and the part that is not to extract the light marker pixel points, also referred to as light points. Noise filtering methods may be applied to remove any outlier points that are not on the light points. These filters may include but are not limited to Gaussian filters, weighted average filters, as well as any other smoothening or spatial filters. This step may be implemented on the IR images using IR light markers which eliminates the need for image registration.

Line Detection: Depending on the light source used to project the light markers, the marker may from a very thick or thin pattern on the object. The light pattern thickness is the measurement of pixels in the horizontal direction when the axis of rotation is vertical. If the extraction of the light points is larger than 5 pixels thick and a thin thickness is needed, a morphological transform, such as a morphological Laplace transform, or an eroding function may be applied to reduce the thickness of the light points. This will reduce the points inward, giving an average light point pattern with a thin thickness. If the thickness of the light points is not of any issue, then no action is needed to reduce the thickness. Once the required thickness is established, a 2D mask can be generated by assigning, in one embodiment, a pixel intensity value of 255 to the light points and 0 to the rest of the pixels in the image. Using the 2D mask on the registered points with mapped temperatures or on the undistorted mapped temperatures, thermal-spatial light points p of the object at each view are created. These thermal-spatial light points have the form:

$$\hat{p}=[x\ y] \tag{30}$$

$$p=[\hat{p}T] \tag{31}$$

where $\hat{p}$ is the vector containing the spatial information of the thermal-spatial light point, x and y are the X and Y coordinates of a thermal-spatial light point, respectively, and T is the temperature value for the same point. Other algorithms to account for artifacts such as discontinuity may be implemented.

Point-Cloud Generator: 3D Reconstruction

Initial Reconstruction: The thermal-spatial light points are then utilized to generate initial 3D surface points with corresponding temperatures. This is done by using the 2D spatial coordinates of the thermal-spatial light points, the known positions of the cameras and projectors, and the rotation point $O^R$, which is the point that the cameras and projectors revolve around. The four main cases that are addressed in the following assume that both the optical camera G and IR camera IR are oriented in the exact same direction. If the cameras are not oriented in the same direction, then independent corrections will need to be applied.

A. Case A: The method described in this step is associated and depicted through FIG. 8 Case A. The figure shows a cross-section at the working plane IR-G which is at some height Y of Obj. The light points have a 2D coordinate on a plane that is centered at a camera center $C^G$, which is assumed to be the origin of each perspective view. The axis of rotation A-A' is at a working distance D that is perpendicular to the X-direction and along the Z-direction or the angular center line G-C. Coordinates of the rotation point $O^R$ are generated such that:

$$O^R = \begin{bmatrix} 0 \\ y_0 \\ D \end{bmatrix} \tag{32}$$

where $y_0$ corresponds to the Y coordinate of any light point, which allows $O^R$ to be arbitrary, meaning they can anywhere on the axis A-A'. Since the rotation point $O^R$ is arbitrary, the Y coordinate can be the origin, maximum Y coordinate value of the light points, or any other light point value. In an exemplary embodiment, the Y coordinate is selected to be the midpoint Y coordinate value of the light points in the first view such that:

$$y_0 = y_{max} - \frac{|y_{max} - y_{min}|}{2} \tag{33}$$

where $y_{max}$ is the maximum Y coordinate value of the light points and $y_{min}$ is the minimum Y coordinate value of the light points. A 3D thermal-spatial light point P on Obj is associated with the thermal-spatial light point p such that p is a projection of P onto the plane located at $C^G$ and:

$$\hat{P}=[\hat{p}\ z] \tag{34}$$

$$P=[\hat{P}\ T] \tag{35}$$

This means that the X and Y coordinate of P comes from p or $\hat{p}$, which allows for mapping of the temperature values from the 2D thermal-spatial light point to a 3D point. The projection of P onto the plane is conducted by the projector LP along the angular center line P-C at an angle θ to the left of the camera. This generates triangle ΔCPO that creates a geometric relation between the points. This allows to find the Z coordinate of P through the following:

$$z = D - \frac{x}{\tan\theta} \tag{36}$$

where z is the Z coordinate of P. In a specific embodiment, the separation angle θ is between the ranges 0° and 82.5°, more preferably 30°≤θ≤45°, to allow the best capture and reconstruction of the light points as the visibility of the light points plays a role in the accuracy of reconstruction. When the separation angle θ is greater than 82.5° the point extraction and image registration become difficult due to the cosine of the angel becoming close to zero. In the case where 82.5°≤θ<90°, the points on the edges captured by a camera can be utilized as estimated light points of the light points obtained from Eq. 36 with this range. The Z coordinate for these points can be estimated to be z=D for simplicity. These edge points can be obtained using any edge detection algorithm including, not limited to, Canny edge detection, Sobel edge detection, and Robinson edge detection. This method can be conducted using only the IR images, removing the need for image registration as both the spatial and thermal information of the IR images can be extracted easily. Since this method is dependent on the X coordinate of p and the angle θ, it is possible to reduce the number of views while maintaining the same or greater number of light points. This is done by making β=α, and moving the projector to multiple positions while capturing multiple images of each view. The light points in each view will be placed at various projection angles:

$$\theta = (\theta_1, \theta_2, \ldots, \theta_m, \ldots, \theta_{M-2}, \theta_{M-1}) \tag{37}$$

$$\theta_m = \frac{m}{M}\alpha \tag{38}$$

where M is the total number of light points in a view, m is a specific light point at integer values m=1, 2, ..., M−1, and $\theta_m$ is the light point angle for light point m at any particular view. These light point angles can be used in Eq. 36 to give the Z coordinate of various light points from one view. This method may also be implemented by having multiple projectors located at the light point angles $\theta_m$ to the left or right of G.

Figure 8A:
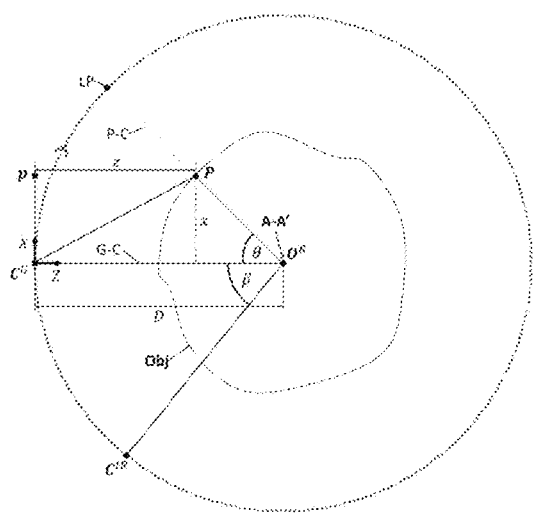
FIG. 8A shows a cross-section of the object at the working plane, and the geometric relation between the optical camera, IR camera, axis of rotation, light projector, and the light point on the object surface
Figure 8B:
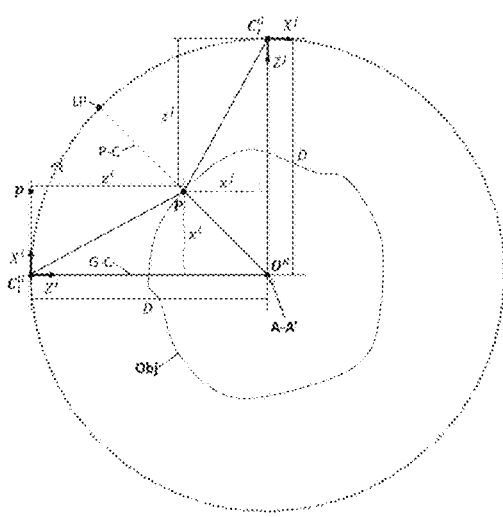
FIG. 8B shows a cross-section of the object at the working plane, and the geometric relation for the light point on the object surface captured by a camera at view i and at 90° away from view i.

B. Case B: The method from Case A works when θ associated with the projector and the point P are the same and are known. This will occur when the light point thickness is reduced using the method from the line detection method, as the reduced points will be exactly at the position associated with θ. In the case that the points are not reduced or the angles associated with the light points are not known, a different view that captures the same point can be utilized. FIG. 8 Case B shows a cross-section of Obj at the working plane IR-G similar to FIG. 8 Case A, but with point P being captured at view i on $C_i^G$ and view j on $C_j^G$, which is 90° away from view i. In terms of the incremental view angle α, 90° can be rewritten as 90°=ℓα where ℓ is the ratio between 90° and α. This gives a relationship to the views to be j=i+ℓ or that the view angle at view j in terms of i will be:

$$\phi_{i+\ell} = (i+\ell-1)\alpha \tag{39}$$

Each view will have their own coordinate system, such that the X coordinate for view i, $X^i$, is parallel but opposite direction of the Z coordinate for view j, $Z^j$. Similarly, for the Z coordinate for view i, $Z^i$, with the X coordinate for view j, $X^j$, but with them being parallel and in the same direction. This allows for the Z coordinate of P in view i to be found using the X coordinate of view j through the following:

$$z^i = D - |x^j| \tag{40}$$

where $z^i$ is the Z coordinate value of P at view i and $x^j$ is the X coordinate value of P at view j, which will be negative and will need the absolute value to obtain a positive length value. This method is applicable by using more than one optical camera, one at view i and the other at view j, or with one camera similar to Case A but with no reduction of points. This allows for Case B to be utilized for reconstruction instead of Case A, for any of the given or similar conditions.

Figure 9A:
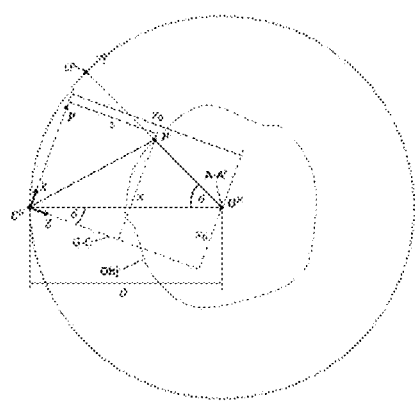
FIG. 9A shows an example of a camera with a Z coordinate that does not pass-through the axis of rotation, but instead is rotated by an angle
Figure 9B:
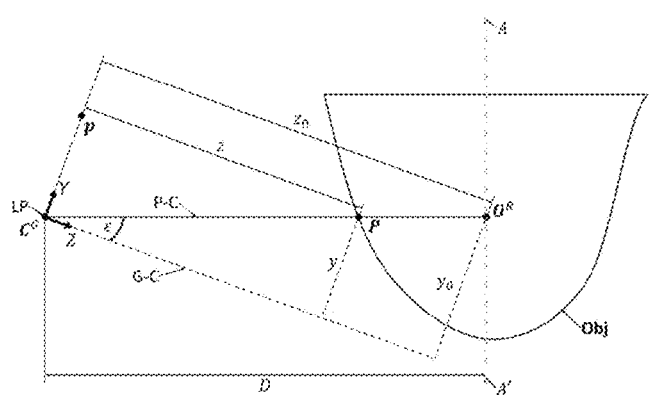
FIG. 9B shows an example of a camera that does not pass-through the axis of rotation due to a vertical tilt.

C. Case C: The methods from Case A and Case B are applicable when both the cameras and projectors are looking towards the axis of rotation, or if the Z coordinate passes through the axis of rotation. If the Z coordinate of the camera does not pass through the axis of rotation, then a geometric relationship can be constructed. FIG. 9 Case C shows an example of a camera with a Z coordinate that does not pass-through A-A', but instead is rotated by an angle δ, which can be obtained through the following:

$$\delta = \tan^{-1}\left(\frac{x_0}{z_0}\right) \tag{41}$$

where $x_0$ and $z_0$ are the X and Z coordinate values of the rotation point $O^R$ in the camera's coordinate system. To obtain $x_0$ and $z_0$, two or more projectors that project a line sheet through the axis of rotation can be utilized by capturing the intersection point in the image plane to obtain the rotation point:

$$O^R = \begin{bmatrix} x_0 \\ y_0 \\ z_0 \end{bmatrix} \tag{42}$$

Utilizing the rotation point, the angles δ and θ, the distance from the camera to the axis of rotation and the projected points will help in obtaining geometric relations to obtain the Z coordinate of the light point. Methods from Case B can be implemented if the angle θ is not known. In practical systems, it is preferable small angular values of δ preferably below 10° and more preferably below 5°.

D. Case D: For this case, similar relationships can be constructed as those from Case C to conduct the 3D reconstruction. FIG. 9 Case D shows an example of a camera that does not pass-through A-A' due to a vertical tilt E, which can be obtained through:

$$\varepsilon = \tan^{-1}\left(\frac{y_0}{z_0}\right) \tag{43}$$

Similar to Case C, the methods from Case B can be implemented if the angle θ is not known. In practical systems, it is preferable small angular values of ε preferably below 10° and more preferably below 5°.

Figure 10:
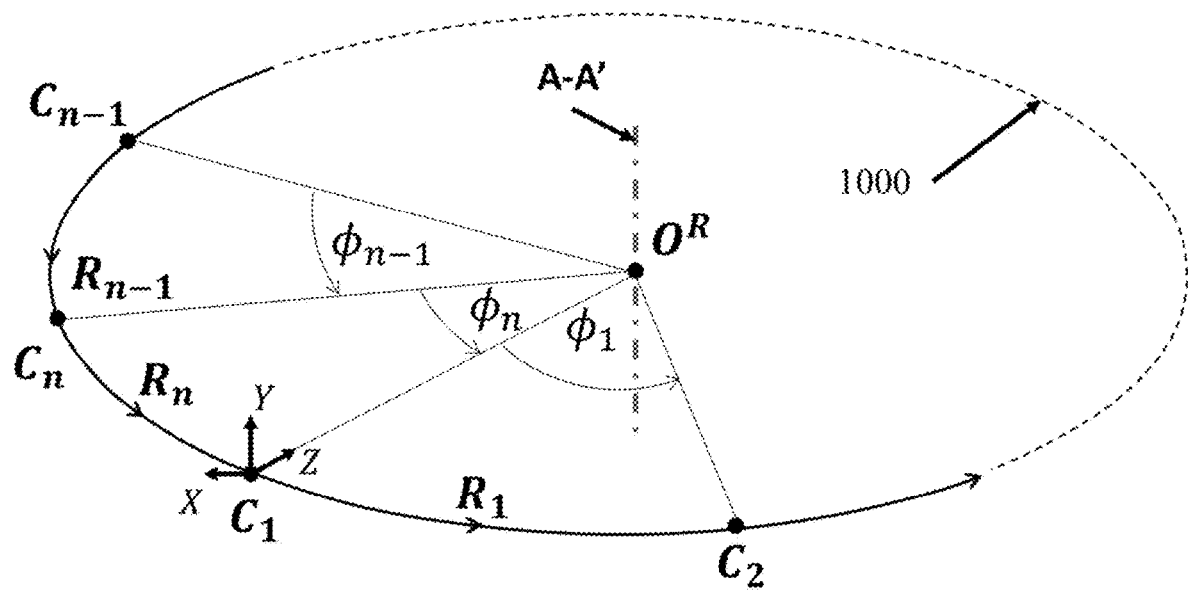
FIG. 10 shows an example of a camera trajectory with camera centers at specific increment values.

Transformation: Once the 3D coordinates of the light points are obtained for each view, they will need to be transformed into the world coordinate system. Currently, all points are in their perspective image space coordinate system in which the origin is the center point of the camera. The transformation to world coordinates can be conducted by utilizing the known positions of the camera in the trajectory that captured the light points that were reconstructed from cases A, B, C, or D. FIG. 10 shows an example of the trajectory 1000 with camera centers $C_i$ at specific increment values i=1, 2, ..., n. The camera moves around the axis of rotation A-A' or any rotation point $O^R$ that is on A-A', which can also move the light points given the following transformation:

$$\hat{P}_i^W = R_i(\hat{P}_i - O^R) + O^R \qquad (44)$$

$$R_i = \begin{bmatrix} \cos\phi_i & 0 & \sin\phi_i \\ 0 & 1 & 0 \\ -\sin\phi_i & 0 & \cos\phi_i \end{bmatrix} \qquad (45)$$

where $\hat{P}_i$ is any reconstructed light point at view i, $O^R$ is the rotation point, $R_i$ is the rotation matrix about the y-axis dependent on view i and view angle $\phi_i$ from Eq. 26, and $\hat{P}_i^W$ is the light point at view i in the world coordinate system. The origin of the world coordinate will be placed at the center point of view 1, $C_1$, with the coordinate of $O^R$ given by Eq. 32 or Eq. 41 depending on which reconstruction method is utilized. This gives that the image coordinate values of the light point in view 1 is the same as the world coordinate values, or $\hat{P}_1 = \hat{P}_1^W$. The rotation point and matrix will ensure that the image coordinate values of the light points in different views are transformed to the appropriate world coordinate values. This will generate a spatial-point-cloud of the surface of the object and since the temperatures are already registered with each point, this method will also generate a thermal-spatial-point cloud of the surface.

Interior Points: In another embodiment, spatial-point-cloud of the surface as well as points of the interior region are generated. The spatial-point-clouds and thermal-spatial-point-clouds, which are characteristic-point-clouds in the case of temperature as the characteristic property, are also used to represent the entire object including the surface and interior region of the object. This method of characteristic-point-cloud generation is included in the Point-Cloud-Generation Method. The spatial and characteristic property information at points in the interior region is not contained in the information generated at the locations of the light markers. If interior points are needed, then a linear interpolation scheme may be used to generate a spatial-point-cloud of the interior or an interior portion. In one the embodiments of this scheme, a line is generated from at least two reference points that are known, with points between the reference points in the line defined as the interpolation points. To obtain these reference points on the surface spatial-point-cloud, maximum distances are calculated between points on a plane that is perpendicular to the axis of rotation (y-axis) and parallel to the XZ-axis. This is done from top to bottom of the object through the following:

$$\hat{P}_2^k = \max_{X,Z} d(\hat{P}^k, \hat{P}_1^k) \qquad (46)$$

where $\hat{P}_1^k$ is a reference point chosen from the surface spatial-point-cloud on plane k, $\hat{P}^k$ are points from the surface spatial-point-cloud on plane k, and $\hat{P}_2^k$ is the reference point obtained from the maximum distance between $\hat{P}_1^k$ and $\hat{P}^k$.

Then, the slope of the line created by the two reference points is obtained to generate the respected line equation through the following:

$$Z^k = m^k X^k + b_{1,2}^k \qquad (47)$$

$$m^k = \frac{Z_2^k - Z_1^k}{X_2^k - X_1^k} \qquad (48)$$

$$b_{1,2}^k = Z_{1,2}^k - m^k X_{1,2}^k \qquad (49)$$

where $X^k$ and $Z^k$ are the X and Z coordinate of a point in the plane k, $m^k$ is the slope of the line obtained from the reference points, and $b_{1,2}^k$ is the Z-intersect of the line obtained from one of the reference points. Points in between the reference points, $\hat{P}^k \in (\hat{P}_1^k, \hat{P}_2^k)$, will generate spatial-point-clouds of the interior.

Although linear interpolation is utilized in this step, other schemes may be used such as polynomial or spline interpolation schemes. Another method that can be utilized to create these interior points is by generating smaller scaled copies of the surface points. This can be done by multiplying the surface points with the scaling factors $s=[s_1, s_2, \ldots, s_n]$ such that:

$$\hat{P}_i^{int} = s_i \cdot \hat{P}^{surf} \qquad (50)$$

where $\hat{P}_i^{int}$ are the scaled interior points created by the ith scaling factor, $\hat{P}^{surf}$ are the surface points, and the scaling factor $s_i$ is constrained to be $s_i \in (0,1)$. If the interior points are not needed, then this step can be skipped. The temperature values of the interior points, initially or at any iteration, may be set to a constant temperature, known temperature, predicted temperature, or any other value that may be obtained through one of the measurement, computer simulation, or PINN analyzer.

Length Scaling: Since the thermal-spatial-point-cloud was generated in the image space, the dimension is unitless. If a dimensionally accurate reconstructed object is needed, a proper length scaling can be applied. This is done by using the following:

$$\hat{P}^{scaled} = S\hat{P} \qquad (51)$$

$$S = \begin{bmatrix} s_x & 0 & 0 \\ 0 & s_y & 0 \\ 0 & 0 & s_z \end{bmatrix} \qquad (52)$$

where $\hat{P}^{scaled}$ is the scaled spatial points of the thermal-spatial-point-cloud, S is the length scaling matrix, $s_x$ is the length scale in the x-direction, $s_y$ is the length scale in the y-direction, $s_z$ is the length scale in the z-direction, and $\hat{P}$ is the spatial points of the thermal-spatial-point-cloud. In a preferred embodiment, the length scale in each direction will have the same value $s_x=s_y=s_z=s$, where s is the constant length scale value, which happens due to the removal of distortion of the images prior. The length scale values may be obtained through known measurements that can be related to a geometric property, number of pixels of an object, or any other known feature.

The Point-Cloud Generation Method also includes generation of spatial and characteristic-point-clouds on the surfaces of the object not containing the spatial information and characteristic property information at the location of the light markers. In case when the surfaces form the boundaries of the object which is being analyzed by a PINN analyzer, known boundary conditions or known relationship between the characteristic property and the spatial information at locations on these and other surfaces of the object are applied for generating characteristic-point-clouds of these surfaces. Other surfaces include surfaces that contain information generated at the locations of the light markers.

The novelty of this disclosure is the projection on the surface being imaged of a light marker that passes through the axis of rotation of the camera and the projector. This provides the angular positioning of the light and the angle of projection made at the axis with respect to the viewing camera. This information is used in 3D reconstruction of the object. A preferred embodiment of the projected light marker is a line marker that passes through the axis of rotation. This enables 3D reconstruction of objects that are concave or convex along the light marker path. Sharp edges may also be detected by suitably adjusting the angle between the light projector and the camera. Theoretically, camera separation and incremental angle values greater than 0° and smaller than 90° can be used, however, for better accuracy angles between 5° and 85° are preferred. Other preferred angles in this range may also be desirable from accuracy viewpoint. The image acquisition system may be turned into a video feed or continues feed acquisition system by making the incremental angle values to be less than 1° and capturing multiple frames per second. For this case, pose estimation techniques from Structure from Motion and Computer Vision may be implemented to estimate the 3D transformation between each frame. The light marker plane, for example for a light marker, which consists of the line and the projector center, can also be parallel to the actual plane passing through the axis of rotation and appropriate geometrical relations could be used for this light marker geometry. The above procedure may require additional angular corrections when the plane of the camera and axis of rotation are not orthogonal or if the axis of rotation does not coincide with the center line of the images and angular center line, either displaced spatially or tilted angularly. The equations describing the reconstruction and mapping at a point on the surface of the object can be extended to reconstruct and map a line, grid, or any other shape of the line marker. The characteristic property, such as temperature in corresponding to the thermal-spatial-point-cloud, can be replaced with other physical properties to generate respective characteristic-point-clouds. The above procedure may be conducted in other coordinate systems such as cylindrical, spherical, or any other coordinate system through the use of geometric and mathematical relationship between the locations of the cameras and projector.

Point-Cloud in Breast Cancer Detection

The Point-Cloud Generation Method described above works with any object in which an imaging system can rotate around to capture the spatial and specific property information of the object in terms of a characteristic-point-cloud. In the case of breast cancer detection, the object is a female breast, the spatial information is captured by photographic images, and the specific property is temperature captured by IR images to generate a thermal-spatial-point-cloud. For detecting a heat source in breast cancer detection, the breast is imaged while the breast hangs from the body similar to the breast hanging down through a hole on a surface on which the person is lying down in a prone position. The breast is imaged with the camera while it is in a position that is obtained while the female lies in a prone position with her breast hanging. The imaging system captures the images of the breast while rotating around the axis of rotation. The axis of rotation is in close proximity of the breast, preferably passing through the breast, and more preferably closer to the center of the breast. The distance between the camera and surface of the breast in the multi-view images is kept the same as far as possible, although distance variation axis placement can be accounted for through geometric relationships with known axis and breast locations. The photographic camera is placed such that it rotates in a similar fashion as the IR camera. Multi-view images are obtained with both the cameras. The angular positions of the individual cameras in individual views in the multi views are maintained such that it facilitates image registration and associating the temperature values from the IR camera image with the photographic camera image. The light marker projectors, or any other device providing light markers on the breast surface, are also positioned such that they provide a known angular or spatial position of the light markers on the surface of the breast and these positions are used in generating spatial-point-cloud at the light markers on the breast surface. The spatial and thermal information on the base of the breast is generated through other known or estimated information.

Spatial-point-clouds and thermal-spatial-point-clouds on the other regions of the breast that are not directly covered by the light markers are estimated or determined through appropriate geometric relationships between the points generated at the light markers and other information derived from any of the images. Image capture and registration processes are used to generate the thermal-spatial-point-cloud. Light markers provide the necessary markings on the breast surface. LED light markers are visible in photographic images. Light markers that are visible in the IR images can be employed, in place of in conjunction with the LED light markers. Any changes in the IR images due to light markers need to be carefully assessed and its effect on temperature extraction from the IR images needs to be appropriately considered such that they do not alter the temperature readings from the IR images at any location. The objective of the breast in prone position is to have optical access to all parts of the breast, including inframammary folds. Prone position removes the artifacts introduced by gravitational deformation. Any other arrangement of breast placement or camera placements that overcomes the limitations of distortion and access can also be implemented.

EMBODIMENTS

Method B Embodiment 1

In accordance with an aspect of the present disclosure, there is provided a deep learning model in the form of a PINN analyzer. The PINN analyzer conducts transport modeling of a property and detects a source and its characteristics. The PINN analyzer gets trained by:
  a. assigning to each point in the characteristic-point-cloud a residual value. The residual value is computed from the boundary conditions or governing equations that relates to the modeling of the specific property
  b. using the residual values to estimate the magnitude of losses
  c. minimize the losses with optimizers
  d. and determine the values of the specific properties as the output of the trained PINN analyzer.

Method B Embodiment 2

In accordance with an aspect of the present disclosure, there is provided a deep learning model in the form of a PINN analyzer. The PINN analyzer conducts transport modeling of a property and detects a source and its characteristics. The PINN analyzer gets trained by:
  a. assigning to each point in the characteristic-point-cloud a residual value. The residual value is computed from the boundary conditions or governing equations that relates to the modeling of the specific property. Some of these boundary conditions or governing equations include:
    i. boundary conditions that could be satisfied may comprise of:
      1. specified value of parameters at specific locations, convection, insulation, symmetric, periodic, radiation, electrochemical reactions, mass transfer, and metabolic rate as heat source at specified locations
    ii. governing equations that could be satisfied may comprise of:
      1. Navier-Stokes, energy, continuity and mass conservation, chemical species transport, electrochemical reactions or governing equations, and transport governing equations
      2. other modified forms of the above stated governing equations are also possible. These might be in Cartesian coordinates, spherical coordinates, cylindrical coordinates, or any other type of coordinate system
    iii. other special functions or governing equations that could be satisfied include:
      1. distance functions, which is a non-spatial non-thermal condition
      2. convolutions to remove noise including Kalman filtering or other kinds of denoising filter
      3. convolutions to read parameters related to the specific properties in the object withing a system.

In a specific embodiment, the object is a female breast and the boundary conditions that should be satisfied include specified values at the base region, convection at the breast surface, and adiabatic boundary at specified locations. The governing equations that should be satisfied include the Pennes bioheat equation with specified metabolic heat generation in cancerous and healthy tissues. Other specific functions that need to be satisfy include distance functions to constraint the values of the variables and convolutions to remove the noise.

Method C Embodiment 1

In accordance with an aspect of the present disclosure, there is provided a deep learning model in the form of a PINN analyzer. The PINN analyzer conducts modeling of a specific property and detects a source and its characteristics and specific properties. The PINN analyzer gets trained by:
  a. computing the magnitude of these losses using the residuals in a characteristic-point-cloud region:
    i. mean average of the square of the residuals
    ii. sum of the square of the residuals
    iii. maximum residual value
  b. computing a total loss as:
    i. the sum of the individual losses
    ii. the sum of the individual losses multiplied by weights to give more strength to certain regions as a way to improve the training of the PINN analyzer
    iii. specific combination of the individual losses In a specific embodiment, the object is a female breast and the individual losses is computed as the mean average of the square of the residuals. Also, the total loss is computed as the sum of the individual losses multiplied with specific weight values. The range of the weight fraction ranges from 10-6 to 104. The total loss can be computed without weights, but the training time of the PINN analyzer may increase.

Method C Embodiment 2

In accordance with an aspect of the present disclosure, there is provided a deep learning model in the form of a PINN analyzer. The PINN analyzer conducts modeling of a specific property and detects a source and its characteristics and specific properties. The PINN analyzer consists of:
  a. a neural network with an optimizer that minimizes a total loss. The neural network consists of:
    i. input variables including:
      1. coordinates of the points in the characteristic-point-clouds.
      2. inputs that provide information regarding the object of interest. For instance, these inputs might define the interior or the exterior regions
    ii. output variables including:
      1. an output that corresponds to the value of the specific property at the input coordinates of the points in the spatial-point-clouds
      2. one or more outputs that include a value that defines the presence of a tumor such as 1 if the tumor is present and 0 if the tumor is not present. Or a distribution that ranges between 1 and 0. Other outputs related to the modeling of the transport variable in the object might be considered.
    iii. a fully connected neural network that has an input layer of neurons, multiple hidden layers of neurons, and an output layer of neurons. Each layer and neuron are interconnected with weights and biases. Convolutional layers may also be included before the input layer or after the output layer
    iv. an optimizer that minimizes the total loss with an iterative method. During the minimization process (also known as training), the PINN analyzer adjusts the weights and biases that interconnect the different layers in the neural network. The Adam optimizer is commonly adopted, but other optimization algorithms are available. Other possible optimizers include Adadelta, Adagrad, Adam, Adamax, FTRL, NAdam, RMSprop, mini-batch methods and Gradient decedent. Other possible optimizers are in the form of modules in machine learning platforms.
    v. it is possible to define multiple optimizers instead of a single optimizer.
  b. the PINN analyzer ends the iterative process when the total loss and each of the individual losses are below a threshold value. Preferably, the minimum threshold value is $10^{-3}$. A higher level of accuracy in predicting the transport variable can be achieved with a threshold value is $10^{-7}$. Higher or lower threshold values can be implemented.

In a specific embodiment, the object is a female breast and the inputs of the neural network are the coordinates of the points in the spatial-point-clouds, and the outputs pf the neural network are the temperature at the spatial-point-clouds. A convolution layer is placed after the outputs to account for the noise filter. The optimizer that minimizes the total loss is the Adam optimizer. PINN analyzer is considered to be trained when the total loss is below the threshold value of 10-3.

Method C Embodiment 3

In accordance with an aspect of the present disclosure, there is provided a deep learning model in the form of a PINN analyzer. The PINN analyzer conducts modeling of a specific property and detects a source and its characteristics and specific properties. The PINN analyzer gets trained by machine learning platforms. Some of these platforms include TensorFlow, PyTorch, Python, NeuralLab, MATLAB.

In a specific embodiment, the object is a female breast and the machine learning platform is TensorFlow.

Methods D and E Embodiment 1

In accordance with an aspect of the present disclosure, there is provided a deep learning model in the form of a PINN analyzer. The PINN analyzer conducts modeling of a specific property and detects a source and its characteristics and specific properties. The PINN analyzer can be applied to:
  a. detect sources that generate or consume heat, mass, pollution, electrical field or similar parameters. Other examples of sources include momentum, chemical reactions
  b. detect sources that remain in a fixed location during a period of time that affect the surrounding environment due to source term generation or consumption. In these cases, the method identifies the spatial location of the source
  c. detect sources that change its location during a time frame such as dynamic ships that pollute water. In these cases, the method identifies the spatial location of the source that changes as a function of time, the velocity of the source, or the acceleration of the source
  d. detect sources that change its shape or that remain with a constant shape. In this case, parameters are defined to characterize the physical size of the source. These parameters include an equivalent diameter, characteristic lengths such as an axial or transversal length or suitable parameters defining the size of the source
  e. detect sources with a constant or variable generation or sink rate. The magnitude of the sources is estimated as a constant value or as a value that varies with time
  f. detect sources with a generation or sink rate that depends on the spatial location. The magnitude of the source is estimated as a function of the spatial coordinates.

In a specific embodiment, the object is a female breast and the PINN analyzer detects a source that generates heat and that remains static. Also, the source has a constant generation rate that is a function of the values of the spatial coordinates.

Methods D and E Embodiment 2

In accordance with an aspect of the present disclosure, there is provided a deep learning model in the form of a PINN analyzer. The PINN analyzer conducts modeling of a specific property and detects a source and its characteristics and specific properties. The PINN analyzer can be applied to detect source characteristics including:
  a. parameters that relate to the spatial and temporal location of the source and to its shape and size
  b. parameters that relate to the source magnitude and duration
  c. parameters that relate to the source interaction with the surrounding areas
  d. parameters that relate to the source behavior in the object.

In a specific embodiment, the object is a female breast and the PINN analyzer identifies the location of the tumor, the radius of the tumor, the magnitude of the heat source due to metabolic heat generation, and the values of the perfusion rate and thermal properties of the healthy and cancerous tissues.

Methods D and E Embodiment 3

In accordance with an aspect of the present disclosure, there is provided a deep learning model in the form of a PINN analyzer. The PINN analyzer conducts modeling of a specific property and detects a source and its characteristics and specific properties. The PINN analyzer works with defined regions in the form of characteristic-point-clouds. The characteristic-point-clouds include, but are not limited to:
  a. thermal-spatial, pressure-spatial, a potential-spatial, and a concentration-spatial-point-clouds.
  b. a thermal-spatial point consists of a group of points where each point has an assigned temperature and spatial information. A pressure-spatial-point-cloud consist of a group of points where each point has an assigned pressure and spatial information.
  c. the thermal-spatial-point-cloud might be part of a small subregion of a point-cloud region.
  d. it is possible to create a synthetic temperature with the help of a forward model such as a computer simulation or an artificial intelligence model such as the PINN analyzer. Gaussian noise is usually added to the temperature given by the forward model. Other types of noise are also possible
  e. the assigned value to the thermal-spatial-point-cloud is usually experimental measured.

In a specific embodiment, the object is a female breast and the PINN analyzer considers a thermal-spatial-point-cloud. The thermal-spatial-point-cloud includes the breast surface region.

Methods D and E Embodiment 4

In accordance with an aspect of the present disclosure, there is provided a deep learning model in the form of a PINN analyzer. The PINN analyzer conducts modeling of a specific property and detects a source and its characteristics and specific properties. The PINN analyzer and the external inverse model work together with the following steps.
  a. step 1: assign initial values to the source characteristics
  b. step 2: the PINN analyzer takes into account the source characteristics to predict the value of the transport variable of the object at the points in the thermal-spatial-point-cloud
  c. step 3: the inverse model compares the predicted and the experimentally estimated values of the transport variable in the thermal-spatial-point-cloud to determine a new set of values for the source characteristics. To perform the comparison, it is also possible to use parameters that relate to the value of the transport variables instead of using the transport variables directly. For instance, the intensity of the image given by the values of the transport variables could be considered. Alternatively, the transport variables could be decomposed into main or secondary modes that relate to the values of transport variables
  d. step 4: take the new set of estimated source characteristics and go to sept 2 e. this cycle repeats until the difference between the predicted and the infrared camera temperatures is below a minimum threshold value. Preferably, the minimum threshold value is $10^{-3}$.

f. this approach is used to estimate parameters that relate to the properties of the object In a specific embodiment, the object is a female breast and the PINN analyzer considers the location of the source, magnitude of heat generation, and size of the source as the source characteristics. Also, the PINN analyzer identifies the thermal conductivity of the breast tissue. It can also analyze other thermal properties of the healthy and cancerous tissues.

Methods D and E Embodiment 5

In accordance with an aspect of the present disclosure, there is provided a deep learning model in the form of a PINN analyzer. The PINN analyzer conducts transport modeling of a property and detects a source and its characteristics. The PINN analyzer might work with an external inverse model to detect sources in the object using optimization methods to update the values of the parameters in the external inverse model including Levenberg-Marquardt algorithm, The Gradient Descendent Method, The Conjugate Gradient Method, The Simulated Annealing Method, Particle Swarm Optimization, Ant Colony Optimization, Sequential Quadratic Programing, Artificial Neural Networks, Support Vector Machines, Genetic Algorithms, other numerical methods, or a combination of these methods.

In a specific embodiment, the object is a female breast and the PINN analyzer considers an external inverse model. This external inverse model includes the Levenberg-Marquardt algorithm.

Methods F and G Embodiment 1

In accordance with an aspect of the present disclosure, there is provided a deep learning model in the form of a PINN analyzer. The PINN analyzer conducts modeling of a specific property and detects a source and its characteristics and specific properties by:

a. expressing the boundary conditions or governing equations that govern the transport of a variable in an object in terms of the source characteristics b. estimating the residuals as function of the source characteristics c. estimating the magnitude of the losses as function of the source characteristics d. finding the values of the source characteristics by minimizing the losses with an optimizer e. the source characteristics are referred as "training variables" since the values of these variables are determined during the training of the PINN analyzer.

f. it is also possible to define the tissue properties as training variables

In a specific embodiment, the object is a female breast and the PINN analyzer detects sources where the source characteristics are defined as the spatial location of the source, the magnitude of the source and the size of the source. Also, the PINN analyzer estimates the tissue thermal conductivity by defining it as a training variable.

Methods F and G Embodiment 2

In accordance with an aspect of the present disclosure, there is provided a deep learning model in the form of a PINN analyzer. The PINN analyzer conducts modeling of a specific property and detects a source and its characteristics and specific properties by:

a. conducting an iterative process that minimizes the value of the total loss b. an optimizer minimizes the total loss and adjusts the training variables through an optimization method. The following steps describe a generalized optimization method that might be applied:

i. step 1: the PINN analyzer assigns random values to the training variables ii. step 2: the PINN analyzer estimates the losses based on the values of the trained variables iii. step 3: the PINN analyzer adjusts the values of the training variables by following a specific direction and a new set of loss values is estimated iv. step 4: If the total loss gets lower, then the optimizer adjusts the values of the training variables by following the same direction. If the total loss gets higher, then the optimizer adjusts the values of the training variables by following a different direction as determined by the gradient of the losses v. step 5: go to step 2 to estimate a set of predicted values of the transport variables with the updated training variables vi. step 6: the PINN analyzer repeats this cycle until the value of the total loss is below a threshold value and the change in the values in training variables has become asymptotic. Preferably, the minimum threshold value is $10^{-3}$. Also, the values in the training variables have become asymptotic preferably when the gradient of the change of the training variables is below $10^{-3}$. A higher level of accuracy in predicting the values of the training variables can be achieved with a threshold value is $10^{-7}$.

In a specific embodiment, the object is a female breast and the PINN analyzer minimizes the total loss estimated with the boundary conditions and governing equations that relate to the thermal modeling of breast cancer. The training variables are spatial location of the source, the magnitude of the source, the size of the source, and thermal conductivity of the healthy and cancerous tissue. The threshold is set to 10-3.

Methods F and G Embodiment 3

In accordance with an aspect of the present disclosure, there is provided a deep learning model in the form of a PINN analyzer. The PINN analyzer conducts modeling of a specific property and detects a source and its characteristics and specific properties by:

a. utilizing a single or multiple optimizers. For example, an optimizer-A might be in charge of reducing training variables and an optimizer-B might reduce the residuals that relate to the boundary conditions and governing equations.

b. utilizing a single or multiple neural networks. For instance, a single neural network might find the optimal values of the training variables or source characteristics simultaneously. Alternatively, one neural network A might find the x location of the source, another neural network B might find the y location of the source, another neural network C might find the z location of the source, and another neural network D might find the magnitude of the source. Similar techniques can be applied to estimate other properties.

In a specific embodiment, the object is a female breast and the PINN analyzer considers only one optimizer for training. Also, the PINN analyzer considers individual neural networks for each of the training variables.

Methods F and G Embodiment 4

In accordance with an aspect of the present disclosure, there is provided a deep learning model in the form of a PINN analyzer. The PINN analyzer conducts modeling of a specific property and detects a source and its characteristics and specific properties by defining any filters used to clean the data of the transport variables. In this case, the noise in the experimentally measured values in the thermal-spatial-point-clouds is removed using noise filters, for example, Kalman filters. Also, the PINN analyzer uses a convolution that accounts for the noise filters.

In a specific embodiment, the object is a female breast and the PINN analyzer considers a Kalman filter. The Kalman filter is included as a convolutional layer located after the output layer.

Methods F and G Embodiment 5

In accordance with an aspect of the present disclosure, there is provided a deep learning model in the form of a PINN analyzer. The PINN analyzer conducts modeling of a specific property and detects a source and its characteristics and specific properties by:
a. including a loss value assigned to the thermal-spatial-point-cloud.
b. the minimization of the loss value to ensure that the PINN analyzer adjusts the modeling transport variable based on the information on the thermal-spatial-point-cloud In a specific embodiment, the object is a female breast and the PINN analyzer considers a thermal-spatial-point-cloud of the breast surface.

Methods F and G Embodiment 6

In accordance with an aspect of the present disclosure, there is provided a deep learning model in the form of a PINN analyzer. The PINN analyzer conducts modeling of a specific property and detects a source and its characteristics and specific properties by:
a. identifying training variables that define the source characteristics. The source characteristics might include variables that represent the source location in the form of the Cartesian coordinates $x_0$, $y_0$, $z_0$, the size of the source in the form of a radius $R_0$, or the magnitude of the source $Q_0$.
b. including the training variables $x_0$, $y_0$, $z_0$, $R_0$ in the residuals
c. estimating the magnitude of the losses with the residual
d. finding the values of the source characteristics by minimizing the losses with an optimizer In a specific embodiment, the object is a female breast and the PINN analyzer considers the source as a tumor that generates heat. If a tumor is not present in the breast, the PINN analyzer might predict a source with a radius of 1 mm or less. Another possibility is that the PINN analyzer might predict the tumor to be outside the breast region.

Methods F and G Embodiment 7

In accordance with an aspect of the present disclosure, there is provided a deep learning model in the form of a PINN analyzer. The PINN analyzer conducts modeling of a specific property and detects a source and its characteristics and specific properties where the training variables can be expressed as part of a mathematical function. These functions may include Gaussian distribution, Beta distribution, Gamma distribution, or any other distribution available and their combinations.

In a specific embodiment, the object is a female breast and the PINN analyzer considers a Gaussian distribution to include the source and the training variables.

Methods F and G Embodiment 8

In accordance with an aspect of the present disclosure, there is provided a deep learning model in the form of a PINN analyzer. The PINN analyzer conducts modeling of a specific property and detects a source and its characteristics and specific properties where:
a. the values of the training variables could be constrained to a certain range using functions that limit the range of the values. These constraint functions may include sigmoid, hyperbolic tangent, sinusoidal, or a linear function. A combination of these functions is also possible. Other functions that constrain the values of the training variables to a certain range are also possible.
b. the values of the training variables may be driven to a certain value by using functions that are part of the residuals used to train the PINN analyzer. For instance, distance functions that define a reference point or value inside the object could be used to constrain the values of the training variables.

In a specific embodiment, the object is a female breast and the PINN analyzer considers distance functions to drive the values of the training variables to a point inside the breast. These distance functions are adjusted depending on the location of the breast in relation to the tumor.

Thermal-Spatial-Point-Cloud Embodiment 1

In accordance with an aspect of the present disclosure, there is provided a process for obtaining the temperatures and spatial information of the surface of an object in the form of thermal-spatial-point-clouds. The temperatures may be obtained through different surface thermal measurement tools such as IR sensors, including thermal or IR cameras and active IR systems, thermocouples, thermometers, or temperature sensitive paint.

In a specific embodiment, the object is a female breast and the temperatures are obtained from an IR camera.

Thermal-Spatial-Point-Cloud Embodiment 2

In accordance with an aspect of the present disclosure, there is provided a process for obtaining the temperatures and spatial information of the surface of an object in the form of thermal-spatial-point-clouds through a Point-Cloud Generation Method. The thermal-spatial-point-cloud includes the spatial information and temperatures at respective spatial locations at different locations on the surface of the object. The spatial information is obtained using an image acquisition system including:
a. At least one specifically oriented light projector projecting a beam of light in the form of a light marker, wherein the light marker has the shape including:
  i. Point
  ii. Spot iii. Line
  iv. Grid
  v. Any other geometric shape.
b. At least one optical camera that is sensitive to the beam of light projected by the light projector in a light spectrum including:
  i. Visible
  ii. Infrared
  iii. Near-infrared
  iv. Far-infrared
  v. Any other spectrum used in imaging of an object.

In a specific embodiment, the object is a female breast and the spatial information associated with the temperatures is obtained from an optical camera in the visible spectrum known as a photographic camera that captures light markers in the shape of vertical line projected by a light projector. The light marker can take the form of a continuous line, dotted line, or line with multiple spots or dots appearing on the surface of the object.

Thermal-Spatial-Point-Cloud Embodiment 3

In accordance with an aspect of the present disclosure, there is provided a process for obtaining the temperatures and spatial information of the surface of an object in the form of thermal-spatial-point-clouds through a Point-Cloud Generation Method. The thermal-spatial-point-cloud may be obtained by using a Point-Cloud Generator including:
  a. Capturing multi-view optical and infrared images with:
    i. multiple cameras at all viewpoints
    ii. fewer cameras changing positions to obtain all viewpoints
    iii. a single camera changing positions to obtain all viewpoints
    iv. a binocular camera setup in the form of any of the previously mentioned acquisition setups.
  b. Performing a Temperature Mapping method to correspond the temperatures of the IR images with the spatial information using at least one registration method including:
    i. Pixel-based image registration
    ii. Contour-based image registration
    iii. Multimodal image registration
    iv. Aligning the principal points and matching the center lines of images at the same view
    v. Any other registration method
    vi. Any combination of the above.
  c. Performing a Point Extraction method to segment the light points projected on the surface by the projector using at least one segmentation method including:
    i. Image thresholding
    ii. Edge detection
    iii. Contour detection
    iv. Any other image processing techniques
    v. Any combination of the above.
  d. A 3D Reconstruction method that generates a spatial-point-cloud using the geometric relationship between the cameras, projected light marker, and axis of rotation of the object.
  e. Assigning temperatures to the corresponding spatial-point-cloud points to generate the thermal-spatial-point-cloud.

In a specific embodiment, the object is a female breast, the thermal-spatial-point-cloud is obtained from multi-view photographic and infrared images with a single photographic camera and infrared camera, respectively, changing positions, aligning the principal points and matching the center lines of images in the same view, and assigning temperatures to the corresponding locations on the line from the spatial-point-cloud using spatial and temperature information from these images.

Additional Embodiments

An embodiment includes a method for identifying a source, with a positive value for addition and negative value for removal as in a sink, of at least one of the energy, mass, momentum, species, light, electromagnetic, and radiation, and its characteristics including parameters that are related to the source, of at least one of the location, strength, magnitude, shape related parameters such as radius, velocity and acceleration, within a system, including an object and its surroundings, using characteristic-point-clouds containing property information of the spatial, temporal and other specific properties, including of at least one of the transport, thermophysical, optical, radiative, electromagnetic, and physical properties, at specified individual points within the system, utilizing Physics Informed Neural Network machine learning algorithm in the form of a PINN analyzer including—obtaining spatiotemporal-point-cloud, including of the spatial and temporal information at specified individual points in the system, in a region of interest in the system; defining a subregion of interest, including of available information of at least one of the specific properties at specific points in the spatiotemporal-point-cloud, wherein the available information is obtained through one or more of the experimental, numerical and analytical techniques; defining the boundary conditions and the governing equations that govern the distribution of at least one of the specific properties in the system; defining subregion-conditions that describe the available values of at least one of the properties at specific points in the subregion; expressing the boundary conditions, the subregion-conditions, and the governing equations in terms of the source characteristics; using the source characteristics as training variables, including of the variables used for training an algorithm including the specific properties and the source characteristics, in the algorithm; using at least one of the specific properties in the governing equations as training variables in the algorithm; predicting the value of at least one of the specific properties and the source characteristics that satisfy the governing equations and the boundary conditions using the algorithm in an iterative process, including of a repeating sequence of steps used in an algorithm to successively improve the accuracy of predicting a given variable starting with an initial guess value and refining it until it reaches a final value.

An embodiment includes a method, wherein the values of the specific properties are predicted by a method including—initially assigning values, including of one of the prescribed values and random values, to the specific properties at points in the characteristics-point-cloud and using these values as initial guess values; using residuals, including of the difference between the expected and predicted values of scaled functions derived with the scaling range preferably between 0 and 1 from the boundary conditions and the governing equations, in the system at the points in the characteristics-point-cloud using the boundary conditions and the governing equations; using driven-residuals, including of residuals that are used to drive the training variables to a reference point in the system, by using distance functions, wherein the distance function describes the distance between the reference point, defined as a point located in the system that is used to drive the training variables to that point, and a point defined by the training variables; driving the training variables to a reference point by activating the driven-residuals during the training of the algorithm; defining residuals in the subregion as the difference between the predicted and the available specific properties; estimating the losses based on the residual values in the system and subregions using an appropriate function including the mean of the squares, sum of the squares, maximum of the squares, mean of the absolutes, other mathematical functions, and combination with weight functions of these and other individual techniques; training the PINN analyzer by minimizing the losses; obtaining at least one of the source characteristics and the specific properties when the losses do not exceed a prescribed convergence value and the variation of the training variables has reached asymptotic condition, which is attained preferably when the change in the training variable during the training is below 10-3 and the convergence value is in the range of 10-9 to 10-1.

An embodiment includes a method, wherein the source is a heat source and its characteristics are defined by the rate of heat generation, physical size of the source, and the location of the source within the system.

An embodiment includes a method, wherein—the boundary conditions include at least one of the constant temperature, convection, radiation, and heat flux conditions; the governing equations include at least one of the Pennes bioheat equation and a modified Pennes bioheat equation by using at least one distribution function for the heat source and perfusion rate.

An embodiment includes a method, wherein—the object is a body part of a living being and the heat source is a cancerous tumor within the body part; specific distribution functions such as Gaussian, beta, gamma, uniform, any other mathematical function, or a combination of these functions are used to express the metabolic heat generation and the perfusion rate in the tumor and tissue of the body part in the modified Pennes bioheat equation; the tumor radius, including of the radius of the tumor if it is spherical and the equivalent radii in different directions that are representative of other shape, is expressed as a function of the standard deviation in the distribution functions which include the spatial and temporal location of the tumor.

An embodiment includes a method, wherein the perfusion rate is in the range of 10-5 to 10-1 per second and the metabolic heat generation rate is in the range of 0 to 105 W/m3.

An embodiment includes a method, wherein—subregion-conditions consider de-noised average values, derived from a noise filtering algorithm applied to a group of points in the thermal-spatial-point-cloud of the temperature at the breast surface; a convolution is applied after the output of the physics informed neural network to train the neural network with the de-noised average temperature values, wherein the convolution applies a noise filter, preferably the Kalman filter.

An embodiment includes a method, wherein—the distance function considers a distance between a predicted point and a reference point wherein the predicted point is defined by the predicted values of the training variables during the iterative process; the distance functions are deactivated when the scaled distance between the predicted point and the reference point is in the range of 10-9 to 10-1, wherein the scaling is based on the maximum and minimum values of the object dimensions and range of temperatures, and the scaled values range between 0 to 1.

An embodiment includes a method, wherein—a heat source is suspected when at least one of the radii or equivalent radii of the source is greater than a predetermined size, preferably 1 mm, more preferably 2 mm, and the source is located inside the breast.

An embodiment includes a method for generating characteristic-point-clouds within in a system, including of an object and its surroundings by—generating a spatiotemporal-point-cloud, wherein the spatiotemporal-point-cloud comprises of spatial and temporal information which reduces to spatial-point-cloud under steady-state and at a specific time condition, within a system; generating a spatiotemporal-specific-property-point-cloud, which includes additional information regarding specific property at the respective points in the spatiotemporal-point-cloud, corresponding to the points in the spatiotemporal-point-cloud; integrating the spatiotemporal-point-cloud with the spatiotemporal-specific-property-point-cloud through respective point correspondences and generating a characteristic-point-cloud.

An embodiment includes a spatial-point-cloud generation method, wherein—the object is a) translucent to the imaging light, b) opaque to the imaging light; and the spatial-point-cloud is generated by i) generating multi-view images of the object with an image acquisition system, and ii) conducting 3D reconstruction with a Point-Cloud Generator.

An embodiment includes a method, wherein the multi-view images are generated using at least one infrared camera.

An embodiment includes a method, wherein the characteristic-point-cloud is a thermal-spatial-point-cloud.

An embodiment includes a method, wherein the object is a body part of a living being.

An embodiment includes a method, wherein the infrared light marker is used to identify the spatial location of a region with a temperature profile of interest, including of high-localized values of temperature or large temperature gradients in the infrared image.

The above-described subject matter can be implemented in any of numerous ways. For example, some aspects can be implemented using hardware, software or a combination thereof. When any aspect is implemented at least in part in software, the software code can be executed on any suitable processor or collection of processors, whether provided in a single device or computer or distributed among multiple devices/computers.

The present disclosure can be implemented as a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium comprises the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, blockchain, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some examples, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions can be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams can represent a module, segment, or portion of instructions, which comprises one or more executable instructions for implementing the specified logical function (s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The disclosure will be further illustrated with reference to the following specific examples. It is understood that these examples are given by way of illustration and are not meant to limit the disclosure or the claims to follow.

EXAMPLES

Example 1—Heat Source Detection with Surface Temperature Information on the Breast Surface and Using Chest Temperature as the Boundary Condition for the Base of the Breast The present example shows the results of employing the PINN analyzer in detecting a heat source and its characteristics and the tissue thermal conductivity in an object consisting of the breast of a patient with biopsy proven breast cancer. The tumor acts as the heat source. The object consists of the breast surface, the chest base, and the interior tissue inside the breast. A heat generation source in the form of a tumor of a certain radius with a specific location is inside the object. The PINN analyzer finds the heat generation source size and location and the tissue thermal conductivity. The heat source may also include a thermal signature created by increase blood perfusion rate in the tumor and surrounding region.

Method A, Method B, Method C, Method F, and Method G were adopted to perform the tumor identification with the help of the PINN analyzer.

Method A was applied to receive the multiple characteristic-points-clouds that defined the breast object, including (i) the surface thermal-spatial-point-cloud on the breast surface with IR temperatures, (ii) the chest thermal-spatial-point-cloud on the base of the breast connecting to chest with the chest temperatures, and (ii) the interior spatial-point-cloud in the internal tissue. The temperatures at the interior points obey the modified Pennes bioheat equation, which includes tumor metabolic heat generation and increased perfusion rate. Table 2 shows the number of points in the various characteristic-point-clouds. The PINN analyzer considered a surface thermal-spatial-point-cloud and a chest thermal-spatial-point-cloud on the chest with the chest temperatures consisting of 2000 random points and an interior spatial-point-cloud consisting of 22,000 random points.

TABLE 2

Number of points in the spatial-point-clouds of the various regions of a breast object.

| Spatial-point-cloud region | Number of points |
| --- | --- |
| Base-1 | 2000 |
| Base-2 | 2000 |
| Surface | 2000 |
| Exterior | 4000 |
| Interior | 22000 |

Method B identified the form of loss values in each of the characteristic-point-clouds to be minimized during the training of the PINN analyzer. The loss values and total loss in each characteristic-point-cloud were estimated based on the boundary conditions of constant chest temperature, and convection heat transfer on the surface. The governing equation was the modified Pennes bioheat equation. Eq. (10)-(12) calculated the residual values for the points in the characteristic-point-clouds defining (i) base-1 region, (ii) base-2 region, (iii) surface region, (iv) exterior region, and (v) interior region. The residual values for the points in the characteristic-point-clouds defining the interior-region were calculated from the Pennes bioheat transport equation given by Eq. (13). The magnitude of the losses of each region in the breast object was made equal to the square value of the residuals given by Eqs. (14)-(18). The total loss was estimated as the sum of the losses as given by Eq. (19).

Method C used the PINN analyzer to minimize the total loss and the individual losses with the help of a machine learning algorithm. The machine learning algorithm consists of a fully connected neural network with three hidden layers and twenty neurons on each layer. The inputs to the neural network are the Cartesian x, y, z location of the points in the thermal-spatial point clouds and in the spatial-point-clouds. The output of the neural network is the predicted temperature at the points in the spatial-point-clouds. To account for noise effects in the IR temperatures, a convolutional layer was added after the output layer of the neural network. The optimizer Adam minimized the losses to find the tumor characteristics and tissue thermal conductivity. The machine learning platform TensorFlow was used to perform the training of the PINN analyzer.

Method F identified the training variables related to the tumor characteristics and expressed the Pennes bioheat equation in terms of the source characteristics. The source characteristics included the variables representing the tumor 3D location in the form of the Cartesian coordinates $x_0$, $y_0$, $z_0$, the size of the tumor in the form of a radius $R_0$, or the magnitude of the tumor heat generation $Q_0$. Another training variable to be calculated by the PINN analyzer was the tissue thermal conductivity. To include the training variables $x_0$, $y_0$, $z_0$, $R_0$ in the residuals, the perfusion rate and the heat generation in Eq. (13) were defined as function of $x_0$, $y_0$, $z_0$, and $R_0$ as:

$$\omega_{b,i}=G(x_0,y_0,z_0)\omega_{tumor}+(1-G(x_0,y_0,z_0))\omega_{healthy} \quad (53)$$

$$\dot{q}_{m,i}=G(x_0,y_0,z_0)\dot{q}_{tumor}+(1-G(x_0,y_0,z_0))\dot{q}_{healthy} \quad (54)$$

where G is a distribution function. In the case of a Gaussian distribution, G is expressed as:

$$G(x_i, y_i, z_i) = 1.0 \exp\left[-\left(\frac{(x_i - x_0)^2}{2 \cdot \sigma^2}\right) - \left(\frac{(y_i - y_0)^2}{2 \cdot \sigma^2}\right) - \left(\frac{(z_i - z_0)^2}{2 \cdot \sigma^2}\right)\right] \quad (55)$$

where ($x_0$, $y_0$, $z_0$) are the Cartesian coordinates that defined the location of the center of the tumor, and $\sigma$ is the standard deviation. The proposed modified Pennes bioheat equation expresses $\sigma$ as function of the tumor radius. Various functions can be defined, the most common is to make $\sigma$ equal to the tumor radius $R_0$ as:

$$\sigma = R_0 \quad (56)$$

Eq. (55) assumes that the radius is the same along the x, y, and z directions. This assumption can be removed by considering characteristic lengths of different magnitude along each direction given by $l_{0_x}$, $l_{0_y}$, and $l_{0_z}$ in the respective coordinate directions. This will give the following distribution function:

$$G(x_i, y_i, z_i) = \exp\left[-\left(\frac{(x - x_0)^2}{2 \cdot l_{0_x}^2}\right) - \left(\frac{(y - y_o)^2}{2 \cdot l_{0_y}^2}\right) - \left(\frac{(z - z_0)^2}{2 \cdot l_{0_z}^2}\right)\right] \quad (57)$$

The modified Eq. (57) allows the PINN analyzer to predict tumor of non-spherical shapes. In this case, the characteristic diameter is related to the characteristic length by a specific function that gives equivalency between the heat generation rates of these tumor shapes. The tumor defined by lx, ly, lz gives the same heat generation rate as a tumor with the equivalent diameter. The relationship between heat generation rate and tumor diameter is obtained from available literature, such as the table given by Gautherie. This is shown in Eq. (58), where $d_{tumor}$ is the tumor diameter which can be expressed in terms of the tumor radius $R_0$ through Eq. (59). The volumetric heat generation rate in a heat generating tissue with higher metabolic rate than healthy tissues depends on the size of the heat generating region, which is also the heat source region, as described by Gautherie. The vasculature created by angiogenesis supplies the additional blood supply to these regions. The heat generation rate is due to metabolic activity and the presence of additional blood supply due to angiogenesis in this region. The combined effect of metabolic activity and angiogenesis is considered in the Pennes bioheat equation through metabolic heat generation and perfusion rate terms. In general, suspected malignancy or presence of cancer is indicative by increased heat flow in a certain region due to metabolic heat generation and perfusion rate. The PINN analyzer detects the presence or absence of a heat source inside the breast. A heat source is indicative of a metabolically active tumor. A heat source may also be indicative of a higher perfusion rate caused by angiogenesis. In general, depending on the level of metabolic activity and perfusion rate, the tumor may be malignant or benign. In general, malignant tumors have a higher metabolic activity and perfusion rates as compared to non-cancerous tissues. Gautherie's data for tumor diameter to the metabolic heat rate is expressed by the following equations. The diameter of the heat source considered in this disclosure is an equivalent diameter of a spherical heat source that has the same total heat generation rate in the heat source, which is considered as a tumor in Gautherie's work. These equations are used for the diameter of the heat source, $d_{tumor}$, which is twice the radius of the heat source, $R_0$, and volumetric heat generation rate, $\dot{q}_{tumor}$, W/m3, in the heat source.

$$\dot{q}_{tumor} = \frac{3.27 \times 10^6}{468.5 \cdot \ln(100 \cdot d_{tumor}) + 50} \quad (58)$$

$$d_{tumor} = 2 \cdot R_0 \quad (59)$$

It is also possible to use the PINN analyzer to retrieve other thermal properties including the blood density, blood temperature, or perfusion rate. Also, dynamic systems or transient systems can retrieve the tissue density. Also, a term combining multiple properties (e.g., a dimensionless number or thermal diffusivity) can be retrieved with the PINN analyzer.

The substitution of Eqs. (53)-(56) in Eq. (13) ensures that the training variables are included in the estimation of the residuals and losses. By minimizing these losses, the PINN analyzer finds the values of the source characteristics that satisfy the boundary conditions and governing equations. The modifications of Pennes bioheat equation includes the tumor characteristics in the minimization of the residuals, which converts the training process into an optimization process.

This example utilizes a novel technique to constraint the values of the variables without using mathematical functions. Instead, novel losses and residual functions are defined to help the PINN analyzer to drive the training variables to a specific random location. In the present disclosure, the residual functions that drive the training variables are termed drive-residuals. The drive-residuals help the PINN analyzer to learn that the source is preferably inside the object and avoid the trivial solution. The novel technique consists of two main sequential steps: (i) bending and (ii) recovery. The bending process helps the PINN analyzer to learn that a tumor is preferably inside the breast object by considering distance functions that drive the tumor towards a random reference point inside the breast object. After the PINN analyzer has learned that the tumor is preferably inside the breast object, the recovery process removes the constraint of the distance functions and now the variables find an optimal value inside the breast object.

The bending process considers the following driven-residuals that are defined based on the difference between a reference value and the respective tumor characteristic being predicted by the PINN analyzer during its training:

$$res_d = \sqrt{(x_{ref}-x_0)^2+(y_{ref}-y_0)^2+(z_{ref}-z_0)^2}-d \quad (60)$$

$$res_{d_x} = \sqrt{(x_{ref}-x_0)^2}-d_x \quad (61)$$

$$res_{d_y} = \sqrt{(y_{ref}-y_0)^2}-d_y \quad (62)$$

$$res_{d_z} = \sqrt{(z_{ref}-z_0)^2}-d_z \quad (63)$$

where $x_{ref}$, $y_{ref}$, and $z_{ref}$ correspond to the coordinates of a random reference point located inside the breast object. d, $d_x$, $d_y$, and $d_z$ are distance or difference from the reference point. These distances might be small enough to allow the training variables to be driven towards the reference point.

The losses related to residuals of the constrain distance functions are computed as:

$$loss_d = \frac{1}{N_d}\sum_{i=1}^{N_d}res_d^2 + \frac{1}{N_d}\sum_{i=1}^{N_d}res_{d_x}^2 + \frac{1}{N_d}\sum_{i=1}^{N_d}res_{d_y}^2 + \frac{1}{N_d}\sum_{i=1}^{N_d}res_{d_z}^2 \quad (64)$$

where $N_d$ is the number of points where the distance constraints should be applied.

It is possible to define similar distance functions for other non-spatial variables such as the source magnitude, or the source radius. For example, a reference tumor magnitude can be defined to drive the predicted tumor magnitude to a certain value. It is vital to properly scale the training variables to ensure that the various terms in the distance functions are in the same order of magnitude. The number of iterations during the bending process in the training of the PINN analyzer can be 2 million. More than 2 million iterations may be required to improve the accuracy or may not adversely affect the accuracy of the PINN analyzer in detecting the source characteristics. Similarly, less than 2 million iterations may not adversely affect the accuracy of the PINN analyzer in detecting the source characteristics.

Method-G defined filters to account for noise in the IR. The residual values for the points in the thermal-spatial-point-cloud were estimated from the condition experimental temperature as given by Eq. (23), which includes the predicted noise-filtered temperature and the experimentally estimated noise-filtered temperature. A Gauss-kernel noise filter accounted for the noise removal as given by Eq. (24).

Table 3 shows the adopted thermal properties in the Pennes bioheat equation. The training consisted of one million iterations.

TABLE 3

Thermophysical properties and conditions used in the PINN analyzer modeling.

| Parameter | Value | Unit |
|---|---|---|
| Perfusion rate of healthy tissue ($\omega_h$) | $1.8 \times 10^{-4}$ | 1/s |
| Perfusion rate of tumor ($\omega_t$) | $9 \times 10^{-3}$ | 1/s |
| Metabolic activity of healthy tissue ($\dot{q}_h$) | 450 | W/m³ |
| Metabolic activity of tumor ($\dot{q}_t$) | 5,000-70,000 | W/m³ |
| Temperature of arteries ($T_a$) | 37 | ° C. |
| Specific heat of blood ($c_b$) | 3,840 | J/kg-K |
| Density of blood ($\rho_b$) | 1,060 | Kg/m³ |
| Core temperature ($T_c$) | 37 | ° C. |
| Ambient temperature ($T_\infty$) | 21 | ° C. |
| Heat transfer coefficient (h) | 5 | W/m²-K |
| Reference diameter (D) | 0.1182 | m |

Figure 11:
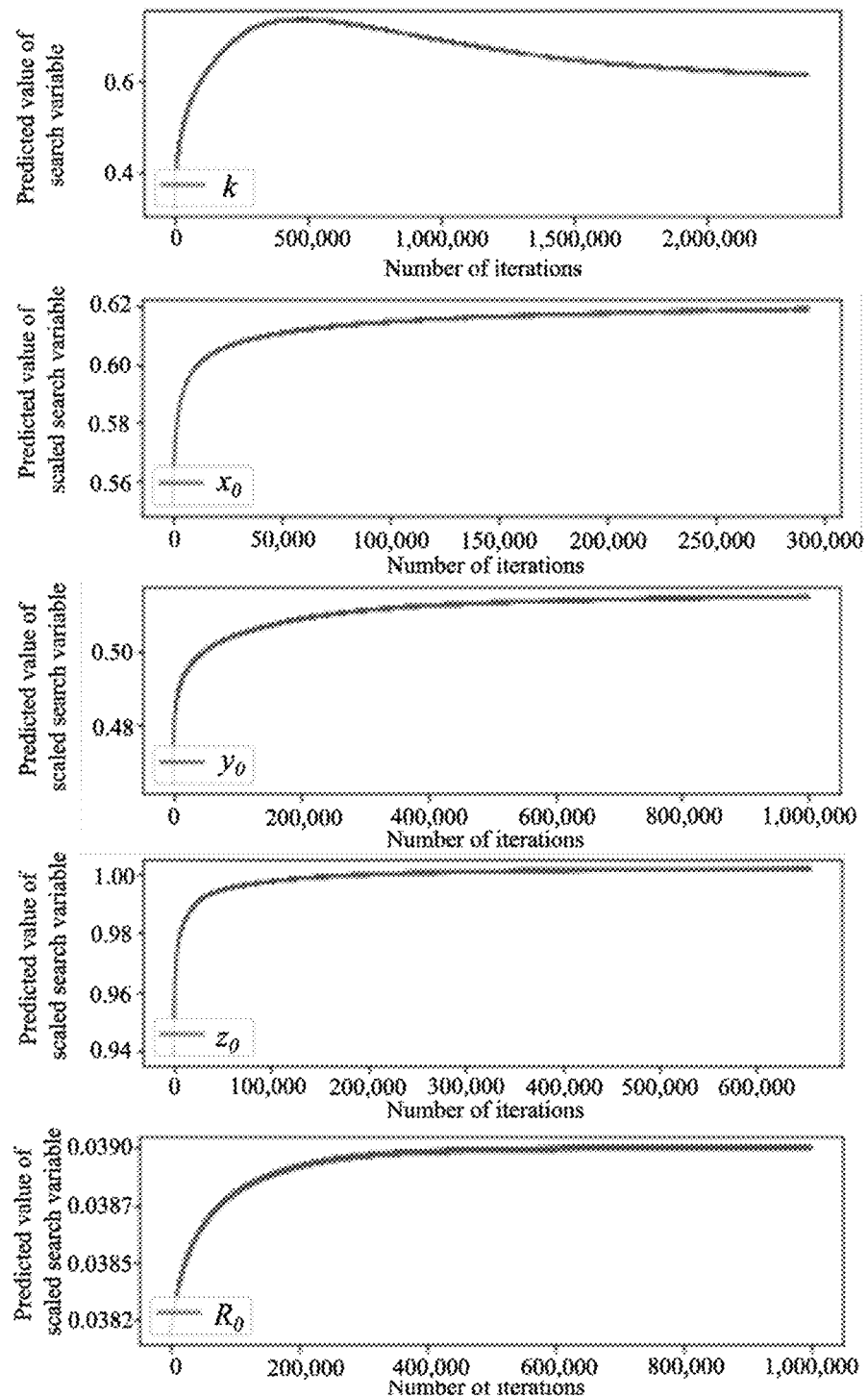
FIG. 11 shows an example of the trends followed by the search variables in the training of the PINN analyzer applied to detect a heat source in a breast object with a heat source.

At the end of the training, the PINN analyzer displayed plots with the x-axis showing the iteration number and the y-axis showing the value of the training variables ($x_0$, $y_0$, $z_0$, k). The PINN analyzer displays a plot for each of the training variables. FIG. 11 shows the trends representing the change of the search variables during the training of the PINN analyzer after removing the driving condition. The trends shown in FIG. 11 give a scaled location and radius ($x^*_0$, $y^*_0$, $z^*_0$, $R^*_0$), where $x^*_0$ is equal to $x_0$ divided by the reference diameter D given in Table 3, and similar scaling is done for the other search variables related to the location and size of the source. Results indicate that the PINN analyzer generates an asymptotic trend at the end of the training for the considered search variables defining the source characteristics and the tissue thermal conductivity. The values of the training variables, or search variables, at the end of the training correspond to the predicted heat source location ($x_0$, $y_0$, $z_0$) and the equivalent heat source radius ($R_0$), and the tissue thermal conductivity (k). Table 4 shows the predicted values of the search variables at the end of the training of the PINN analyzer. Results indicated a maximum error of 3 mm in the spatial location and radius relative to the values given by the available clinical data and MRI images. The predicted thermal conductivity is not reported in Table 4 since such a parameter does not have a target value in the available clinical data.

TABLE 4

Comparison in the localization of the heat source between the predicted value by the PINN analyzer and the available clinical data and MRI images.

| Parameter | Patient-1 |
|---|---|
| $x_{0, targ}$ (m) | 0.076 |
| $x_{0, pred}$ (m) | 0.073 |
| $y_{0, targ}$ (m) | 0.060 |
| $y_{0, pred}$ (m) | 0.061 |
| $z_{0, targ}$ (m) | 0.118 |
| $z_{0, pred}$ (m) | 0.119 |
| $r_{0, targ}$ (m) | 0.0070 |
| $r_{0, pred}$ (m) | 0.0046 |

The search variables, which represent the training variables, follow a common pattern during the training. The PINN analyzer identifies the search variable being higher/lower than the initial value during the first couple of iterations. In the case of the search variable of the thermal conductivity, k, results in FIG. 11 show that the PINN analyzer generates a peak value of 0.7 W/m-K at 450,000 iterations. As the number of iterations increase, the value of the search variable decreases and reaches 0.6 W/m-K. After 2,000,000 iterations the trend of the search variable becomes asymptotic indicating that the PINN analyzer has identified an optimized value. In the case of the search variables related to the location and size of the heat source, results in FIG. 11 show that the PINN analyzer generates a trend that quickly increases to a value close to the target, and after 100,000 iterations the search variables get close to the target value. After 300,000 training iterations, the trend followed by the search variables related to the location and size of the heat source becomes asymptotic.

Example 2—Analysis of a Patient Breast without a Metabolically Active Tumor or a Region of Increased Perfusion Rate to Confirm the Absence of a Heat Source The PINN analyzer finds heat sources in objects. It can find whether a patient's breast has a heat source or not. Therefore, a test was made to evaluate the performance of the PINN analyzer in a patient's breast without a heat source. In general, this may be indicative of a healthy patient. A threshold of metabolic activity is used to indicate presence or absence of a heat generating source. In general, some of the benign tumors also have a metabolic activity that is generally lower than a cancerous tumor. In general, setting a threshold will result in classifying some of the breasts with a lower heat generation rate as having no heat source. This will put the low heat generation rate regions of the breast in the same category as absence of heat generating source. Effectively, some of the low heat generating regions will be missed in this technique. Setting the heat generation threshold too low will mark some of the low heat generating regions in a breast as those having a heat generating source. Setting a proper threshold is a compromise between these two considerations. In general, it is preferable to set the threshold such that higher heat generating tumors are detected, recognizing that some of the heat sources with heat generation rate higher than the threshold value are also detected. Gaining experience after studying a larger data set or using other information such as mammogram, MRI, ultrasound, may aid in establishing a more accurate threshold. These techniques provide information on the presence of a heat source.

Method A, Method B, Method C, Method F, and Method G were adopted to perform the tumor identification with the help of the PINN analyzer.

Method A was applied to receive the multiple characteristic-points-clouds that defined the breast object. Table 2 shows the number of points used to train the PINN analyzer.

Method B identified the form of loss values in each of the characteristic-point-clouds to be minimized during the training of the PINN analyzer. The residual values for the points in the characteristic-point-clouds defining the interior-region were calculated from the Pennes bioheat transport equation given by Eq. (13). The magnitude of the losses of each region in the breast object was made equal to the square value of the residuals given by Eqs. (14)-(18). The total loss was estimated as the sum of the losses as given by Eq. (19).

Method C used the PINN analyzer to minimize the total loss and the individual losses with the help of a machine learning algorithm. The PINN analyzer consisted of a fully connected neural network with 3 hidden layers and 20 neurons on each layer. The inputs where the x, y, and z coordinates of the points in the spatial-point-clouds and the outputs where the temperature at the corresponding points. A convolution applied to the output temperatures accounted for noise in the IR temperatures. The optimizer Adam minimized the losses to find the tumor characteristics and tissue thermal conductivity.

Method F identified the training variables related to the tumor characteristics and expressed the Pennes bioheat equation in terms of the source characteristics. The tumor location $x_0$, $y_0$, $z_0$ and radius $R_0$ and the tissue thermal conductivity k were declared as search variables. To include the training variables $x_0$, $y_0$, $z_0$, $R_0$ in the residuals, the perfusion rate and the heat generation in Eq. (13) were defined as function of $x_0$, $y_0$, $z_0$, and $R_0$ as given by Eqs. (53)-(56). Drive-residuals given by Eqs. (60)-(64) helped the PINN analyzer to learn that the source is preferably inside the object and avoid the trivial solution.

Method G defined filters to account for noise in the IR. The residual values for the points in the thermal-spatial-point-cloud were estimated from the condition experimental temperature as given by Eq. (23). A Gauss-kernel noise filter accounted for the noise removal as given by Eq. (24).

Table 3 shows the adopted thermal properties in the Pennes bioheat equation. The training consisted of one million iterations.

Figure 12:
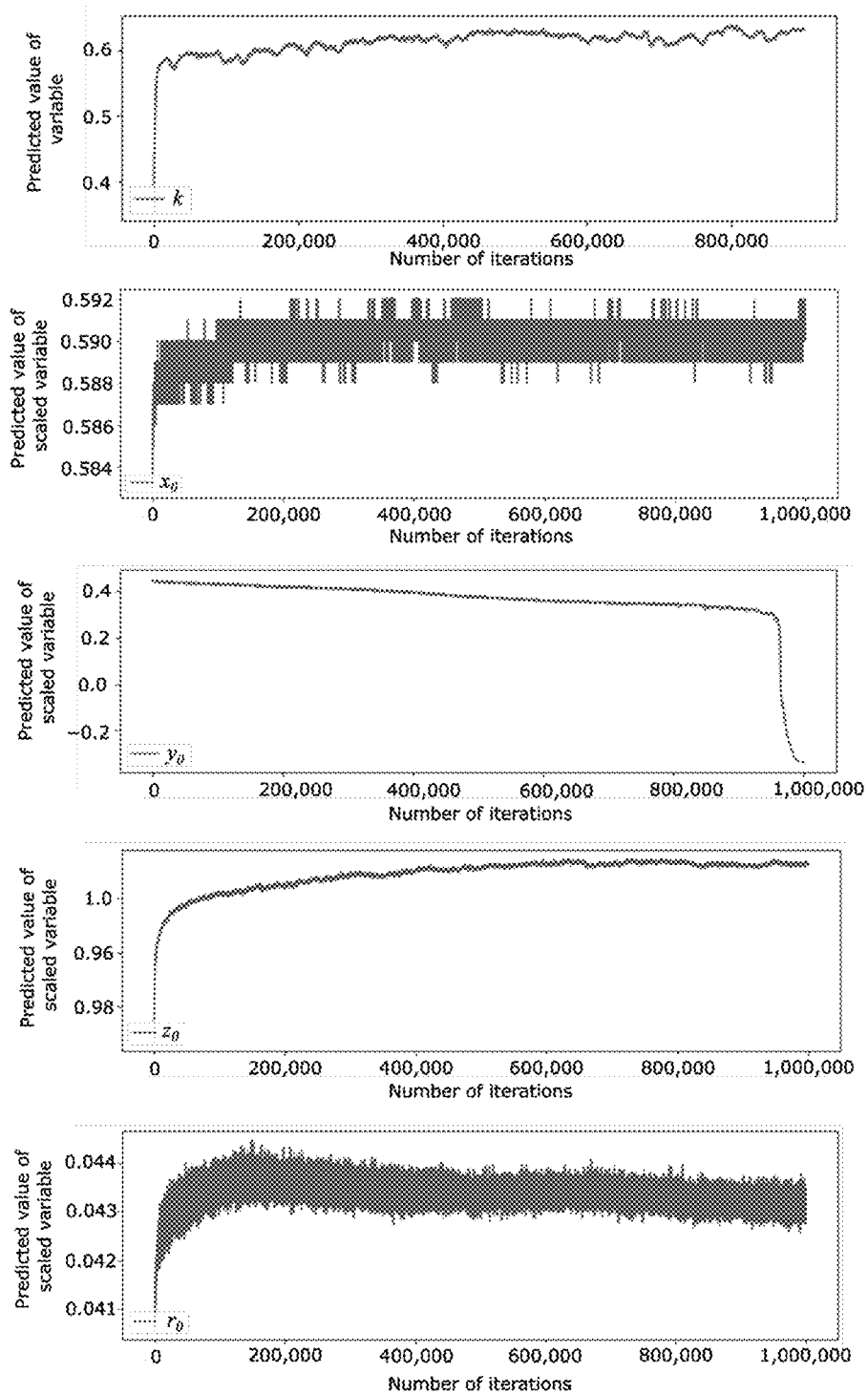
FIG. 12 shows an example of the trends followed by the search variables in the training of the PINN analyzer applied to detect a heat source in a breast object without a heat source.

FIG. 12 shows the trends followed by the search variables in the training of the PINN analyzer after removing the driving condition. The trends shown in FIG. 12 give a scaled location and radius ($x^*_0, y^*_0, z^*_0, R^*_0$). Results indicate that the PINN analyzer is unable to generate an asymptotic trend for each of the search variables related the heat source location and radius. The source location $x_0$ and radius $R_0$ show values with strong oscillations around a mean value. The source location $y_0$ shows a linear trend during the first 900,000 iterations, and then the search value quickly decreases to a negative value placing the source outside the breast region. The source location $z_0$ shows less strong oscillation reaching an asymptotic behavior at the end of the training of the PINN analyzer. The predicted thermal conductivity reaches an asymptotic trend with a value of 0.6 W/m-K at the end of the 1,000,000 training iterations. The results show that the PINN analyzer is unable to generate asymptotic trends for all the variables, which indicates that the analyzed breast does not contain a heat source. Also, results show that the PINN analyzer placed the heat source outside the object in predicted the $y_0$ location, which increases the confidence in the prediction of no heat source present in the breast.

Example 3—Display of Regions within a Breast Having a Heat Source

Figure 13:
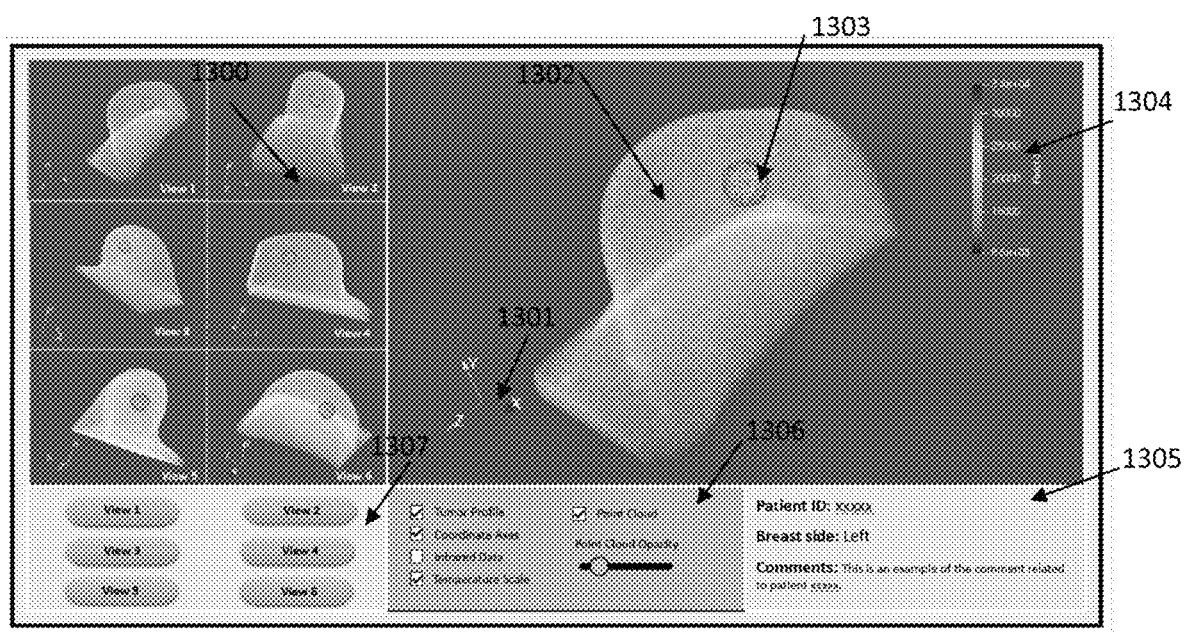
FIG. 13 shows an example of the display of a region within a breast having a heat source.

The display shows the distribution of the thermal heat generation inside the breast with units of $W/m^3$. FIG. 13 shows a display for the case of a patient with a heat source in the breast indicating the distribution of heat generation. The display contains images showing different orientations 1300, a rotating Cartesian axis 1301, a 3D image of a digital breast model created from the spatial-point-clouds of the breast object 1302, a region with a high heat generation from tumor metabolic activity and perfusion rate 1303, a color bar showing magnitude of the tumor heat generation 1304, a panel indicating the patient information 1305, panel of different views available 1306, and a display control panel 1307 with various options to modify the displayed figure. The display shows several views of the breast reconstruction and a rainbow-colored region resembling values of tumor metabolic heat generation where red color at the top of the heat generation scale-bar is a high tumor metabolic heat generation and blue color at the lower end of the heat generation scale-bar represents a low metabolic heat generation zone. The display is a 3D dimensional image that can rotate, translate, expand or contract. Radiologist, clinical doctors, or other professionals will get trained on the display functionality. In general, a heat generation rate above the normal healthy tissue may be indicative of presence of a heat source or a higher perfusion rate.

Figures 14A, 14B, 14C:
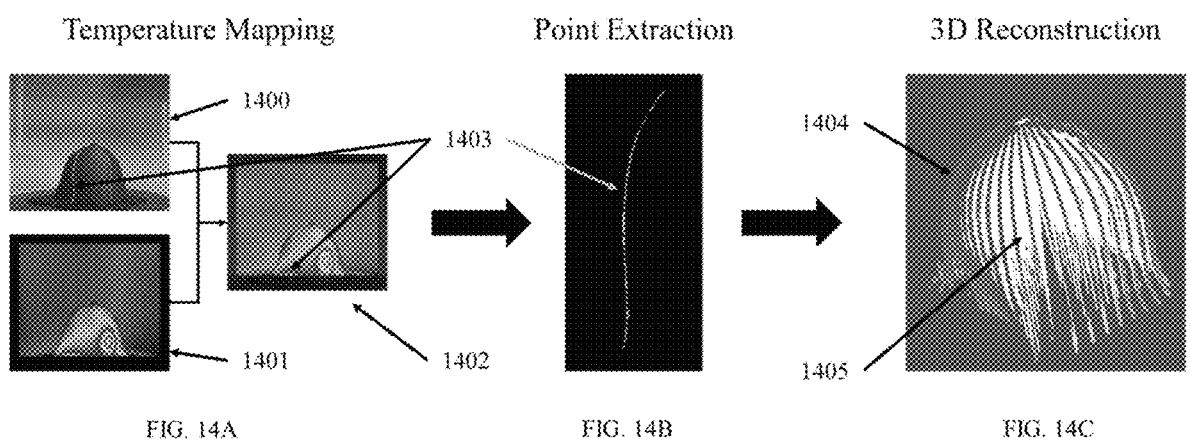
FIG. 14A shows the results of the view alignment of a photographic image and corresponding IR image using the View Alignment method.
FIG. 14B shows the segmented line obtained from image segmentation and line detection.
FIG. 14C shows the thermal-spatial-point-cloud and interior points of the 3D printed digital breast model for Example 4.

Example 4—Thermal-Spatial-Point-Cloud Generation Using an Image Acquisition System and LED Light Projectors Thermal-spatial-point-clouds may be obtained by using the Point-Cloud Generation Method with an image acquisition system consisting of one photographic camera, one IR camera, and two light projectors that each emit a single strip vertical line pattern. In this embodiment, LED light projectors are used as they introduce very low thermal alterations on the surface of the object. The system is moving in counter-clockwise circular trajectory with the physical working distance of the cameras being 60 cm around a 3D printed digital breast model. The angular center lines of both cameras and the light projector pass through the axis of rotation. The steps for obtaining thermal-spatial-point-clouds from photographic and IR images using the Point-Cloud Generation Method with this image acquisition configuration are as follows:

i. Step 1: The system control input parameters ($\alpha$, $\beta$, $\theta$) are set to $\alpha=7.5°$, $\beta=\theta=45°$. This gives 48 photographic and IR images taken at 45° apart from each other, and with the light projectors emitting the line at 45° to the left and right of the photographic camera. To ensure no interference, the light projectors are placed in a different path below the cameras, but with the same trajectory. The view angle will then be of the form $\phi_i=7.5°$ (i−1) for i=1, 2, . . . , 48. The photographic and IR images are saved in the image depository folders RGB_45_45 and IR_45_45, respectively. The file names for both the photographic and IR images will be 00i, for example where the file name for view 1 and view 13 will be 001 and 013, respectively. The temperatures associated with the IR images are saved in a folder called IRtemps with the same file names as the images.

ii. Step 2: The images and temperate data are then undistorted using the Image Distortion Mapping method described in the Point-Cloud Generator: Temperature Mapping section. The function cv.undistort( ) with the camera intrinsic matrix $K^G$ and distortion coefficient vector $dist^G$ is utilized to undistort the photographic images. The IR images, IR camera intrinsic matrix $K^{IR}$, and IR distortion coefficient vector $dist^{IR}$ are utilized with the rectification function cv.initUndistortRectifyMap( ) to create a mapping to undistort the IR temperatures. All camera intrinsic matrices and distortion coefficient vectors were obtained through camera calibration prior to imaging.

iii. Step 3: View alignment is conducted on the undistorted data using the View Alignment method described in the Point-Cloud Generator: Temperature Mapping section. Since the system controller only interacts with the acquisition system, the angles $\alpha$ and $\beta$ will be obtained using the number of images in a folder and the folder names, respectively. The value of $\alpha$ can be obtained by dividing 360° by the number of views 48, which gives $\alpha=7.5°$. The value of $\beta$ is obtained from either the photographic or IR image folders since the first number is the camera separation angle value, which gives $\beta=45°$. Using Eq. 25 the integer value of n that relates $\alpha$ and $\beta$ is obtained to be n=6 for the given configuration. This will allow for the IR image of view i to be the same as the photographic image at view j=i+6 by using Eq. 26 and 27, respectively. A new folder with the name AlignRGB with the file name format as discussed in step 1, but with the photographic image 00j being saved as 00i, which will help with the next step. FIG. 14A, shows the result of the view alignment for the photographic image 1400 and corresponding IR image 1401.

iv. Step 4: After the views are aligned, the Image Registration method described in the Point-Cloud Generator: Temperature Mapping section is utilized to register the IR images and temperatures to the photographic images. This is first done by transforming the pixel points from the image coordinate system to the camera coordinate system using Eq. 28 and 29 with the inverse of the intrinsic matrices $K^G$ and $K^{IR}$. Since the camera center points of each camera, $C^G$ and $C^{IR}$, are moving in the same trajectory, the registration is one-to-one giving the resulting mapped image 1402 shown in FIG. 14A. This makes it easier to assign the undistorted IR temperature values to the corresponding pixel in the photographic camera. These new registered IR temperature data is saved in a folder with the name RegTemps with the file format discussed in step 3.

v. Step 5: The next step is to conduct image segmentation to extract the light marker points, or light points projected by the light projector. The first step to image segmentation is to conduct image thresholding using the hue and saturation values of the photographic image, and the OpenCV function cv.threshold( ) for each value. A binary threshold is created with the hue values and an inverse binary threshold is created with the saturation values, which are then combined to form a mask that separates the entire breast model from the background. A secondary segmentation layer is applied by first applying a Gaussian filter on the segmented breast image to filter out any residual noise on the background. Then binary thresholding is applied again so that the light points are separated from the rest of the breast. Denoise filtering is applied afterwards to remove any outlier points.

vi. Step 6: The Line Detection method from the Point-Cloud Generator: Point Extraction section is then applied since the segmented light points of the two lines are both larger than 5 pixels thick. For this example, the morphological Laplace transform is applied to reduce the pixel thickness to 5 pixels thick. Once the light points are reduced, another denoise filter is applied to smoothen curved line generated by the light points. Then, the light points emitted from the left light projectors are cropped using the y-axis of the camera coordinate system, which passes through the middle of the image. These points are then made into a 2D mask that are used on the registered IR temperature data from step 4. The segmented line obtained from image segmentation and line detection are shown in FIG. 14B where the light points 1403 are the same as the points seen in the photographic image 1400 and the result mapped image 1402 from FIG. 14A. Only the left light point has been extracted and will be utilized for 3D reconstruction.

vii. Step 7: The Initial Reconstruction Method for Case A from the Point-Cloud Generation: 3D Reconstruction section is then applied since all angular center lines pass through the axis of rotation. Initial reconstruction is conducted using Eq. 36 with the X coordinate value of the extracted light points x, the projector angular location relative to the photographic camera θ, and the working distance D. The value of angle θ is obtained using the folder names in the same way β was obtained, but with the value coming from the second number of the folder name which gives θ=45°. Although a physical working distance of the camera is known in centimeters, this will not be the same as the working distance D. Since the range of the X and Y coordinate values are between 0 and 1, exclusive, the working distance value will be set to D=1. This will get the Z-coordinate of light point in each view to be found using the following modified equation:

$$z = 1 - x \qquad (65)$$

which will also be between 0 and 1.

viii. Step 8: Once an initial reconstruction for each view has been created, the Transformation method from the Point-Cloud Generator: 3D Reconstruction section is applied using Eq. 32, 33, 44, and 45. In this example, the values of the rotation point and matrix are $$O^R = [0, -0.14, 1] \qquad (66)$$

$$R_i = \begin{bmatrix} \cos[7.5°(i-1)] & 0 & \sin[7.5°(i-1)] \\ 0 & 1 & 0 \\ -\sin[7.5°(i-1)] & 0 & \cos[7.5°(i-1)] \end{bmatrix} \qquad (67)$$

where Eq. 33 was utilized to obtain the Y coordinate of the rotation point from Eq. 32, and i goes from 1 to 48. This will give a thermal-spatial-point-cloud 1404 of the surface of the 3D printed digital breast model, as shown in FIG. 14C. It may be noted that FIG. 14C is shown as a 3D rendition for clarity.

ix. Step 9: After obtaining the thermal-spatial-point-cloud of the surface of the 3D printed digital breast model, interior points are created using Eq. 50 described in the Interior Point Method from the Point-Cloud Generator: 3D Reconstruction section. The values of the scaling factor are between 0.05 to 0.95 with 25 total scaling factors and 25 copies of the surface spatial points of the thermal-spatial-point-cloud 1404. This gives the interior points 1405 of the 3D printed digital breast model shown in FIG. 14C. The temperature values for the interior points will be set null, as the temperature values inside the 3D printed digital breast model are not known.

x. Step 10: The surface and interior points can then be scaled using the Length Scaling Method from the Point-Cloud Generator: 3D Reconstruction section. Since distortion removal was implemented, the length scale will a constant value. This value is found using a known value in any of the directions, which in this case is the working distance ratios such that:

$$s = \frac{D_{real}}{D} \qquad (68)$$

where $D_{real}$ is the physical working distance at 60 cm, D is the working distances used for reconstruction set to a unitless value of 1, and s is the length scale value. Using these values, the length scale will have a value of s=0.06 m which is then multiplied with the spatial information to get a precise dimensioned reconstructed model.

Example 5—Thermal-Spatial-Point-Cloud Generation an Image Acquisition System, LED Light Projectors, and Two Views Thermal-spatial-point-clouds may be obtained by using the Point-Cloud Generation Method with the image acquisition system from Example 4 and the Initial Reconstruction Method for Case B from the Point-Cloud Generation: 3D Reconstruction section. In this example, the number of light points will be increased compared to the previous example by skipping the point reduction step from Example 4, Step 6 of the process. The steps for obtaining thermal-spatial-point-clouds from photographic and IR images using the Point-Cloud Generation Method with this image acquisition configuration and the Initial Reconstruction Method for Case B are as follows:

i. Step 1: The processes from Steps 1-5 from Example 4 to image the digital breast model, undistort the images, register the IR images and temperatures, and segment the line points are applied. The result will be extracted thermal-spatial light points, also known as light points.

The extracted light points will be of both the left light points 1500 and right light points 1501 as shown in FIG. 15A. These points are separated and saved in the folders LeftPts and RightPts with the same file name convention established in steps 1 and 3, where each light point will be saved with the name 00i to correspond with the view they were taken and registered. The separation is conducted using the principal point of the image by having a vertical line pass through the principal point, which will cut the picture in half. Anything points to the left of this line are left light points and anything to the right of the line are right light points.

ii. Step 2: The Initial Reconstruction Method for Case B from the Point-Cloud Generation: 3D Reconstruction section will be conducted since the light points were not reduced and θ does not correspond with the points in the light points. Prior to conducting this method, the left light points must be corresponded with the right light using Eq. 39 with α=7.5° and $\ell$=12. This will give the correspondence for the left light points at view i to be the right light points at view j=i+12. Then, Eq. P is utilized with the same working distance D=1 from Step 7 of Example 4 to obtain the Z coordinate of the left light points at view i using the X coordinate of the corresponding right light points at view j. This will give Eq. 69 which gets the Z coordinate value for view i using the X coordinate values at view i+12.

$$z^i = 1 - |x^{i+12}| \tag{69}$$

iii. Step 3: Once the initial reconstruction for each view has been created, Steps 8-10 of Example 4 can be implemented to obtain a thermal-spatial-point-cloud and corresponding interior points. The results of the reconstruction are shown in FIG. 15B where 1502 is the thermal-spatial-point-cloud reconstructed using the left light points 1500 and 1503 are the interior points. As the FIG. 15B shows, the reconstruction is not as accurate as that of Example 4 due to matching the left and right light points.

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:

1. A method of generating a thermal-spatial-point-cloud of an object, comprising:
    placing the object within an image acquisition system comprising an optical camera, an infrared camera, and a light projector projecting a beam of light creating a light marker in the form of a spot or a line on a surface of the object;
    rotating around an axis of rotation of the image acquisition system or the object;
    obtaining multi-view infrared images of the surface of the object;
    obtaining multi-view optical images of the surface of the object, wherein each multi-view optical image contains the light marker;
    obtaining spatial information of each light marker from the multi-view optical images of the object using the angular and spatial relationship among the optical camera, infrared camera and the axis of rotation and the angular relationship of the light projector to the axis of rotation to generate a spatial-point-cloud of the surface of the object;
    registering the multi-view optical images and multi-view infrared images to generate registered multi-view infrared images containing the light markers;
    obtaining a temperature at each location of the light markers from the registered multi-view infrared images of the surface of the object corresponding to the spatial-point-cloud of the surface of the object; and
    generating a thermal-spatial-point-cloud of the surface of the object from the temperature at the locations of the light markers corresponding to the spatial-point-cloud.

2. The method of claim 1, wherein the optical camera is oriented such that an angular center line of the optical camera passes through the axis of rotation and is normal to the axis of rotation.

3. The method of claim 1, wherein the light projector is oriented such that the light projector, the light marker, and the axis of rotation are in a same plane.

4. The method of claim 1, wherein the infrared camera is oriented such that an angular center line of the infrared camera passes through the axis of rotation and is normal to the axis of rotation.

5. The method of claim 1, wherein the optical camera and the infrared camera are placed in a plane that is normal to the axis of rotation.

6. The method of claim 1, further comprising generating a spatial-point-cloud of the interior of the object from the spatial information through interpolation.

7. The method of claim 1, wherein:
    i) the infrared camera is placed at the same angular position around the axis of rotation as the optical camera in at least one of the images generated by the optical camera,
    ii) the axis of rotation is at the center line of the images obtained by the infrared camera and the optical camera,
    iii) registration of the optical images and infrared images is obtained by matching the center lines between the images at the same view to generate registered infrared images with light markers, and
    iv) the thermal-spatial-point-cloud is generated using the temperatures at the location of the light markers on the registered infrared images.

8. The method of claim 7, wherein the object is a female breast, the thermal-spatial-point-cloud of the breast includes thermal-spatial-point-clouds of the surfaces of the breast, including the base of the breast connecting to the chest, and the interior region of the breast.

9. The method of claim 8, wherein the breast is imaged with the image acquisition system while the breast is in a position similar to that obtained while the female lies in a prone position with her breast hanging down.

* * * * *